US012447135B2

(12) United States Patent
Yadav et al.

(10) Patent No.: US 12,447,135 B2
(45) Date of Patent: Oct. 21, 2025

(54) FENCHOL AS A STIMULATOR OF FREE FATTY ACID RECEPTOR AND OTHER USES THEREOF

(71) Applicant: University of South Florida, Tampa, FL (US)

(72) Inventors: Hariom Yadav, Land O'Lakes, FL (US); Shalini Jain, Land O'Lakes, FL (US); Sidharth Mishra, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 17/856,400

(22) Filed: Jul. 1, 2022

(65) Prior Publication Data

US 2023/0112505 A1 Apr. 13, 2023

Related U.S. Application Data

(60) Provisional application No. 63/262,390, filed on Oct. 11, 2021.

(51) Int. Cl.
*A61K 31/045* (2006.01)
*A61K 9/00* (2006.01)
*A61P 25/28* (2006.01)

(52) U.S. Cl.
CPC ............ *A61K 31/045* (2013.01); *A61K 9/006* (2013.01); *A61P 25/28* (2018.01)

(58) Field of Classification Search
CPC ........ A61K 31/045; A61K 9/006; A61P 25/28
See application file for complete search history.

(56) References Cited

U.S. PATENT DOCUMENTS

| 4,559,157 A | 12/1985 | Smith et al. |
|---|---|---|
| 4,608,392 A | 8/1986 | Jacquet et al. |
| 4,820,508 A | 4/1989 | Wortzman |
| 4,992,478 A | 2/1991 | Geria |
| 2020/0261404 A1* | 8/2020 | Raz ........................ A61K 47/46 |

OTHER PUBLICATIONS

Maggio et al., Current Pharmaceutical Design, 2016, 22, 4011-4027 (Year: 2016).*

(Continued)

*Primary Examiner* — San Ming R Hui
(74) *Attorney, Agent, or Firm* — Meunier Carlin & Curfman LLC

(57) ABSTRACT

Described are methods of treating neurodegenerative disease by administering a therapeutically effective amount of fenchol to a patient in need thereof. Additionally, described are methods of activating FFAR2 signaling in a patient by administering a therapeutically effective amount of fenchol to a patient in need thereof. Methods of treating gastrointestinal disorders in a patient being treated for cancer and methods of improving cognition in a patient being treated for cancer are also described. Further, the present disclosure provides for a pharmaceutical composition including fenchol and an Alzheimer's disease drug. Additionally, a nasal spray including fenchol, a buccal tablet including fenchol, and a dietary supplement including fenchol are described.

8 Claims, 14 Drawing Sheets

(56) References Cited

OTHER PUBLICATIONS

Miyazawa et al., J. Agric. Food Chem. 2005, 53, 1765-1768 (Year: 2005).*
Ahmad, W., and Ebert, P. R. (2020). Suppression of a core metabolic enzyme dihydrolipoamide dehydrogenase (dld) protects against amyloid beta toxicity in C. elegans model of Alzheimer's disease. Genes Dis. 8, 849-866. doi: 10.1016/j.gendis.2020.08.004.
Ahmadi, S., Nagpal, R., Wang, S., Gagliano, J., Kitzman, D. W., Soleimanian-Zad, S., et al.(2019). Prebiotics from acorn and sago prevent high-fat-diet-induced insulin resistance via microbiome-gut-brain axis modulation. J. Nutr. Biochem. 67, 1-13. doi: 10.1016/j.jnutbio.2019.01.011.
Ahmadi, S., Razazan, A., Nagpal, R., Jain, S., Wang, B., Mishra, S. P., et al. (2020a). Metformin reduces aging-related leaky gut and improves cognitive function by beneficially modulating gut microbiome/goblet cell/mucin axis. J. Gerontol. A Biol. Sci. Med. Sci. 75, e9-e21. doi: 10.1093/gerona/glaa056.
Ahmadi, S., Wang, S., Nagpal, R., Wang, B., Jain, S., Razazan, A., et al. (2020b). A human origin probiotic cocktail ameliorates aging-related leaky gut and inflammation via modulating the microbiota/taurine/tight junction axis. JCI Insight 5:e132055. doi:10.1172/jci.insight.132055.
Al Mahri, S., Al Ghamdi, A., Akiel, M., Al Aujan, M., Mohammad, S., and Aziz, M. A. (2020). Free fatty acids receptors 2 and 3 control cell proliferation by regulating cellular glucose uptake. World J. Gastrointest. Oncol. 12, 514-525. doi: 10.4251/wjgo.v12.i5.514.
Allen Brain Map (2021). Available online at: https://portal.brain-map.org/.
Atlas, H. P. (2021). Human protein atlas. Available online at: http://www.proteinatlas.org.
Bhattacharjee, A., Mulya, A., Pal, S., Roy, B., Feldman, G. M., and Cathcart, M. K. (2010). Monocyte 15-lipoxygenase gene expression requires ERK1/2 MAPK activity. J. Immunol. 185, 5211-5224. doi: 10.4049/jimmunol.1000514.
Bleyer, W. A., Sather, H. N., Nickerson, H. J., Coccia, P. F., Finklestein, J. Z., Miller, D. R., et al. (1991). Monthly pulses of vincristine and prednisone prevent bone marrow and testicular relapse in low-risk childhood acute lymphoblastic leukemia: a report of the CCG-161 study by the childrens cancer study group. J. Clin. Oncol. 9, 1012-1021. doi: 10.1200/JCO.1991.9.6.1012.
Buoso, E., Biundo, F., Lanni, C., Schettini, G., Govoni, S., and Racchi, M. (2012). AβPP intracellular C-terminal domain function is related to its degradation processes. J. Alzheimers Dis. 30, 393-405. doi: 10.3233/JAD-2012-1 11961.
Chase, D. L., and Koelle, M. R. (2007). Biogenic amine neurotransmitters in C. elegans. WormBook 1-15. doi: 10.1895/wormbook.1.132.1.
Curtin, B. F., Pal, N., Gordon, R. K., and Nambiar, M. P. (2006). Forskolin, an inducer of cAMP, up-regulates acetylcholinesterase expression and protects against organophosphate exposure in neuro 2A cells. Mol. Cell. Biochem. 290, 23-32. doi: 10.1007/s11010-005-9084-4.
Curtis, A. (2019). Targeting senescence within the Alzheimer's plaque. Sci. Transl. Med. 11. doi: 10.1126/scitranslmed.aax4869.
De Ture, M. A., and Dickson, D. W. (2019). The neuropathological diagnosis of Alzheimer's disease. Mol. Neurodegener. 14:32. doi: 10.1186/s13024-019-0333-5.
Doifode, T., Giridharan, V. V., Generoso, J. S., Bhatti, G., Collodel, A., Schulz, P. E., et al. (2021). The impact of the microbiota-gut-brain axis on Alzheimer's disease pathophysiology. Pharmacol. Res. 164:105314. doi: 10.1016/j.phrs.2020.105314.
Dostal, V., and Link, C. D. (2010). Assaying β;-amyloid toxicity using a transgenic C. elegans model. J. Vis. Exp. 44:2252. doi: 10.3791/2252.
Falomir-Lockhart, L.J., Cavazzutti, G. F., Giménez, E., and Toscani, A. M. (2019). Fatty acid signaling mechanisms in neural cells: fatty acid receptors. Front. Cell. Neurosci. 13:162. doi: 10.3389/fncel.2019.00162.

Fujii, Y., Nguyen, T. T. T., Fujimura, Y., Kameya, N., Nakamura, S., Arakawa, K., et al. (2019). Fecal metabolite of a gnotobiotic mouse transplanted with gut microbiota from a patient with Alzheimer's disease. Biosci. Biotech. Biochem. 83, 2144-2152. doi: 10.1080/09168451.2019.1644149.
Mishra, S. P., Karunakar, P., Taraphder, S., and Yadav, H. (2020). Free fatty acid receptors 2 and 3 as microbial metabolite sensors to shape host health: pharmacophysiological view. Biomedicines 8:154. doi: 10.3390/biomedicines8060154.
Godini, R., Pocock, R., and Fallahi, H. (2019). Caenorhabditis elegans hub genes that respond to amyloid beta are homologs of genes involved in human Alzheimer's disease. PLoS One 14:e0219486. doi: 10.1371/journal.pone.02 19486.
Guglielmotto, M., Giliberto, L., Tamagno, E., and Tabaton, M. (2010). Oxidative stress mediates the pathogenic effect of different Alzheimer's disease risk factors. Front. Aging Neurosci. 2:3. doi: 10.3389/neuro.24.003.2010.
He, Q., Huang, G., Chen, Y., Wang, X., Huang, Z., and Chen, Z. (2017). The protection of novel 2-arylethenylquinoline derivatives against impairment of associative learning memory induced by neural Aβ in C. elegans Alzheimer's disease model. Neurochem. Res. 42, 3061-3072. doi: 10.1007/s11064-017-2339-0.
He, N., Jin, W. L., Lok, K. H., Wang, Y., Yin, M., and Wang, Z. J. (2013), Amyloid-β1-42 oligomer accelerates senescence in adult hippocampal neural stem/progenitor cells via formylpeptide receptor 2. Cell Death Dis. 4:e924. doi: 10.1038/cddis.2013.437.
Heneka, M. T., Carson, M. J., El Khoury, J., Landreth, G. E., Brosseron, F., Feinstein, D. L., et al. (2015). Neuroinflammation in Alzheimer's disease. Lancet Neurol. 14, 388-405. doi: 10.1016/S1474-4422(15)70016-5.
Ho, L., Ono, K., Tsuji, M., Mazzola, P., Singh, R., and Pasinetti, G. M. (2018). Protective roles of intestinal microbiota derived short chain fatty acids in Alzheimer's diseasetype beta-amyloid neuropathological mechanisms. Expert Rev. Neurother. 18, 83-90. doi: 10.1080/14737175.2018.1400909.
Hur, J.-Y., Frost, G. R., Wu, X., Crump, C., Pan, S. J., Wong, E., et al. (2020). The innate immunity protein IFITM3 modulates γ-secretase in Alzheimer's disease. Nature 586, 735-740. doi: 10.1038/s41586-020-2681-2.
Ibrahim, T. A., El-Hela, A. A., El-Hefnawy, H. M., Al-Taweel, A. M., and Perveen, S. (2017).Chemical composition and antimicrobial activities of essential oils of some coniferous plants cultivated in egypt. Iran. J. Pharm. Res. 16, 328-337. doi: 10.22037/IJPR.2017.1949.
Jiao, X., Gonzalez-Cabrera, P. J., Xiao, L., Bradley, M. E., Abel, P. W., and Jeffries, W. B. (2002). Tonic inhibitory role for cAMP in α1a-adrenergic receptor coupling to extracellular signal-regulated kinases 1/2. J. Pharmacol. Exp. Ther. 303, 247-256. doi: 10.1124/jpet.102.037747.
Jonsson, T., Stefansson, H., Steinberg, S., Jonsdottir, I., Jonsson, P. V., Snaedal, J., et al. (2013). Variant of TREM2 associated with the risk of Alzheimer's disease. N. Eng. J. Med. 368, 107-116. doi: 10.1056/NEJMoa1211103.
Koelle, M. R. (2018). Neurotransmitter signaling through heterotrimeric G proteins: insights from studies in C. elegans. WormBook 2018, 1-52. doi: 10.1895/wormbook.1.75.2.
Konjevod, M., Nikolac Perkovic, M., Sáiz, J., Svob Strac, D., Barbas, C., and Rojo, D. (2020). Metabolomics analysis of microbiota-gut-brain axis in neurodegenerative and psychiatric diseases. J. Pharm. Biomed. Anal. 194:113681. doi:10.1016/j.jpba.2020.113681.
Laskowski, R. A., and Swindells, M. B. (2011). LigPlot+: multiple ligand-protein interaction diagrams for drug discovery. J. Chem. Inf. Model. 51, 2778-2786. doi: 10.1021/ci200227u.
Leeman, D. S., Hebestreit, K., Ruetz, T., Webb, A. E., McKay, A., Pollina, E. A., et al. (2018). Lysosome activation clears aggregates and enhances quiescent neural stem cell activation during aging. Science 359, 1277-1283. doi: 10.1126/science.aag3048.
Lim, J., and Yue, Z. (2015). Neuronal aggregates: formation, clearance and spreading. Dev. Cell 32, 491-501. doi: 10.1016/j.devcel.2015.02.002.
Liu, D., Genetos, D. C., Shao, Y., Geist, D. J., Li, J., Ke, H. Z., et al. (2008). Activation of extracellular-signal regulated kinase (ERK1/

(56) References Cited

OTHER PUBLICATIONS 2) by fluid shear is Ca(2+)-and ATPdependent in MC3T3-E1 osteoblasts. Bone 42, 644-652. doi: 10.1016/j.bone.2007.09.058.

Liu, C.-C., Zhao, N., Yamaguchi, Y., Cirrito, J. R., Kanekiyo, T., Holtzman, D. M., et al. (2016). Neuronal heparan sulfates promote amyloid pathology by modulating brain amyloid-β clearance and aggregation in Alzheimer's disease. Sci. Transl. Med. 8:332ra44. doi: 10.1126/scitranslmed.aad3650.

Lovell, S. C., Davis, I. W., Arendall, W. B., 3rd, de Bakker, P. I. W., Word, J. M., Prisant, M. G., et al. (2003). Structure validation by Cα geometry: φ,ψand Cβ deviation. 30 Proteins 50, 437-450. doi: 10.1002/prot.10286.

Luo, Yuan, et al. "Caenorhabditis elegans model for initial screening and mechanistic evaluation of potential new drugs for aging and Alzheimer's disease." Methods of Behavior Analysis in Neuroscience. 2nd edition Ch 16, (2009), 13 pages.

Maghsoodlou, M. T., Kazemipoor, N., Valizadeh, J., Falak Nezhad Seifi, M., and Rahneshan, N. (2015). Essential oil composition of Eucalyptus microtheca and Eucalyptus viminalis. Avicenna J. Phytomed. 5, 540-552. doi: 10.22038/AJP.2015.4470.

Margie, O., Palmer, C., and Chin-Sang, I. (2013). C. elegans chemotaxis assay, J. Vis. Exp. 74:e50069. doi: 10.3791/50069.

Mishra et al., Free Fatty Acid Receptors 2 and 3 as Microbial Metabolite Sensors to Shape Host Health: Pharmacophysiological View, Biomedicines, 2020, 8, 154.

Nagpal, R., Neth, B. J., Wang, S., Craft, S., and Yadav, H. (2019). Modified Mediterraneanketogenic diet modulates gut microbiome and short-chain fatty acids in association with Alzheimer's disease markers in subjects with mild cognitive impairment. EBioMedicine 47, 529-542. doi: 10.1016/j.ebiom.2019.08.032.

Nagpal, R., Neth, B. J., Wang, S., Mishra, S. P., Craft, S., and Yadav, H. (2020). Gut mycobiome and its interaction with diet, gut bacteria and alzheimer's disease markers in subjects with mild cognitive impairment: a pilot study. EBioMedicine 59:102950. doi: 10.1016/j.ebiom.2020.102950.

Nagpal, R., Newman, T. M., Wang, S., Jain, S., Lovato, J. F., and Yadav, H. (2018). Obesity linked gut microbiome dysbiosis associated with derangements in gut permeability and intestinal cellular homeostasis independent of diet. J. Diabetes Res. 2018:3462092. doi: 10.1155/2018/3462092.

Nagpal, R., Shively, C. A., Register, T. C., Craft, S., and Yadav, H. (2019). Gut microbiome-Mediterranean diet interactions in improving host health. F1000Res. 8:699. doi:10.12688/f1000research. 18992.1.

Porta-de-la-Riva, M., Fontrodona, L., Villanueva, A., and Cerón, J. (2012). Basic Caenorhabditis elegans methods: synchronization and observation. J. Vis. Exp. 64:e4019. doi: 10.3791/4019.

Ronicke, R., Klemm, A., Meinhardt, J., Schroder, U. H., Fandrich, M., and Reymann, K. G. (2008). Aβ mediated diminution of MTT reduction—an artefact of single cell culture? PLoS One 3:e3236. doi: 10.1371/journal.pone.0003236.

Roy, A., Kucukural, A., and Zhang, Y. (2010). I-TASSER: a unified platform for automated protein structure and function prediction. Nat. Protoc. 5, 725-738. doi: 10.1038/nprot.2010.5.

Saido, T., and Leissring, M. A. (2012). Proteolytic degradation of amyloid β-protein. Cold Spring Harb. Perspect. Med. 2:a006379. doi: 10.1101/cshperspect.a006379.

Schmidt, J., Smith, N. J., Christiansen, E., Tikhonova, I. G., Grundmann, M., Hudson, B. D., et al. (2011). Selective orthosteric free fatty acid receptor 2 (FFA2) agonists: identification of the structural and chemical requirements for selective activation of FFA2 versus FFA3. J. Biol. Chem. 286, 10628-10640. doi: 10.1074/jbc.M110.210872.

Selkoe, D. J. (2001). Alzheimer's disease: genes, proteins and therapy. Physiol. Rev. 81, 741-766. doi: 10.1152/physrev.2001.81. 2.741.

Settembre, C., Fraldi, A., Medina, D. L., and Ballabio, A. (2013). Signals from the lysosome: a control centre for cellular clearance and energy metabolism. Nat. Rev. Mol. Cell Biol. 14, 283-296. doi: 10.1038/nrm3565.

Singh, P., Kalunke, R. M., and Giri, A. P. (2015). Towards comprehension of complex chemical evolution and diversification of terpene and phenylpropanoid pathways in Ocimum species. RSC Adv. 5, 106886-106904. doi: 10.1039/C5RA16637C.

Singh, S.K., Srivastav, S., Yadav, A.K., Srikrishna, S., and Perry, G. (2016). Overview of Alzheimer's disease and some therapeutic approaches targeting Aβ by using several synthetic and herbal compounds. Oxid. Med. Cell. Longev. 2016:7361613. doi:10.1155/2016/7361613.

Sun, J., Xu, J., Ling, Y., Wang, F., Gong, T., Yang, C., et al. (2019). Fecal microbiota transplantation alleviated Alzheimer's disease-like pathogenesis in APP/PS1 transgenic mice. Transl. Psychiatry 9:189. doi: 10.1038/s41398-019-0525-3.

Sun, J., Yuan, B., Wu, Y., Gong, Y., Guo, W., Fu, S., et al. (2020). Sodium butyrate protects N2a cells against Aβ toxicity in vitro. Mediators Inflamm. 2020:7605160. doi: 10.1155/2020/7605160.

Trott, O., and Olson, A. J. (2010). AutoDock vina: improving the speed and accuracy of docking with a new scoring function, efficient optimization and multithreading. J. Comput. Chem. 31, 455-461. doi: 10.1002/jcc.21334.

Vilchez, D., Saez, I., and Dillin, A. (2014). The role of protein clearance mechanisms in organismal ageing and age-related diseases. Nat. Commun. 5:5659. doi:10.1038/ncomms6659.

Vogt, N. M., Romano, K. A., Darst, B. F., Engelman, C. D., Johnson, S. C., Carlsson, C. M., et al. (2018). The gut microbiota-derived metabolite trimethylamine N-oxide is elevated in Alzheimer's disease. Alzheimers Res. Ther. 10:124. doi: 10.1186/s13195-018-0451-2.

Wang, S., Ahmadi, S., Nagpal, R., Jain, S., Mishra, S. P., Kavanagh, K., et al. (2020). Lipoteichoic acid from the cell wall of a heat killed Lactobacillus paracasei D3-5 ameliorates aging-related leaky gut, inflammation and improves physical and cognitive functions: from C. elegans to mice. Geroscience 42, 333-352. doi: 10.1007/s11357-019-00137-4.

Wei, Z., Chen, X.-C., Song, Y., Pan, X.-D., Dai, X.-M., Zhang, J., et al. (2016). Amyloid β protein aggravates neuronal senescence and cognitive deficits in 5XFAD mouse model of Alzheimer's disease. Chin. Med. J. (Engl) 129, 1835-1844. doi: 10.4103/0366-6999. 18664.

Wenzel, T. J., Gates, E. J., Ranger, A. L., and Klegeris, A. (2020). Short-chain fatty acids (SCFAs) alone or in combination regulate select immune functions of microglia-like cells. Mol. Cell. Neurosci. 105:103493. doi: 10.1016/j.mcn.2020.103493.

Xu, D., and Zhang, Y. (2011). Improving the physical realism and structural accuracy of protein models by a two-step atomic-level energy minimization. Biophys. J. 101, 2525-2534. doi: 10.1016/j.bpj.2011.10.024.

Yadav, H., Devalaraja, S., Chung, S. T., and Rane, S. G. (2017). TGF-β1/Smad3 pathway targets PP2A-AMPK-FoxO1 signaling to regulate hepatic gluconeogenesis. J. Biol. Chem. 292, 3420-3432. doi: 10.1074/jbc.M116.764910.

Yadav, H., Quijano, C., Kamaraju, A. K., Gavrilova, O., Malek, R., Chen, W., et al. (2011). Protection from obesity and diabetes by blockade of TGF-β/Smad3 signaling. Cell Metab. 14, 67-79. doi: 10.1016/j.cmet.2011.04.013.

Yang, J., Yan, R., Roy, A., Xu, D., Poisson, J., and Zhang, Y. (2015). The I-TASSER suite: protein structure and function prediction. Nat. Methods 12, 7-8. doi: 10.1038/nmeth.3213.

Yankner, B. A. (1996). Mechanisms of neuronal degeneration in Alzheimer's disease. Neuron16, 921-932. doi: 10.1016/s0896-6273(00)80115-4.

Zhang, Y. (2008). I-TASSER server for protein 3D structure prediction. BMC Bioinformatics 9:40. doi: 10.1186/1471-2105-9-40.

Zhang, P., Kishimoto, Y., Grammatikakis, I., Gottimukkala, K., Cutler, R. G., Zhang, S., et al. (2019). Senolytic therapy alleviates Aβ-associated oligodendrocyte progenitor cell senescence and cognitive deficits in an Alzheimer's disease model. Nat. Neurosci. 22, 719-728. doi: 10.1038/s41593-019-0372-9.

Zheljazkov, V. D., Cantrell, C. L., Astatkie, T., and Jeliazkova, E. (2013). Distillation time effect on lavender essential oil yield and composition. J. Oleo Sci. 62, 195-199. doi: 10.5650/jos.62.195.

Zhuang, Z., Gao, M., Yang, R., Liu, Z., Cao, W., and Huang, T. (2021). Causal relationships between gut metabolites and Alzheim-

(56) References Cited

OTHER PUBLICATIONS er's disease: a bidirectional Mendelian randomization study. Neurobiol. Aging 100, 119.e15-119.e18. doi: 10.1016/j.neurobiolaging.2020.10.022.

* cited by examiner

| S.No. | Name of Libraries | No. of Compounds |
|---|---|---|
| 1 | AfroDb Natural Products | 1,008 |
| 2 | AnalytiCon Discovery NP | 20,000 |
| 3 | Herbal Ingredients In-Vivo Metabolism | 1,465 |
| 4 | Herbal Ingredients Targets | 9,862 |
| 5 | IBScreen NP | 68,000 |
| 6 | Indofine Natural Products | 20,000 |
| 7 | Nubbe Natural Products | 2,147 |
| 8 | Specs Natural Products | 800 |
| 9 | TCM Database @ Taiwan | 20,000 |
| 10 | NPACT Database | 1,574 |
| Total | | 144,856 |

FIG. 8

| S.No. | ZINC ID | Compound Name | [the energy of the lowestenergy conformation] |
|---|---|---|---|
| 1 | ZINC00157548 | Norpseudoephedrine hydrochloride | -6.39 |
| 2 | ZINC95099135 | 7-hydroxycamphene | -6.18 |
| 3 | ZINC00074836 | Ephedrine | -6.01 |
| 4 | ZINC00388198 | Octopamine hydrochloride | -5.94 |
| 5 | ZINC01597139 | (±)-Carvomenthol | -5.86 |
| 6 | ZINC59587245 | 4-Carene | -5.8 |
| 7 | ZINC01081099 | FENCHOL | -5.73 |
| 8 | ZINC02034811 | 3-Pinanone | -5.73 |
| 9 | ZINC00403588 | Synephrine | -5.73 |
| 10 | ZINC00968099 | Borneol | -5.7 |
| 11 | ZINC00968029 | Darwinol | -5.7 |
| 12 | ZINC02040990 | Beta-terpineol | -5.69 |
| 13 | ZINC00403588 | Synephrine | -5.68 |
| 14 | ZINC00967571 | (+)-Fenchone | -5.68 |
| 15 | ZINC03581377 | L-Leucinamide hydrochloride | -5.68 |

FIG. 9

| S. No. | Compounds | H-Bonding Residues Human_FFAR2 | Probability as Agonist Ser86, Tyr90, His140, Ile145, Val179, Arg180, Leu183, Tyr238, His242, Arg255 Interaction with both Arg180 & Arg255 - Agonist | Probability as Antagonist Ser86, Tyr90, His140, Ile145, Val179, Arg180, Leu183, Tyr238, His242, Arg255 Interaction with either Arg180 or Arg255 - Antagonist |
|---|---|---|---|---|
| 1 | 175 (Acetate) | His242, Tyr238 | Potential Agonist | NA |
| 2 | ZINC00895132 (Butyrate) | Tyr238 | Potential Agonist | NA |
| 3 | 000118616157(CatPB) | Gln166, Tyr238, Arg255, Lys65, Gln148, Ser86, Ser256 | NA | Potential Antagonist |
| 4 | ZINC00157548 (Norpseudoephedrine hydrocholride) | Tyr238, His242, Leu183, Gln148, Cys164, Glu166, Ser86, Thr85, Glu68 | 20% | 0% |
| 5 | ZINC95099135 (7-Hydroxycamphene) | Thr85, Glu166, Ser86, Gln148, Tyr238, Glu68, His242 | 30% | 0% |
| 6 | ZINC00074836 (Ephedrine) | Thr85, Gln148, Glu166, Ser86, Glu68, Cys164, His242 | 10% | 0% |
| 7 | ZINC00388198 (Octopamine hydrocholride) | Leu183, Tyr238, His242, Asn239, Gln148, Cys164, Glu166, Ser86, Glu68, Thr85, | 70% | 0% |
| 8 | ZINC01597139 (Carvomenthol) | Ser86, Gln148, Tyr238, Glu166, Thr85, Glu68, Arg255 | 20% | 60% |
| 9 | ZINC59587245 (4-Carene) | All Hydrophobic | 0% | 0% |
| 10 | ZINC01081099 (Fenchol) | Glu166, Ser86, His242, Gln148, Tyr238 | 50% | 0% |
| 11 | ZINC02034811 (3-Pinanone) | Ser86, Arg255, Gln148 | 30% | 70% |
| 12 | ZINC00403588 (Synephrine) | Leu183, Tyr238, His242, Gln148, Glu166, Ser86, Glu68, Thr85, Tyr238, Arg255 | 20% | 70% |
| 13 | ZINC00968099 (Borneol) | Ser86, Glu166, Glu68, Tyr238, Arg255 | 10% | 80% |
| 14 | ZINC00968029 (Darwinol) | Ser263, Ser86, Gln148, Glu166, Glu68, Cys164 | 20% | 0% |
| 15 | ZINC02040990 (Beta-terpineol) | Cys184, Thr85, Cys164, Tyr238, Gln148, Glu166, Arg255, Glu68, Ser86 | 30% | 60% |
| 16 | ZINC00967571 (Fenchone) | Gln148, Tyr238, Lys65 | 10% | 0% |
| 17 | ZINC03581377 (Leucinamide hydrocholoride) | Ser263, Ile10, Lys65, Val259, Glu68, Gln148 | 0% | 0% |

FIG. 10

| S. No. | Compounds | H-Bonding Residues Mice_FFAR2 | Probability as Agonist Ser86, Tyr90, His140, Ile145, Val179, Arg180, Leu183, Tyr238, His242, Arg255 Interaction with both Arg180 & Arg255 - Agonist | Probability as Antagonist Ser86, Tyr90, His140, Ile145, Val179, Arg180, Leu183, Tyr238, His242, Arg255 Interaction with eitherArg180 & Arg255 -Antagonist |
|---|---|---|---|---|
| 1 | 175 (Acetate) | Tyr90, Arg180, Gln148, Asn265, Arg65, Gln148, Tyr238 | Potential Agonist | NA |
| 2 | ZINC00895132 (Butyrate) | Tyr238, Arg65, Arg180, Tyr90, Gln170 | Potential Agonist | NA |
| 3 | ZINC000118616157 (CatPB) | Asn151, Asn167, Arg255, Gln172, Pe168 | NA | Potential Antagonist |
| 4 | ZINC00157548 (Norpseudoephedrine hydrocholoride) | Cys164, Val147, Asn167, Thr169, Arg65, Gln148, Val81, Thr85, Arg255, Leu60, Glu320 | 10% | 60% |
| 5 | ZINC95099135 (7-Hydroxycamphene) | Thr85, Gln323, Gln170, Glu320, Thr169, Gln318 | 0% | 70% |
| 6 | ZINC00074836 (Ephedrine) | Arg255, Val81, Thr85, Glu320, Ile146, Val147, Asn167 | 0% | 70% |
| 7 | ZINC00388198 (Octopamine hydrocholride) | Glu68, Trp75, Glu166, Val147, Asn167, Thr169, Leu60, Thr85, Glu320, Gln323, Ala319, Ile146 Gln170, Arg255, Gln155, Leu60, Val81, Thr85 | 0% | 70% |
| 8 | ZINC01597139 (Carvomenthol) | Arg255, Asn167, Thr169, Val81, Thr85, Leu60, Phe64 | 0% | 60% |
| 9 | ZINC59587245 (4-Carene) | All hydrophobic | 0% | 0% |
| 10 | ZINC01081099 (Fenchol) | Glu320, Thr85 | 0% | 0% |
| 11 | ZINC02034811 (3-Pinanone) | Arg255, Thr169, Gln170 | 0% | 80% |
| 12 | ZINC00403588 (Synephrine) | Glu68, Trp75, Tyr90, Gln148, Cys164, Tyr238, Asn167, Phe168, Arg255, Ile146, Glu170, Val81, Thr85, Val147, Asn167, Thr169, Gln155 | 0% | 80% |
| 13 | ZINC00968099 (Borneol) | Thr169, Gln170, Val81, Thr85, Arg255, Leu60, Glu320 | 0% | 80% |
| 14 | ZINC00968029 (Darwinol) | Gln148, Ala319, Gln323, Glu320, Leu60, Val81, Thr85 | 0% | 0% |
| 15 | ZINC02040990 (Beta-terpineol) | Glu166, Tyr90, Gln148, Tyr238, Val156, Arg255, Ile146, Val147 | 0% | 60% |
| 16 | ZINC00967571 (Fenchone) | Arg255, Gln170 | 0% | 50% |
| 17 | ZINC03581377 (Leucinamide hydrocholoride) | Arg65, Tyr90, Glu166, Val147, Asn167, Thr169, Gln170, Glu320, Arg255, Asn151 | 0% | 50% |

FIG. 11

Fenchol (ZINC01081099) interaction with human and mouse Ffar2 homology modeling

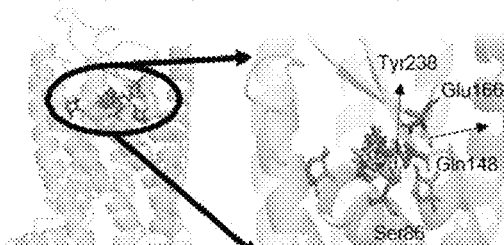
ZINC01081099 interaction with human Ffar2

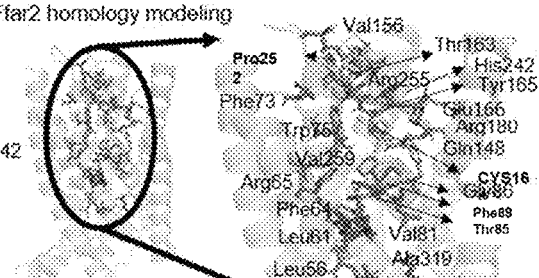
ZINC01081099 interaction with mouse Ffar2

I

3-Pinanone/3-Pentanone (ZINC02034811) interaction with human and mouse Ffar2 homology modeling

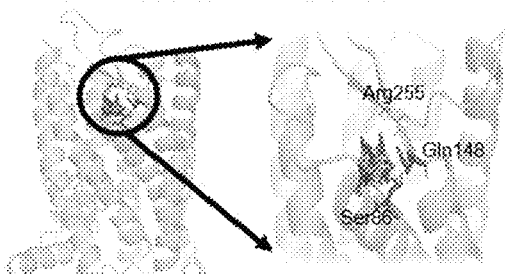
ZINC02034811 interaction with human Ffar2

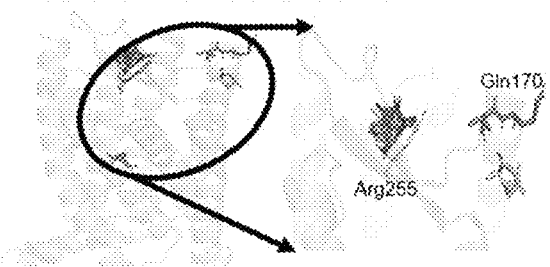
ZINC02034811 interaction with mouse Ffar2

J

Synephrine (ZINC00403588) interaction with human and mouse Ffar2 homology modeling

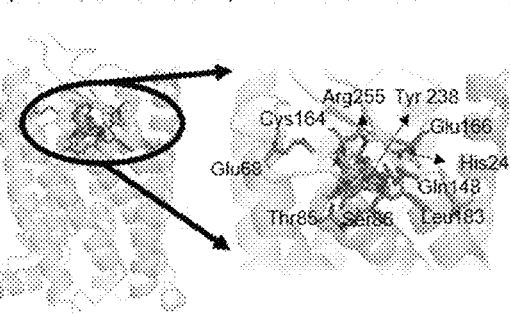
ZINC00403588 interaction with human Ffar2

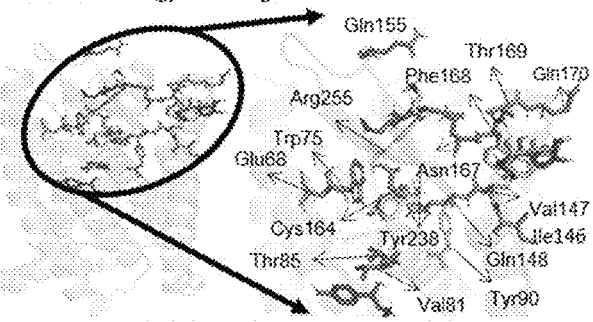
K  ZINC00403588 interaction with mouse Ffar2

Borneol (ZINC00968099) interaction with human and mouse Ffar2 homology modeling

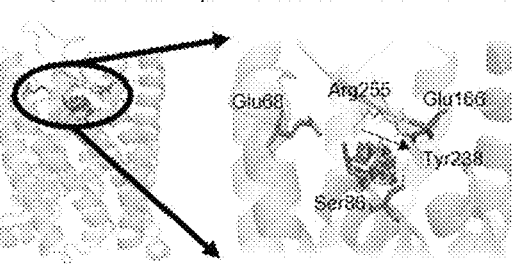
ZINC00968099 interaction with human Ffar2

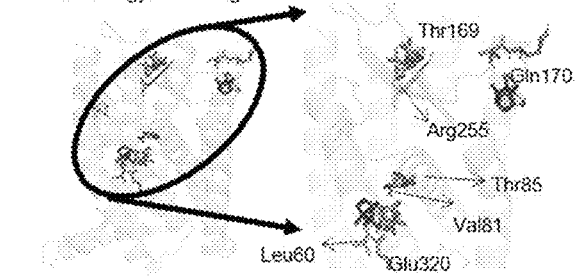
ZINC00968099 interaction with mouse Ffar2

Darwinol/ Myrtenol (ZINC000968029) interaction with human and mouse Ffar2 homology modeling

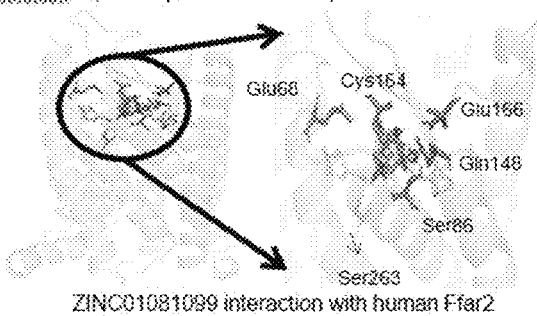

ZINC01081099 interaction with human Ffar2

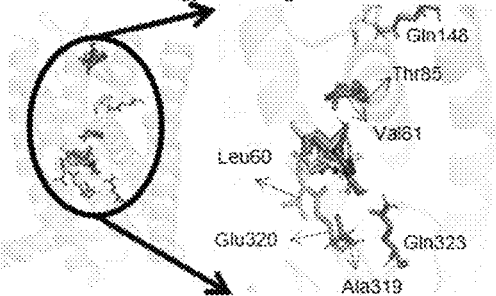

M ZINC01081099 interaction with mouse Ffar2

Beta-Terpineol (ZINC02040990) interaction with human and mouse Ffar2 homology modeling

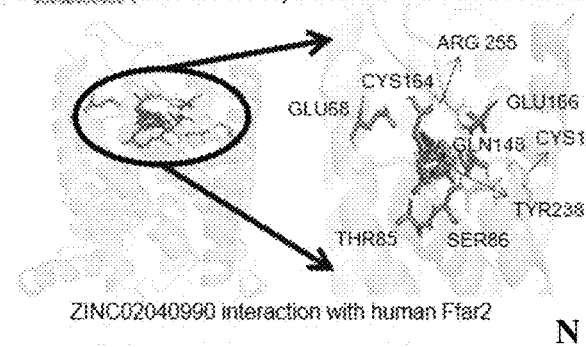

ZINC02040990 interaction with human Ffar2

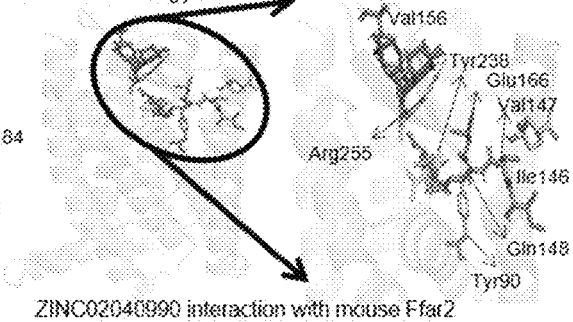

N ZINC02040990 interaction with mouse Ffar2

Fenchone (ZINC00967571) interaction with human and mouse Ffar2 homology modeling

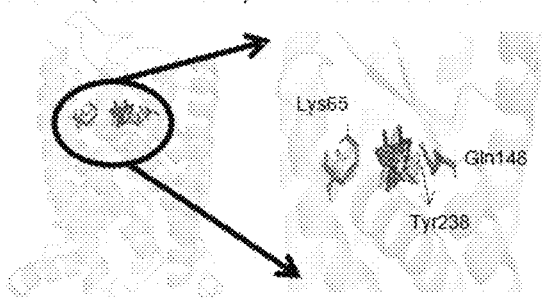

ZINC00967571 interaction with human Ffar2

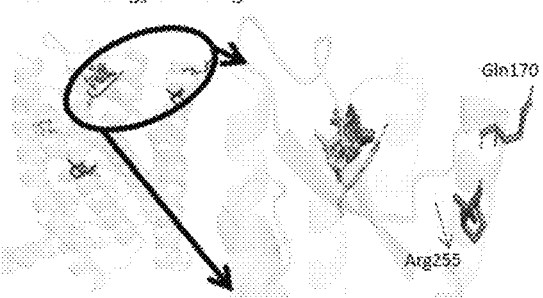

O ZINC00967571 interaction with mouse Ffar2

L-Leucinamide hydrochloride (ZINC03581377) interaction with human and mouse Ffar2 homology modeling

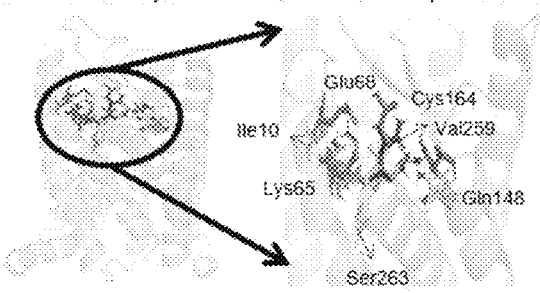

ZINC03581377 interaction with human Ffar2

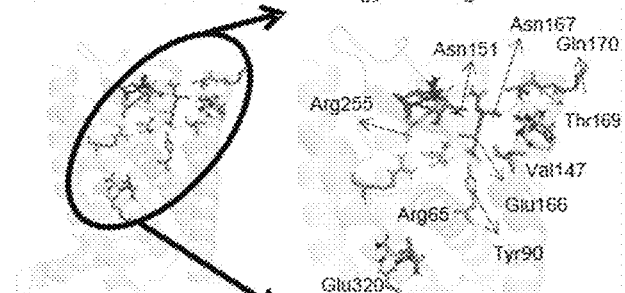

P ZINC03581377 interaction with mouse Ffar2

FIGS. 12M-12P

FENCHOL AS A STIMULATOR OF FREE FATTY ACID RECEPTOR AND OTHER USES THEREOF

CROSS-REFERENCE TO RELATED APPLICATIONS

This application claims the benefit of priority to U.S. Patent Application No. 63/262,390 filed on Oct. 11, 2021, the disclosure of which is expressly incorporated by reference herein in its entirety.

BACKGROUND

Alzheimer's disease (AD) is a debilitating public health problem in older adults and while evidence suggests that gut microbiota may contribute to the pathology of AD, strategies to beneficially modulate gut microbiota and its sensing signaling pathways remain largely unknown.

AD is the most common neurodegenerative disorder in older adults (Jonsson et al., 2013). Its prevalence is increasing, and no successful preventative therapies or treatments are available. AD is commonly characterized by a higher accumulation of amyloid-beta (A$\beta$) and the formation of intracellular neurofibrillary tangles, which leads to neuronal death and a decline in memory and learning behaviors (Singh et al., 2016; De Ture and Dickson, 2019). Although mechanisms underlying increased A$\beta$ accumulation in the brain (an important hallmark of AD) are not known, it increases neurotoxicity/neuronal death (neurodegeneration) and impairs learning and memory behaviors (Yankner, 1996; Selkoe, 2001; De Ture and Dickson, 2019). Current therapies that are targeted to reduce A$\beta$ levels are not successful, but literature suggests that an increased A$\beta$ accumulation is causal for neurodegeneration in AD pathology. Thus, there is a need for reducing A$\beta$ accumulation to prevent AD progression. Increased accumulation of A$\beta$ is associated with either higher production or reduced clearance (Liu et al., 2016). A reduced clearance is a hallmark of A$\beta$ accumulation and is linked to reduced proteasomal/lysosomal activities in the brain (Buoso et al., 2012; Settembre et al., 2013; Vilchez et al., 2014; Leeman et al., 2018). Increased A$\beta$ accumulation can stimulate senescence in neuronal and microglial cells, which initiates a cascade of detrimental events, including neuroinflammation (Heneka et al., 2015). Senescence is a fundamental function of aging. Inflammatory cytokines instigate A$\beta$ production by activating specific transcription factors, such as interferon-induced transmembrane protein three in neurons and astrocytes (Hur et al., 2020). Together, these abnormalities further deteriorate brain health and functions, such as memory and learning behaviors (He et al., 2013). Strategies to reduce the accumulation of A$\beta$ in the neuronal cells and, therefore, ameliorate neurodegeneration and AD pathology, are needed. The methods disclosed herein address these and other needs.

SUMMARY

In accordance with the purposes of the disclosed materials and methods, as embodied and broadly described herein, the disclosed subject matter, in one aspect, relates to pharmaceutical compositions of fenchol for treating Alzheimer's disease, dementia, and other neurodegenerative conditions.

Thus, in one example, disclosed herein are methods for treating neurodegenerative disease, including administering a therapeutically effective amount of fenchol to a patient in need thereof.

Additionally, methods of activating FFAR2 signaling in a patient are provided, including administering a therapeutically effective amount of fenchol to a patient in need thereof.

In a further example, methods of treating gastrointestinal disorders in a patient being treated for cancer are provided, including administering a therapeutically effective amount of fenchol to a patient in need thereof.

In a still further example, methods of improving cognition in a patient being treated for cancer are provided, including administering a therapeutically effective amount of fenchol to a patient in need thereof.

Further, a pharmaceutical composition is provided herein, including fenchol and an Alzheimer's disease drug.

Additionally, a nasal spray is provided including fenchol.

In a further example, a buccal tablet is provided including fenchol.

In one example, a dietary supplement is provided including a therapeutically effective amount of fenchol, wherein the therapeutically effective amount is from 1 to 2,000 mg in a pill, 1 to 5,000 mg per day, 1 to 1,000 mg/kg, or 1 to 200 mg/kg per day.

Additional advantages will be set forth in part in the description that follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

FIG. 1A shows the mRNA expression of FFAR2 gene in SK-N-SH and HEK293 cells. FIG. 1B shows SK-N-SH cells treated with FFAR2i (10 µM CATPB) for 4 h and A$\beta$25-35 (25 µM) for 2 h, then measured cell viability using MTT assay, shows that A$\beta$-treatment induced cell death and inhibition of FFAR2 further reduced cell viability. DMSO was used as vehicle control. FIGS. 1C-1D show that similarly, A$\beta$-treatment significantly increased A$\beta$-accumulation with and without FFAR2 inhibition. Data are the mean (n=3 replicates in three repeated experiments)±SEM. P values with *<0.05 and **<0.01 are significantly different.

FIG. 2A shows a schematic of screening FFAR2 activators and their validation for ameliorating AD-like phenotype. FIG. 2B shows FFAR2 activating potential of selected compounds in terms of increasing phospho-ERK1/2 levels. FIG. 2C shows further selected compounds (n=7) showing a reduction in Forskolin (FSK) induced cAMP in SK-N-SH cells. FIG. 2D shows further selected compounds (n=2) for increasing intracellular calcium, another indication of FFAR2 signaling activation. Data are shown as the mean±S.D. (n=3 experiments in triplicate). *P <0.05; P<0.01; *P<0.001.

FIGS. 3A-3D show the interactions of Fenchol with (FIG. 3C) human FFAR2 and (FIG. 3D) mouse FFAR2 and the comparison of the interactions of Fenchol with FFAR2 agonist-acetate (FIGS. 3A-3B). FIGS. 3E-3G show that Fenchol treatment significantly reduced the Aβ-induced decline in cell viability (FIG. 3E) and Aβ-accumulation (FIGS. 3F-3G) in SK-N-SH cells on FFAR2 dependent manner. Data are mean±SEM (n=3 independent experiments in triplicate). $P<0.01$; *$P<0.001$.

FIGS. 4A-4C show the lifespan assay of wild-type (FIG. 4A) and human Aβ-overexpressing (CL2006 and CL4176) (FIGS. 4B-4C) with and without Fenchol treatments (FIGS. 4D-4E). FIGS. 4D-4E show Aβ accumulation shown by thioflavin S staining (FIG. 4D) and western blot (FIG. 4E) in CL2006 worms treated with Fenchol in comparison to their DMSO treated controls. FIG. 4F shows Fenchol protected temperature-induced Aβ-mediated paralysis in CL4176 strains compared to their DMSO treated control group. FIG. 4G shows that Fenchol treatment preserved temperature-induced Aβ overexpression mediated chemotaxis index (a markers of cognition/memory) in CL2355 strain of *C. elegans* compared to their DMSO treated control, while Fenchol showed normal effects in control CL2122 strain of *C. elegans*. Data are mean±SEM (n=3 independent experiments in triplicate). ***$P<0.001$.

FIG. 5A shows that total protein ubiquitination in Western blots with anti-P4D1 antibody was not impacted by Fenchol treatment. FIGS. 5B-5C show that proteasome activity was significantly increased in Fenchol treated SK-N-SH cells (FIG. 5B) and *C. elegans* (FIG. 5C). Proteasome activity was higher in Fenchol treated SK-N-SH cells that were also treated with Ai. Fenchol treatment also increased proteasome activity in APP/PSI mice cortex (FIG. 5D) and hippocampus (FIG. 5E) regions. Data are the mean and standard error of means from three independent experiments done in triplicate.

FIG. 8 shows a list of natural compound libraries used for screening.

FIG. 9 is a table of binding energies for top 15 compounds.

FIG. 10 shows the agonist and antagonist probability prediction of top 15 compounds interaction with human Ffar2 homology model.

FIG. 11 shows the agonist and antagonist probability prediction of top 15 compounds interaction with mice Ffar2 homology model.

FIG. 13A shows SK-N-SH cell lines that were treated with 10 μm of each compound at 37° C. for 24 hours. FIG. 13B shows the expression of ohpsphoERK1/2 protein in Glutag and SK-N-SH cells. Both cell lines were treated with 10 mM acetate at 37° C. for 30 minutes.

DETAILED DESCRIPTION

Figures 1A, 1B, 1C, 1D:
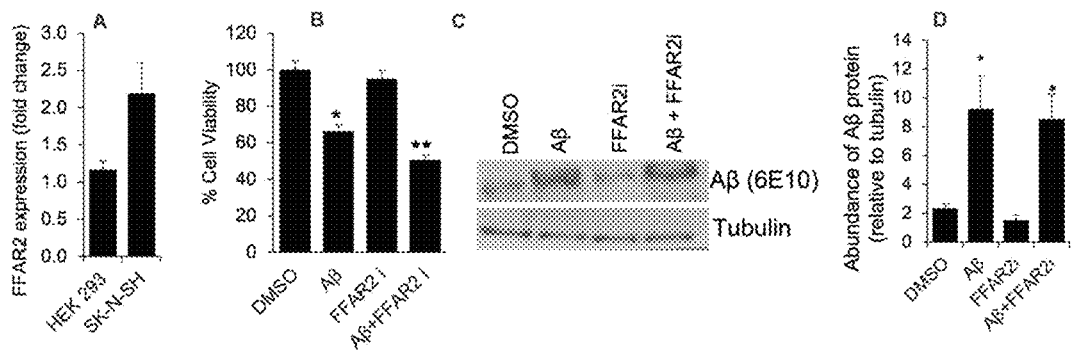
FIGS. 1A-1D show FFAR2 expressed in human neuronal cells and its inhibition increased A$\beta$-induced neurotoxicity.

The following description of the disclosure is provided as an enabling teaching of the disclosure in its best, currently known embodiments. Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As can be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It can be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise. Thus, for example, reference to "a compound", "a composition", or "a disorder", includes, but is not limited to, two or more such compounds, compositions, or disorders, and the like.

It should be noted that ratios, concentrations, amounts, and other numerical data can be expressed herein in a range format. It can be further understood that the endpoints of each of the ranges are significant both in relation to the other endpoint, and independently of the other endpoint.

It is understood that amounts, sizes, formulations, parameters, and other quantities and characteristics are not and need not be exact but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined.

The term "patient" refers to a human in need of treatment for any purpose. However, the term "patient" can also refer to non-human animals, preferably mammals such as dogs, cats, horses, cows, pigs, sheep, and non-human primates, among others, that are in need of treatment.

By "reduce" or other forms of the word, such as "reducing" or "reduction," is meant lowering of an event or characteristic. It is understood that this is typically in relation to some standard or expected value, in other words it is relative, but that it is not always necessary for the standard or relative value to be referred to. For example, "reduces tumor growth" means reducing the rate of growth of a tumor relative to a standard or a control.

By "prevent" or other forms of the word, such as "preventing" or "prevention," is meant to stop a particular event or characteristic, to stabilize or delay the development or progression of a particular event or characteristic, or to minimize the chances that a particular event or characteristic will occur. Prevent does not require comparison to a control as it is typically more absolute than, for example, reduce. As used herein, something could be reduced but not prevented, but something that is reduced could also be prevented. Likewise, something could be prevented but not reduced, but something that is prevented could also be reduced. It is understood that where reduce or prevent are used, unless specifically indicated otherwise, the use of the other word is also expressly disclosed. For example, the terms "prevent" or "suppress" can refer to a treatment that forestalls or slows the onset of a disease or condition or reduced the severity of the disease or condition. Thus, if a treatment can treat a disease in a subject having symptoms of the disease, it can also prevent or suppress that disease in a subject who has yet to suffer some or all of the symptoms.

The term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder, preventative treatment, that is, treatment directed to minimizing or partially or completely inhibiting the development of the associated disease, pathological condition, or disorder, and supportive treatment, that is, treatment employed to supplement another specific therapy directed toward the improvement of the associated disease, pathological condition, or disorder.

The term "therapeutically effective" refers to the amount of the composition used is of sufficient quantity to ameliorate one or more causes or symptoms of a disease or disorder. Such amelioration only requires a reduction or alteration, not necessarily elimination.

The term "pharmaceutically acceptable" refers to those compounds, materials, compositions, and/or dosage forms which are, within the scope of sound medical judgment, suitable for use in contact with the tissues of human beings and animals without excessive toxicity, irritation, allergic response, or other problems or complications commensurate with a reasonable benefit/risk ratio.

The term "carrier" means a compound, composition, substance, or structure that, when in combination with a compound or composition, aids or facilitates preparation, storage, administration, delivery, effectiveness, selectivity, or any other feature of the compound or composition for its intended use or purpose. For example, a carrier can be selected to minimize any degradation of the active ingredient and to minimize any adverse side effects in the subject.

Methods

Method of Treating Alzheimer's Disease

The present disclosure, in one aspect, provides for a method of treating neurodegenerative disease, including administering a therapeutically effective amount of fenchol to a patient in need thereof. In some examples, neurodegenerative disease can include Alzheimer's disease. In further examples, neurodegenerative disease can include dementia. In certain examples, neurodegenerative disease can include Parkinson's disease.

In some examples, the therapeutically effective amount of fenchol can be administered to the patient orally. In further examples, the therapeutically effective amount of fenchol can be in a tablet, troche, pill, or capsule. In some examples, the therapeutically effective amount of fenchol can be administered buccally. In certain examples, the therapeutically effective amount of fenchol can be administered to the patient intravenously. In specific examples, the therapeutically effective amount of fenchol can be administered to the patient as a spray. In further examples, the spray is administered nasally. In some examples, the therapeutically effective amount of fenchol can be administered to the patient topically. In further examples, the therapeutically effective amount of fenchol can be in an ointment, cream, lotion, solution, or tincture.

The term "neurodegenerative disease" refers to any disease characterized by the dysfunction and/or death of neurons leading to a loss of neurologic function in the brain, spinal cord, central nervous system, and/or peripheral nervous system. Neurodegenerative diseases can be chronic or acute. Examples of neurodegenerative diseases include, but are not limited to, Alzheimer's disease, Parkinson's disease, frontotemporal dementia, frontotemporal dementia with Parkinsonism, frontotemporal lobe dementia, pallidopontonigral degeneration, progressive supranuclear palsy, multiple system tauopathy, multiple system tauopathy with presenile dementia, Wilhelmsen-Lynch disease, Pick's disease, Pick's disease-like dementia, Mild Cognitive Impairment, Diffuse Lewy body disease, Dementia with Lewy bodies type, demyelinating diseases such as multiple sclerosis and acute transverse myelitis, Balo's Concentric Sclerosis, Acute Disseminating Encephalomyelitis, Neuromyelitis Optica, Transverse Myelitis or Leukodystrophies, amyotrophic lateral sclerosis, Huntington's disease, Creutzfeldt-Jakob disease, AIDs dementia complex, extrapyramidal and cerebellar disorders such as lesions of the corticospinal system, disorders of the basal ganglia, corticobasal ganglionic degeneration, progressive supranuclear Palsy, structural lesions of the cerebellum, spinocerebellar degenerations, such as spinal ataxia, Friedreich's ataxia, cerebellar cortical degenerations, multiple systems degenerations (Mencel, Dejerine-Thomas, Shi-Drager, and Machado-Joseph), multiple system atrophy, systemic disorders (Refsum's disease, abetalipoprotemia, ataxia, telangiectasia, and mitochondrial multisystem disorder), disorders of the motor unit such as neurogenic muscular atrophies (anterior horn cell degeneration, infantile spinal muscular atrophy, and juvenile spinal muscular atrophy), Progressive Bulbar Palsy, Down's Syndrome in middle age, subacute sclerosing panencephalitis, Hallervorden-Spatz disease, dementia pugilistica, Primary Lateral Sclerosis, Progressive Pseudobulbar Palsy or Post-polio Syndrome; peripheral neuropathy is inherited (HNPP, CMT1A, CMT1B, DSS, CMT1X, CMT4B1), infectious (Leprosy, HIV), immune (GBS), diabetic (Type I, Type II), injury (transient nerve crush, chronic constriction injury, partial nerve ligation, spinal nerve ligation, spared nerve injury), and chemotherapy (e.g. cisplatin)-induced neuropathies; and the like.

Some examples of acute neurodegenerative disease are stroke, ischemia, and multiple infarct dementia. Sudden loss of neurons may also characterize the brains of patients with epilepsy and those that suffer hypoglycemic insults and traumatic injury of the brain, peripheral nerves, or spinal cord.

Alzheimer's disease (AD) refers to a neurodegenerative disease characterized by (1) a clinical phenotype typically centered on the presence of a progressive dementia that includes episodic memory impairment as a defining feature and involvement of other cognitive domains or skills, and (2) specific neuropathological changes that usually include intraneuronal (neurofibrillary tangles) and extracellular parenchymal lesions (senile plaques), which are often accompanied by synaptic loss and vascular amyloid deposits. In the meaning of the present application, AD refers to the whole spectrum of the clinical phase of the disease and is not restricted to the dementia syndrome. It therefore can encompass both the predementia and dementia phases. The diagnosis can be established in vivo and can rely on a dual clinicobiological entity that requires the evidence of both specific memory changes and in vivo markers of Alzheimer's pathology that can include: CSF (cerebrospinal fluid) Abeta, total tau, and phospho-tau; retention of specific PET amyloid tracers; medial temporal lobe atrophy on magnetic resonance imaging; and/or temporal/parietal hypometabolism on fluorodeoxyglucose PET. Neurobiological changes responsible for AD can include specific neuronal brain lesions (senile neuritic plaques and neurofibrillary tangles), neurodegeneration, neuronal/synaptic loss, and vascular amyloid deposits within the cerebral cortex. Additionally, two different stages can be distinguished: a predementia phase and a dementia phase of AD.

AD can include late-onset Alzheimer's or early-onset Alzheimer's. Late-onset Alzheimer's can first begin to show signs in a person's mid-60s. Late-onset is the most common type of AD.

Early-onset Alzheimer's can first begin to show signs when a person is between 30 and mid-60s. It is rare and usually caused by gene changes that are passed down from parent to child. It appears that early-onset AD can be linked with a defect in a specific part of a person's DNA: chromosome 14. A form of muscle twitching and spasm, called myoclonus, is also more common in early-onset Alzheimer's.

Stages of AD can include mild AD, moderate AD, and severe AD. Mild AD can include memory loss or other cognitive difficulties, such as wandering and getting lost, trouble handling money and paying bills, repeating questions, personality and behavior change, or any combination thereof. These symptoms can also be referred to as mild cognitive impairment (MCI) or mild dementia. Moderate AD can include damage to the areas of the brain that control language, reasoning, conscious thought, and sensory processing. Symptoms such as memory loss and confusion can grow worse, and people can begin to have problems recognizing familiar persons. Further, people with moderate AD can have hallucinations, delusions, or paranoia or may behave impulsively. Severe AD can include the spread of plaques and tangles throughout the brain, and brain tissue shrinks significantly.

Fenchol has the chemical formula $C_{10}H_{18}O$ and is a natural product found in organisms such as *Cryptomeria japonica* and *Eucalyptus siderophloia*. Fenchol can be found in basil, as well as *eucalyptus* leaves, wild celery, nutmeg, aster flowers, or citrus fruits. Fenchol can be an activator of FFAR2, as it can bind to FFAR2 agonist active sites. (See FIG. 3A-3G.)

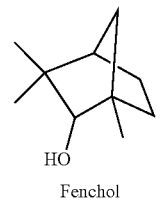

Fenchol

The disclosed compounds can be administered either sequentially or simultaneously in separate or combined pharmaceutical formulations. When one or more of the disclosed compounds is used in combination with a second therapeutic agent, the dose of each compound can be either the same as or differ from that when the compound is used alone. Appropriate doses will be readily appreciated by those skilled in the art.

The term "administration" and variants thereof (e.g., "administering" a compound) in reference to a compound disclosed herein means introducing the compound into the system of the patient in need of treatment. When a compound disclosed herein is provided in combination with one or more other active agents (e.g., a cytotoxic agent, etc.), "administration" and its variants are each understood to include concurrent and sequential introduction of the compound or prodrug thereof and other agents.

Administration can be accomplished by any suitable method and technique presently or prospectively known to those skilled in the art. For example, the disclosed compounds can be formulated in a physiologically- or pharmaceutically-acceptable form and administered by any suitable route known in the art including, for example, oral and parenteral routes of administration. As used herein, the term parenteral includes subcutaneous, intradermal, intravenous, intramuscular, intraperitoneal, and intrasternal administration, such as by injection. Administration of the disclosed compounds or compositions can be a single administration, or at continuous or distinct intervals as can be readily determined by a person skilled in the art.

The compounds disclosed herein, and compositions comprising them, can also be administered utilizing liposome technology, slow release capsules, implantable pumps, and biodegradable containers. These delivery methods can, advantageously, provide a uniform dosage over an extended period of time. The compounds can also be administered in their crystalline forms.

The compounds disclosed herein can be formulated according to known methods for preparing pharmaceutically acceptable compositions. Formulations are described in detail in a number of sources which are well known and readily available to those skilled in the art. For example, *Remington: The Science and Practice of Pharmacy* (1995) describes formulations that can be used in connection with the disclosed methods. In general, the compounds disclosed herein can be formulated such that an effective amount of the compound is combined with a suitable carrier in order to facilitate effective administration of the compound. The compositions used can also be in a variety of forms. These include, for example, solid, semi-solid, and liquid dosage forms, such as tablets, pills, powders, liquid solutions or suspension, suppositories, injectable and infusible solutions, and sprays. The preferred form depends on the intended mode of administration and therapeutic application. Examples of carriers or diluents for use with the compounds include ethanol, dimethyl sulfoxide, glycerol, alumina, starch, saline, and equivalent carriers and diluents. To provide for the administration of such dosages for the desired therapeutic treatment, compositions disclosed herein can advantageously comprise from 0.1% and 100% by weight of the total of one or more of the subject compounds based on the weight of the total composition including carrier or diluent.

Formulations suitable for administration include, for example, aqueous sterile injection solutions, which can contain antioxidants, buffers, bacteriostats, and solutes that render the formulation isotonic with the blood of the intended recipient; and aqueous and nonaqueous sterile suspensions, which can include suspending agents and thickening agents. The formulations can be presented in unit-dose or multi-dose containers, for example sealed ampoules and vials, and can be stored in a freeze dried (lyophilized) condition requiring only the condition of the sterile liquid carrier, for example, water for injections, prior to use. Extemporaneous injection solutions and suspensions can be prepared from sterile powder, granules, tablets, etc. It should be understood that in addition to the ingredients particularly mentioned above, the compositions disclosed herein can include other agents conventional in the art having regard to the type of formulation in question.

Compounds and compositions disclosed herein can be administered intravenously, intramuscularly, or intraperitoneally by infusion or injection. Solutions of the active agent can be prepared in water, optionally mixed with a nontoxic surfactant. Dispersions can also be prepared in glycerol, liquid polyethylene glycols, triacetin, and mixtures thereof and in oils. Under ordinary conditions of storage and use, these preparations can contain a preservative to prevent the growth of microorganisms.

The pharmaceutical dosage forms suitable for injection or infusion can include sterile aqueous solutions or dispersions or sterile powders comprising the active ingredient, which are adapted for the extemporaneous preparation of sterile injectable or infusible solutions or dispersions, optionally encapsulated in liposomes. The ultimate dosage form should be sterile, fluid, and stable under the conditions of manufacture and storage. The liquid carrier or vehicle can be a solvent or liquid dispersion medium comprising, for example, water, ethanol, a polyol (for example, glycerol, propylene glycol, liquid polyethylene glycols, and the like), vegetable oils, nontoxic glyceryl esters, and suitable mixtures thereof. The proper fluidity can be maintained, for example, by the formation of liposomes, by the maintenance of the required particle size in the case of dispersions or by the use of surfactants. Optionally, the prevention of the action of microorganisms can be brought about by various other antibacterial and antifungal agents, for example, parabens, chlorobutanol, phenol, sorbic acid, thimerosal, and the like. In many cases, it will be preferable to include isotonic agents, for example, sugars, buffers, or sodium chloride. Prolonged absorption of the injectable compositions can be brought about by the inclusion of agents that delay absorption, for example, aluminum monostearate and gelatin.

Sterile injectable solutions are prepared by incorporating a compound and/or agent disclosed herein in the required amount in the appropriate solvent with various other ingredients enumerated above, as required, followed by filter sterilization. In the case of sterile powders for the preparation of sterile injectable solutions, the preferred methods of preparation are vacuum drying and the freeze drying techniques, which yield a powder of the active ingredient plus any additional desired ingredient present in the previously sterile-filtered solutions.

Compounds and compositions disclosed herein can be systemically administered, such as intravenously or orally, optionally in combination with a pharmaceutically acceptable carrier such as an inert diluent, or an assimilable edible carrier for oral delivery. They can be enclosed in hard or soft shell gelatin capsules, can be compressed into tablets, or can be incorporated directly with the food of the patient's diet. For oral therapeutic administration, the active compound can be combined with one or more excipients and used in the form of ingestible tablets, buccal tablets, troches, capsules, elixirs, suspensions, syrups, wafers, aerosol sprays, and the like.

The tablets, troches, pills, capsules, and the like can also contain the following: binders such as gum tragacanth, acacia, corn starch or gelatin; excipients such as dicalcium phosphate; a disintegrating agent such as corn starch, potato starch, alginic acid and the like; a lubricant such as magnesium stearate; and a sweetening agent such as sucrose, fructose, lactose or aspartame or a flavoring agent such as peppermint, oil of wintergreen, or cherry flavoring can be added. When the unit dosage form is a capsule, it can contain, in addition to materials of the above type, a liquid carrier, such as a vegetable oil or a polyethylene glycol. Various other materials can be present as coatings or to otherwise modify the physical form of the solid unit dosage form. For instance, tablets, pills, or capsules can be coated with gelatin, wax, shellac, or sugar and the like. A syrup or elixir can contain the active compound, sucrose or fructose as a sweetening agent, methyl and propylparabens as preservatives, a dye and flavoring such as cherry or orange flavor. Of course, any material used in preparing any unit dosage form should be pharmaceutically acceptable and substantially non-toxic in the amounts employed. In addition, the active compound can be incorporated into sustained-release preparations and devices.

For topical administration, compounds and agents disclosed herein can be applied as a liquid or solid. It will generally be desirable to administer them topically to the skin as compositions, in combination with a dermatologically acceptable carrier, which can be a solid or a liquid. Compounds and agents disclosed herein can be applied directly to the growth or infection site.

Useful solid carriers include finely divided solids such as talc, clay, microcrystalline cellulose, silica, alumina, and the like. Useful liquid carriers include water, alcohols or glycols or water-alcohol/glycol blends, in which the compounds can be dissolved or dispersed at effective levels, optionally with the aid of non-toxic surfactants. Adjuvants such as fragrances and additional antimicrobial agents can be added to optimize the properties for a given use. The resultant liquid compositions can be applied from absorbent pads, used to impregnate bandages and other dressings, or sprayed onto the affected area using pump-type or aerosol sprayers, for example.

Thickeners such as synthetic polymers, fatty acids, fatty acid salts and esters, fatty alcohols, modified celluloses or modified mineral materials can also be employed with liquid carriers to form spreadable pastes, gels, ointments, soaps, and the like, for application directly to the skin of the user. Examples of useful dermatological compositions which can be used to deliver a compound to the skin are disclosed in U.S. Pat. Nos. 4,608,392; 4,992,478; 4,559,157; and 4,820,508.

Useful dosages of the compounds and agents and pharmaceutical compositions disclosed herein can be determined by comparing their in vitro activity, and in vivo activity in animal models. Methods for the extrapolation of effective dosages in mice, and other animals, to humans are known to the art.

The dosage ranges for the administration of the compositions are those large enough to produce the desired effect in which the symptoms or disorder are affected. The dosage should not be so large as to cause adverse side effects, such as unwanted cross-reactions, anaphylactic reactions, and the like. Generally, the dosage will vary with the age, condition, sex, and extent of the disease in the patient and can be determined by one of skill in the art. The dosage can be adjusted by the individual physician in the event of any counterindications. Dosage can vary, and can be administered in one or more dose administrations daily, for one or several days.

The dose administered to a patient, particularly a human, should be sufficient to achieve a therapeutic response in the patient over a reasonable time frame, without lethal toxicity, and preferably causing no more than an acceptable level of side effects or morbidity. One skilled in the art will recognize that dosage will depend upon a variety of factors including the condition (health) of the subject, the body weight of the subject, kind of concurrent treatment, if any, frequency of treatment, therapeutic ratio, as well as the severity and stage of the pathological condition.

In some examples, the therapeutically effective amount of fenchol can include a pharmaceutical formulation including a combination of fenchol and a pharmaceutically acceptable carrier. In specific examples, the pharmaceutically acceptable carrier can include a binder, excipient, disintegrating agent, sweetening agent, lubricant, flavoring agent, inert diluent, assimilable edible carrier, or any combination thereof.

As used herein, the term "pharmaceutically acceptable carrier" refers to sterile aqueous or nonaqueous solutions, dispersions, suspensions, or emulsions, as well as sterile powders for reconstitution into sterile injectable solutions or dispersions just prior to use. Pharmaceutically acceptable carriers can include, but are not limited to, inert diluents, assimilable edible carriers, binders, excipients, disintegrating agents, sweetening agents, lubricants, or flavoring agents. Examples of suitable aqueous and nonaqueous carriers, diluents, inert diluents, solvents, assimilable edible carriers, or vehicles include water, ethanol, polyols (such as glycerol, propylene glycol, polyethylene glycol and the like), carboxymethylcellulose and suitable mixtures thereof, vegetable oils (such as olive oil) and injectable organic esters such as ethyl oleate. Proper fluidity can be maintained, for example, by the use of coating materials such as lecithin, by the maintenance of the required particle size in the case of dispersions and by the use of surfactants. These compositions can also contain adjuvants such as preservatives, wetting agents, emulsifying agents, and dispersing agents. Prevention of the action of microorganisms can be ensured by the inclusion of various antibacterial and antifungal agents such as paraben, chlorobutanol, phenol, sorbic acid and the like. It can also be desirable to include isotonic agents such as sugars, sodium chloride and the like. Prolonged absorption of the injectable pharmaceutical form can be brought about by the inclusion of agents, such as aluminum monostearate and gelatin, which delay absorption. Injectable depot forms are made by forming microencapsule matrices of the drug in biodegradable polymers such as polylactide-polyglycolide, poly(orthoesters) and poly(anhydrides). Depending upon the ratio of drug to polymer and the nature of the particular polymer employed, the rate of drug release can be controlled. Depot injectable formulations are also prepared by entrapping the drug in liposomes or microemulsions which are compatible with body tissues. The injectable formulations can be sterilized, for example, by filtration through a bacterial-retaining filter or by incorporating sterilizing agents in the form of sterile solid compositions which can be dissolved or dispersed in sterile water or other sterile injectable media just prior to use. Suitable inert carriers can include sugars such as lactose.

In some examples, binder can include gum tragacanth, acacia, corn starch, gelatin, or any combination thereof. In further examples, excipients can include dicalcium phosphate. In certain examples, disintegrating agent can include corn starch, potato starch, alginic acid, or any combination thereof. In specific examples, sweetening agent can include sucrose, fructose, lactose, aspartame, or any combination thereof. In some examples, lubricant can include magnesium stearate. In further examples, flavoring agent can include peppermint, oil of wintergreen, cherry flavoring, or any combination thereof. In certain examples, inert diluent can include anhydrous lactose, lactose monohydrate, sugar alcohols, such as sorbitol, xylitol, or mannitol, or any combination thereof. In specific examples, assimilable edible carrier can include polysaccharides, polymers, pectin, polypeptides, or any combination thereof.

In some examples, the therapeutically effective amount of fenchol can be from 1 to 1,000 mg in a pill. Further, the therapeutically effective amount of fenchol can be from 1 to 200, 200 to 400, 400 to 600, 600 to 800, or 800 to 1000 mg in a pill. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1000 mg in a pill. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg in a pill.

In some examples, the therapeutically effective amount of fenchol can be from 1 to 5,000 mg per day. Further, the therapeutically effective amount of fenchol can be from 1 to 1,000, 1,000 to 2,000, 2,000 to 3,000, 3,000 to 4,000, or 4,000 to 5,000 mg per day. In certain examples, the therapeutically effective amount of fenchol can be from 1 to 500, 500 to 1,000, 1,000 to 1,500, 1,500 to 2,000, 2,000 to 2,500, 2,500 to 3,000, 3,000 to 3,500, 3,500 to 4,000, 4,000 to 4,500, or 4,500 to 5,000 mg per day. Further, the therapeutically effective amount of fenchol can be from 1 to 200, 200 to 400, 400 to 600, 600 to 800, 800 to 1,000, 1,000 to 1,200, 1,200 to 1,400, 1,400 to 1,600, 1,600 to 1,800, 1,800 to 2,000, 2,000 to 2,200, 2,200 to 2,400, 2,400 to 2,600, 2,600 to 2,800, 2,800 to 3,000, 3,000 to 3,200, 3,200 to 3,400, 3,400 to 3,600, 3,600 to 3,800, 3,800 to 4,000, 4,000 to 4,200, 4,200 to 4,400, 4,400 to 4,600, 4,600 to 4,800, or 4,800 to 5,000 mg per day.

In some examples, the therapeutically effective amount of fenchol can be from 1 to 1,000 mg/kg. Further, the therapeutically effective amount of fenchol can be from 1 to 200, 200 to 400, 400 to 600, 600 to 800, or 800 to 1,000 mg/kg. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1,000 mg/kg. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg/kg.

In some examples, the therapeutically effective amount of fenchol can be from 1 to 200 mg/kg per day. Further, the therapeutically effective amount of fenchol can be from 1 to 50, 50 to 100, 100 to 150, or 150 to 200 mg/kg per day. In certain examples, the therapeutically effective amount of fenchol can be from 1 to 25, 25 to 50, 50 to 75, 75 to 100, 100 to 125, 125 to 150, 150 to 175, or 175 to 200 mg/kg per day. Further, the therapeutically effective amount can be from 1 to 10, 10 to 20, 20 to 30, 30 to 40, 40 to 50, 50 to 60, 60 to 70, 70 to 80, 80 to 90, 90 to 100, 100 to 110, 110 to 120, 120 to 130, 130 to 140, 140 to 150, 150 to 160, 160 to 170, 170 to 180, 180 to 190, or 190 to 200 mg/kg per day.

Method of Activating FFAR2 Signaling

Also provided herein, is a method of activating FFAR2 signaling in a patient, including administering a therapeutically effective amount of fenchol to a patient in need thereof.

In addition to preventing neurodegenerative diseases, activating FFAR2 signaling can be helpful in preventing and/or treating metabolic diseases, such as diabetes and obesity, and/or gastrointestinal disease. In further examples, activating FFAR2 signaling can help in maintaining gut health and immunological modulation. Further, fenchol can have beneficial effects on metabolic health, gut health, and immune health. FFAR2 signaling can also promote cognitive health, and in some examples, can help prevent cognitive decline that resulted as a consequence of normal aging.

Method of Treating Gastrointestinal Disorders

Also provided herein, is a method of treating gastrointestinal disorders in a patient being treated for cancer comprising administering a therapeutically effective amount of fenchol to a patient in need thereof.

Gastrointestinal disorders include, but are not limited to, abdominal cramping, diarrhea, constipation, abdominal pain, ulcers, perforation, excessive gas, bloating, fecal impacting, bowel obstruction, radiation enteritis, heartburn, indigestion, dyspepsia, nausea, vomiting, Non-limiting examples of cancers include Acute granulocytic leukemia, Acute lymphocytic leukemia, Acute myelogenous leukemia (AML), Adenocarcinoma, Adenosarcoma, Adrenal cancer, Adrenocortical carcinoma, Anal cancer, Anaplastic astrocytoma, Angiosarcoma, Appendix cancer, Astrocytoma, Basal cell carcinoma, B-Cell lymphoma, Bile duct cancer, Bladder cancer, Bone cancer Bone marrow cancer, Bowel cancer, Brain cancer, Brain stem glioma, Brain tumor, Breast cancer, Carcinoid tumors, Cervical cancer, Cholangiocarcinoma, Chondrosarcoma, Chronic lymphocytic leukemia (CLL), Chronic myelogenous leukemia (CML), Colon cancer, Colorectal cancer, Craniopharyngioma, Cutaneous lymphoma, Cutaneous melanoma, Diffuse astrocytoma, Ductal carcinoma in situ (DCIS), Endometrial cancer, Ependymoma, Epithelioid sarcoma, Esophageal cancer, Ewing sarcoma, Extrahepatic bile duct cancer, Eye cancer, Fallopian tube cancer, Fibrosarcoma, Gallbladder cancer, Gastric cancer, Gastrointestinal cancer, Gastrointestinal carcinoid cancer, Gastrointestinal stromal tumors (GIST), Germ cell tumor, Gestational Trophoblastic Disease (GTD), Glioblastoma multiforme (GBM), Glioma, Hairy cell leukemia, Head and neck cancer, Hemangioendothelioma, Hodgkin's lymphoma, Hypopharyngeal cancer, Infiltrating ductal carcinoma (IDC), Infiltrating lobular carcinoma (ILC), Inflammatory breast cancer (IBC), Intestinal Cancer, Intrahepatic bile duct cancer, Invasive/infiltrating breast cancer, Islet cell cancer, Jaw/oral cancer, Kaposi sarcoma, Kidney cancer, Laryngeal cancer, Leiomyosarcoma, Leptomeningeal metastases, Leukemia, Lip cancer, Liposarcoma, Liver cancer, Lobular carcinoma in situ, Low-grade astrocytoma, Lung cancer, Lymph node cancer, Lymphoma, Male breast cancer, Medullary carcinoma, Medulloblastoma, Melanoma, Meningioma, Merkel cell carcinoma, Mesenchymal chondrosarcoma, Mesenchymous, Mesothelioma, Metastatic breast cancer, Metastatic melanoma, Metastatic squamous neck cancer, Mixed gliomas, Mouth cancer, Mucinous carcinoma, Mucosal melanoma, Multiple myeloma, Mycosis Fungoides, Myelodysplastic Syndrome, Nasal cavity cancer, Nasopharyngeal cancer, Neck cancer, Neuroblastoma, Neuroendocrine tumors (NETs), Non-Hodgkin's lymphoma, Non-small cell lung cancer (NSCLC), Oat cell cancer, Ocular cancer, Ocular melanoma, Oligodendroglioma, Oral cancer, Oral cavity cancer, Oropharyngeal cancer, Osteogenic sarcoma, Osteosarcoma, Ovarian cancer, Ovarian epithelial cancer, Ovarian germ cell tumor, Ovarian primary peritoneal carcinoma, Ovarian sex cord stromal tumor, Paget's disease, Pancreatic cancer, Papillary carcinoma, Paranasal sinus cancer, Parathyroid cancer, Pelvic cancer, Penile cancer, Peripheral nerve cancer, Peritoneal cancer, Pharyngeal cancer, Pheochromocytoma, Pilocytic astrocytoma, Pineal region tumor, Pineoblastoma, Pituitary gland cancer, Primary central nervous system (CNS) lymphoma, Prostate cancer, Rectal cancer, Renal cell carcinoma, Renal pelvis cancer, Rhabdomyosarcoma, Salivary gland cancer, Sarcoma, Sinus cancer, Skin cancer, Small cell lung cancer (SCLC), Small intestine cancer, Soft tissue sarcoma, Spinal cancer, Spinal column cancer, Spinal cord cancer, Spinal tumor, Squamous cell carcinoma, Stomach cancer, Synovial sarcoma, T-cell lymphoma, Testicular cancer, Throat cancer, Thymoma/thymic carcinoma, Thyroid cancer, Tongue cancer, Tonsil cancer, Transitional cell cancer, Transitional cell cancer, Triple-negative breast cancer, Tubal cancer, Tubular carcinoma, Ureteral cancer, Urethral cancer, Uterine adenocarcinoma, Uterine cancer, Uterine sarcoma, Vaginal cancer, Vulvar cancer, Wilms tumor, Waldenstrom macroglobulinemia, etc., and combinations thereof.

In some examples, treatment for cancer includes chemotherapy, radiation therapy, immunotherapy, or any combination thereof.

As used herein, the term "chemotherapy" or "chemotherapeutic agent" refers to treatment with a cytostatic or cytotoxic agent (e.g., a compound) to reduce or eliminate the growth or proliferation of undesirable cells, for example cancer cells. Thus, as used herein, "chemotherapy" or "chemotherapeutic agent" refers to a cytotoxic or cytostatic agent used to treat a proliferative disorder, for example cancer. The cytotoxic effect of the agent can be, but is not required to be, the result of one or more of nucleic acid intercalation or binding, DNA or RNA alkylation, inhibition of RNA or DNA synthesis, the inhibition of another nucleic acid-related activity (e.g., protein synthesis), or any other cytotoxic effect.

Thus, a "cytotoxic agent" can be any one or any combination of compounds also described as "antineoplastic" agents or "chemotherapeutic agents." Such compounds include, but are not limited to, DNA damaging compounds and other chemicals that can kill cells. "DNA damaging chemotherapeutic agents" include, but are not limited to, alkylating agents, DNA intercalators, protein synthesis inhibitors, inhibitors of DNA or RNA synthesis, DNA base analogs, topoisomerase inhibitors, and telomerase inhibitors or telomeric DNA binding compounds. For example, alkylating agents include alkyl sulfonates, such as busulfan, improsulfan, and piposulfan; aziridines, such as a benzodizepa, carboquone, meturedepa, and uredepa; ethylenimines and methylmelamines, such as altretamine, triethylenemelamine, triethylenephosphoramide, triethylenethiophosphoramide, and trimethylolmelamine; nitrogen mustards such as chlorambucil, chlornaphazine, cyclophosphamide, estramustine, iphosphamide, mechlorethamine, mechlorethamine oxide hydrochloride, melphalan, novembichine, phenesterine, prednimustine, trofosfamide, and uracil mustard; and nitroso ureas, such as carmustine, chlorozotocin, fotemustine, lomustine, nimustine, and ranimustine.

As used herein, "radiation therapy" refers to the use of high-energy radiation from x-rays, gamma rays, neutrons, protons, and other sources to kill cancer cells and shrink tumors. Radiation can come from a machine outside the body (e.g., external-beam radiation therapy), or it may come from radioactive material paced in the body near cancer cells (internal radiation therapy or brachytherapy). Systemic radiation therapy can use a radioactive substance, such as a radiolabeled monoclonal antibody, that travels in the blood to tissues throughout the body.

As used herein, "immunotherapy" refers to a type of therapy to stimulate or suppress the immune system to help a patient fight cancer, infection, or other diseases. In some examples, immunotherapy can only target certain cells of the immune system. In further examples, the immunotherapy affects the immune system in a general way. Immunotherapy can include cytokines, vaccines, bacillus Calmete-Guerin (BCG), and some monoclonal antibodies. Immunotherapies used to treat cancer can include immune checkpoint inhibitors, T-cell transfer therapy, monoclonal antibodies, treatment vaccines, and immune system modulators.

In further examples, the therapeutically effective amount can be from 1 to 2,000 mg in a pill, 1 to 5,000 mg per day, 1 to 1,000 mg/kg, or 1 to 200 mg/kg per day.

In some examples, the therapeutically effective amount of fenchol can be from 1 to 200, 200 to 400, 400 to 600, 600 to 800, or 800 to 1000 mg in a pill. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1000 mg in a pill. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg in a pill.

In some examples, the therapeutically effective amount of fenchol can be from 1 to 1,000, 1,000 to 2,000, 2,000 to 3,000, 3,000 to 4,000, or 4,000 to 5,000 mg per day. In certain examples, the therapeutically effective amount of fenchol can be from 1 to 500, 500 to 1,000, 1,000 to 1,500, 1,500 to 2,000, 2,000 to 2,500, 2,500 to 3,000, 3,000 to 3,500, 3,500 to 4,000, 4,000 to 4,500, or 4,500 to 5,000 mg per day. Further, the therapeutically effective amount of fenchol can be from 1 to 200, 200 to 400, 400 to 600, 600 to 800, 800 to 1,000, 1,000 to 1,200, 1,200 to 1,400, 1,400 to 1,600, 1,600 to 1,800, 1,800 to 2,000, 2,000 to 2,200, 2,200 to 2,400, 2,400 to 2,600, 2,600 to 2,800, 2,800 to 3,000, 3,000 to 3,200, 3,200 to 3,400, 3,400 to 3,600, 3,600 to 3,800, 3,800 to 4,000, 4,000 to 4,200, 4,200 to 4,400, 4,400 to 4,600, 4,600 to 4,800, or 4,800 to 5,000 mg per day.

In some examples, the therapeutically effective amount of fenchol can be from 1 to 200, 200 to 400, 400 to 600, 600 to 800, or 800 to 1,000 mg/kg. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1,000 mg/kg. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg/kg.

In some examples, the therapeutically effective amount of fenchol can be from 1 to 50, 50 to 100, 100 to 150, or 150 to 200 mg/kg per day. In certain examples, the therapeutically effective amount of fenchol can be from 1 to 25, 25 to 50, 50 to 75, 75 to 100, 100 to 125, 125 to 150, 150 to 175, or 175 to 200 mg/kg per day. Further, the therapeutically effective amount can be from 1 to 10, 10 to 20, 20 to 30, 30 to 40, 40 to 50, 50 to 60, 60 to 70, 70 to 80, 80 to 90, 90 to 100, 100 to 110, 110 to 120, 120 to 130, 130 to 140, 140 to 150, 150 to 160, 160 to 170, 170 to 180, 180 to 190, or 190 to 200 mg/kg per day.

Method of Improving Cognition

Also provided herein is a method of improving cognition in a patient being treated for cancer, including administering a therapeutically effective amount of fenchol to a patient in need thereof. In some examples, treatment for cancer can include chemotherapy, radiation therapy, immunotherapy, or any combination thereof. In further examples, improving cognition in a patient can include modulating, altering, or adjusting cognition in a patient. In certain examples, cognition can relate to confusion, concentration, learning new skills, multitasking, mental fogginess, attention span, short-term memory, completing routine tasks, verbal memory, visual memory, or any combination thereof. A patient can be more likely to require improvement of cognition when undergoing high doses of chemotherapy or radiation or radiation therapy to the brain. In some examples, a therapeutically effective amount of fenchol can include 1 to 2,000 mg in a pill, 1 to 5,000 mg per day, 1 to 1,000 mg/kg, or 1 to 200 mg/kg per day.

In some examples, the therapeutically effective amount of fenchol can be from 1 to 200, 200 to 400, 400 to 600, 600 to 800, or 800 to 1000 mg in a pill. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1000 mg in a pill. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg in a pill.

In some examples, the therapeutically effective amount of fenchol can be from 1 to 1,000, 1,000 to 2,000, 2,000 to 3,000, 3,000 to 4,000, or 4,000 to 5,000 mg per day. In certain examples, the therapeutically effective amount of fenchol can be from 1 to 500, 500 to 1,000, 1,000 to 1,500, 1,500 to 2,000, 2,000 to 2,500, 2,500 to 3,000, 3,000 to 3,500, 3,500 to 4,000, 4,000 to 4,500, or 4,500 to 5,000 mg per day. Further, the therapeutically effective amount of fenchol can be from 1 to 200, 200 to 400, 400 to 600, 600 to 800, 800 to 1,000, 1,000 to 1,200, 1,200 to 1,400, 1,400 to 1,600, 1,600 to 1,800, 1,800 to 2,000, 2,000 to 2,200, 2,200 to 2,400, 2,400 to 2,600, 2,600 to 2,800, 2,800 to 3,000, 3,000 to 3,200, 3,200 to 3,400, 3,400 to 3,600, 3,600 to 3,800, 3,800 to 4,000, 4,000 to 4,200, 4,200 to 4,400, 4,400 to 4,600, 4,600 to 4,800, or 4,800 to 5,000 mg per day.

In some examples, the therapeutically effective amount of fenchol can be from 1 to 200, 200 to 400, 400 to 600, 600 to 800, or 800 to 1,000 mg/kg. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1,000 mg/kg. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg/kg.

In some examples, the therapeutically effective amount of fenchol can be from 1 to 50, 50 to 100, 100 to 150, or 150 to 200 mg/kg per day. In certain examples, the therapeutically effective amount of fenchol can be from 1 to 25, 25 to 50, 50 to 75, 75 to 100, 100 to 125, 125 to 150, 150 to 175, or 175 to 200 mg/kg per day. Further, the therapeutically effective amount can be from 1 to 10, 10 to 20, 20 to 30, 30 to 40, 40 to 50, 50 to 60, 60 to 70, 70 to 80, 80 to 90, 90 to 100, 100 to 110, 110 to 120, 120 to 130, 130 to 140, 140 to 150, 150 to 160, 160 to 170, 170 to 180, 180 to 190, or 190 to 200 mg/kg per day.

Methods of Treating Other Indications

Also provided herein, are methods of treating other indications, including methods of treating conditions relating to immune regulation, gut hormonal synthesis, intestinal epithelial integrity and inflammation, neurophysiology, adipogenesis and lipolysis, and regulating pancreatic beta-cell proliferation and functions, by administering a therapeutically effective amount of fenchol. As an agonist of FFAR2 inhibitor, fenchol can be administered to treat numerous disorders, as described in Mishra et al., (2020). This reference is incorporated herein for conditions mediated by FFAR2. Fenchol can be used to activate FFAR2 when administered in dosages of from 1 to 2,000 mg in a pill, 1 to 5,000 mg per day, 1 to 1,000 mg/kg, or 1 to 200 mg/kg per day.

In some examples, the therapeutically effective amount of fenchol can be from 1 to 200, 200 to 400, 400 to 600, 600 to 800, or 800 to 1000 mg in a pill. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1000 mg in a pill. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg in a pill.

In some examples, the therapeutically effective amount of fenchol can be from 1 to 1,000, 1,000 to 2,000, 2,000 to 3,000, 3,000 to 4,000, or 4,000 to 5,000 mg per day. In certain examples, the therapeutically effective amount of fenchol can be from 1 to 500, 500 to 1,000, 1,000 to 1,500, 1,500 to 2,000, 2,000 to 2,500, 2,500 to 3,000, 3,000 to 3,500, 3,500 to 4,000, 4,000 to 4,500, or 4,500 to 5,000 mg per day. Further, the therapeutically effective amount of fenchol can be from 1 to 200, 200 to 400, 400 to 600, 600 to 800, 800 to 1,000, 1,000 to 1,200, 1,200 to 1,400, 1,400 to 1,600, 1,600 to 1,800, 1,800 to 2,000, 2,000 to 2,200, 2,200 to 2,400, 2,400 to 2,600, 2,600 to 2,800, 2,800 to 3,000, 3,000 to 3,200, 3,200 to 3,400, 3,400 to 3,600, 3,600 to 3,800, 3,800 to 4,000, 4,000 to 4,200, 4,200 to 4,400, 4,400 to 4,600, 4,600 to 4,800, or 4,800 to 5,000 mg per day.

In some examples, the therapeutically effective amount of fenchol can be from 1 to 200, 200 to 400, 400 to 600, 600 to 800, or 800 to 1,000 mg/kg. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1,000 mg/kg. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg/kg.

In some examples, the therapeutically effective amount of fenchol can be from 1 to 50, 50 to 100, 100 to 150, or 150 to 200 mg/kg per day. In certain examples, the therapeutically effective amount of fenchol can be from 1 to 25, 25 to 50, 50 to 75, 75 to 100, 100 to 125, 125 to 150, 150 to 175, or 175 to 200 mg/kg per day. Further, the therapeutically effective amount can be from 1 to 10, 10 to 20, 20 to 30, 30 to 40, 40 to 50, 50 to 60, 60 to 70, 70 to 80, 80 to 90, 90 to 100, 100 to 110, 110 to 120, 120 to 130, 130 to 140, 140 to 150, 150 to 160, 160 to 170, 170 to 180, 180 to 190, or 190 to 200 mg/kg per day.

Composition

Pharmaceutical Composition

Provided herein is a pharmaceutical composition, including fenchol and an Alzheimer's disease drug. In some examples, the Alzheimer's disease drug can include aducanumab, rivastigmine, memantine, donepezil, galantamine, or any combination thereof. In some examples, the Alzheimer's drug can include aducanumab. In further examples, the Alzheimer's disease drug can include rivastigmine. In certain examples, the Alzheimer's disease drug can include memantine. In some examples, the Alzheimer's disease drug can include donepezil. In specific examples, the Alzheimer's disease drug can include a combination of memantine and donepezil. In some examples, the Alzheimer's disease drug can include galantamine.

As of present, there are no known drugs that cure Alzheimer's disease, but there are drugs that can relieve the symptoms of Alzheimer's disease. Some AD drugs can relieve symptoms of AD by preventing the enzyme acetylcholinesterase from breaking down acetylcholine. Other AD drugs can relieve symptoms of AD by blocking nerve cells from the effects of too much glutamate. Further, at least one known AD drug can relieve symptoms by removing the accumulated AD plaque on the brain of the patient.

Aducanumab is an amyloid beta-directed monoclonal antibody that targets aggregated forms of amyloid beta found in the brains of patients with Alzheimer's disease. Rivastigmine is in the class of medications called cholinesterase inhibitors and acts by preventing the enzyme acetylcholinesterase from breaking down acetylcholine. Memantine acts via blocking the flow through channels of N-methyl-d-aspartate (NMDA) receptors, which is a subfamily of glutamate receptors involved in brain function. Donepezil is also a cholinesterase inhibitor and acts via a similar mechanism as rivastigmine. Galantamine is also a cholinesterase inhibitor and acts via a similar mechanism as rivastigmine.

Also disclosed herein are compositions comprising fenchol and one or more of the compounds norpseudoephedrine hydrochloride, 7-hydroxycamphene, ephedrine, octopamine hydrochloride, (±)-carvomenthol, 4-carene, 3-pinanone, synephrine, borneol, darwinol, beta-terpineol, synephrine, (+)-fenchone, or L-leucinamide hydrochloride.

Nasal Spray

Also provided herein, is a nasal spray including fenchol. Nasal spray as used herein is a spray composition that is suitable for spraying into one or both nostrils and is safe for contact with mucous membranes within the nasal cavities.

The nasal spray can further include a pharmaceutically acceptable buffer in order to maintain the desired pH. Non-limiting examples of suitable buffers used to adjust and maintain the pH of the composition include acetate, citrate, prolamine, phosphate, carbonate, phthalate, borate, or other pharmaceutically acceptable buffers and mixtures thereof. In a particular example, the buffer comprises sodium phosphate. The pH of the composition is maintained generally to be compatible with the fluids of the nasal membrane in order to minimize irritation. The concentration of the buffer in the composition will depend upon the selection of the buffer and the desired pH.

The present composition may also contain various pharmaceutically acceptable additives such as tolerance enhancers (also known as humectants), absorption enhancers (also known as surfactants), preservatives, viscosity modifying agents (e.g., thickening agents), osmolarity adjusters, complexing agents, stabilizers, solubilizers, or any combination thereof.

A tolerance enhancer may be used in order to inhibit drying of the nasal membrane or mucosa. A tolerance enhancer may also serve the purpose of inhibiting or relieving irritation of the nasal membranes. Examples of suitable tolerance enhancers include, for example, humectants such as sorbitol, propylene glycol, glycerol, glycerin, hyaluronan, aloe, mineral oil, vegetable oil, soothing agents, membrane conditioners, sweeteners, and mixtures thereof. The selection and concentration of a tolerance enhancer may depend on a number of factors, including, for example, the concentration of fenchol compound being used in the composition.

A surfactant or absorption enhancer may also be used in the composition in order to enhance the absorption of the fenchol compound across the nasal membrane. Suitable absorption enhancers include non-ionic, anionic, and cationic surfactants. Any of a number of well-known surfactants may be used, including, for example, polyoxyethylene derivatives of fatty acids, partial esters of sorbitol anhydrides, sodium lauryl sulfate, sodium salicylate, oleic acid, lecithin, dehydrated alcohol, Tween (e.g., Tween 20, Tween 40, Tween 60, Tween 80 and the like), Span (e.g., Span 20, Span 40, Span 80 and the like), polyoxyl 40 stearate, polyoxy ethylene 50 stearate, edetate disodium, propylene glycol, glycerol monooleate, fusieates, bile salts, octoxynol and combinations thereof.

A pharmaceutically acceptable thickening agent may also be used in the composition in order to modify the viscosity of the composition. Numerous pharmaceutically acceptable thickening agents are well-known and include, for example, methyl cellulose, xanthan gum, carboxymethyl cellulose, hydroxypropyl cellulose, carbomer, polyvinyl alcohol, alginates, acacia, chitosans and combinations thereof. The concentration of the thickening agent will depend upon the agent selected and the viscosity desired.

A preservative may also be employed to increase the shelf-life of the composition. A number of well-known and pharmaceutically acceptable preservatives may be used in the present composition, including, for example, parabens, thimerosal, chlorobutanol, benzalkonium chloride, or benzyl alcohol and combinations thereof. Other ingredients which extend shelf life can be added such as for example, antioxidants. Examples of antioxidants include sodium metabisulfite, potassium metabisulfite, ascorbyl palmitate and other pharmaceutically acceptable antioxidants.

A suitable concentration of preservative will depend on a number of factors, including, for example, the particular preservative selected, the intended shelf-life of the composition, and the results of preservative effectiveness and minimum preservative studies.

Alternatively, the nasal spray may be formulated to be a sterile, preservative-free composition. While preservatives may extend the shelf life of a composition, they may also cause or exacerbate irritation to the nasal membranes.

Buccal Tablet

Also provided herein, is a buccal tablet including fenchol. A buccal tablet administered at the buccal cavity, the space between the cheek and the gum, is flanged on one side by the gum tissues and the other side by the cheek tissues or membranes, such as membranes in the mouth. The absorption of a drug, such as fentanyl citrate, in the buccal tissues and membrane begins the moment the drug comes out of the surface of the tablet or on the surface of the tablet itself. Such microscopic absorption of drug can be accelerated by a base (such as when the drug is a base) or an acid (such as when the drug is an acid). Similarly, the absorption of the drug can be decelerated by use of use a disintegrant and a buffer in combination with an acid (such as when the drug is a base) or a base (such as when the drug is an acid).

The buccal tablet can include an excipient (non-active ingredient) used as the carrier or filler or matrix material. Other adjuvants, such as disintegrants, glidants, diluents, or lubricants, or a combination thereof, can also be present, as well as the more conventional colorants, flavorings, sweeteners, or other organoleptically-effecting materials, or a combination thereof.

Pharmaceutical compositions disclosed in the invention may be prepared, packaged, or sold in formulations suitable for oral administration. The formulations of the pharmaceutical compositions described herein may be prepared by any method known or hereafter developed. In general, preparation includes bringing the active ingredient into association with a carrier or one or more other additional components, and then, if necessary or desirable, shaping or packaging the product into a desired single- or multi-dose unit.

As used herein, "additional components" include, but are not limited to, one or more of the following: excipients; surface active agents; dispersing agents; inert diluents; granulating and disintegrating agents; binding agents; lubricating agents; sweetening agents; flavoring agents; coloring agents; preservatives; physiologically degradable compositions such as gelatin; aqueous vehicles and solvents; oily vehicles and solvents; suspending agents; dispersing or wetting agents; demulcents; buffers; salts; thickening agents; fillers; emulsifying agents; antioxidants; stabilizing agents; pharmaceutically acceptable polymeric or hydrophobic materials, as well as other components and agents.

A tablet comprising the drug may be made, for example, by compressing or molding the drug, optionally containing one or more additional components. Compressed tablets may be prepared by compressing, in a suitable device, the drug in a free-flowing form such as a powder or granular preparation, and then optionally mixing with one or more of a binder, a lubricant, a glidant, an excipient, a surface active agent and a dispersing agent. Molded tablets may be made by molding in a suitable device, a mixture of the drug, a pharmaceutically acceptable carrier, and at least sufficient liquid to moisten the mixtures.

Tablets may further comprise a sweetening agent, a flavoring agent, a coloring agent, a preservative, or some combination of these in order to provide pharmaceutically elegant and palatable preparations.

Hard capsules comprising the pharmaceutical agent may be made using a physiologically degradable composition, such as gelatin. Such hard capsules comprise the active ingredient, and may further comprise additional components including, for example, an inert solid diluent. Soft gelatin capsules comprising the pharmaceutical agent may also be made using a physiologically degradable composition, such as gelatin. Such soft capsules comprise the pharmaceutical agent, which may be mixed with water or an oil medium.

Tablets and pills of the present invention can additionally be prepared with release-controlling coatings. Such a coating may be colored with a pharmaceutically accepted dye. The amount of dye and other excipients in the coating may vary. The coating generally comprises film-forming polymers such as hydroxy-propyl cellulose, hydroxypropylmethyl cellulose, cellulose ester, or ether, in acrylic polymer or a mixture of polymers. The coating solution is generally an aqueous solution that may further comprise propylene glycol, sorbitan monooleate, sorbic acid, or fillers such as titanium dioxide, a pharmaceutically acceptable dye.

The solid pharmaceutical compositions of the present invention may further include diluents. Diluents for solid compositions include, for example, microcrystalline cellulose (e.g. AVICEL™), silicified microcrystalline cellulose, microfine cellulose, lactose, starch, pregelatinized starch, calcium sulfate, sugar, dextrates, dextrin, dextrose, dibasic calcium phosphate dihydrate, tribasic calcium phosphate, kaolin, magnesium oxide, maltodextrin, mannitol, dextrates (e. g. EMDEX™), hydrated dextrates, polymethacrylates (e.g. EUDRAGIT™), potassium chloride, powdered cellulose, sodium chloride, sorbitol and talc.

Solid pharmaceutical compositions of the present invention may further include binders, e.g., acacia, alginic acid, carbomer (e.g., carbopol), carboxymethylcellulose sodium, dextrin, ethyl cellulose, gelatin, guar gum, hydrogenated vegetable oil, hydroxyethyl cellulose, hydroxypropyl cellulose (e.g., KLUCEL™), hydroxypropyl methyl cellulose (e.g. METHOCEL™), liquid glucose, magnesium aluminum silicate, maltodextrin, methylcellulose, polymethacrylates, povidone (e.g., KOLLIDON™, PLASDONE™), pregelatinized starch, sodium alginate and starch.

Solid pharmaceutical compositions of the present invention may further include disintegrants such as alginic acid, carboxymethylcellulose calcium, carboxymethylcellulose sodium (e.g., AC-DI-SOL™, PRIMELLOSE™), colloidal silicon dioxide, croscarmellose sodium, crospovidone (e.g., KOLLIDON™, POLYPLASDONE™), guar gum, magnesium aluminum silicate, methyl cellulose, polacrilin potassium, powdered cellulose, pregelatinized starch, sodium alginate, sodium starch glycolate (e.g., EXPLOTAB™), hydroxypropylcellulose, methylcellulose, povidone or starch. Glidants, such as, colloidal silicon dioxide, magnesium trisilicate, powdered cellulose, starch, talc, and tribasic calcium phosphate may also be added.

Other pharmaceutical additives of the present invention may include: (i) lubricants such as magnesium stearate, calcium stearate, glyceryl monostearate, glyceryl palmitostearate, hydrogenated castor oil, hydrogenated vegetable oil, mineral oil, polyethylene glycol, sodium benzoate, sodium lauryl sulfate, sodium stearyl fumarate, stearic acid, talc and zinc stearate; (ii) flavoring agents and flavor enhancers such as vanillin, ethyl vanillin, menthol, citric acid, fumaric acid ethyl maltitol, and tartaric acid; (iii) pharmaceutically acceptable colorants; (iv) artificial sweeteners such as polyhydric alcohols, e.g., sorbitol, mannitol, xylitol, saccharin, saccharin sodium, aspartame, sucralose and maltitol; and, (v) natural sweeteners, such as glucose, fructose, sucrose and the like.

The dosage unit should have dimensions which fit conveniently into the oral cavity.

In some examples, fenchol may be administered topically. As used herein, "topical administration" refers to administration onto any accessible body surface of any human or animal species, for example, the skin or mucosal epithelia. In certain examples of this invention, "topical" refers to an external application to the skin epithelium. In some examples, the invention can be directed to a composition for topical administration, wherein the composition includes one or more pharmaceutically acceptable excipients and a therapeutically effective amount of fenchol.

The fenchol composition to be administered topically can take the form of a semi-solid preparation, such as a gel, paste, or ointment, a pourable preparation, such as a lotion, or a foam. s used herein, "semi-solid" is understood to refer to the rheological properties of the formulations themselves, such that the formulations will flow under an applied force but will remain in situ following application to any accessible body surface. As used herein, a "lotion" is a dermatological vehicle that is a pourable suspension of insoluble powder in a liquid. As used herein, a "gel" is a semi-solid vehicle that consists of a liquid phase that is constrained within a three-dimensional polymeric network. The polymeric network may be formed by chemical (covalent cross-links) or physical (hydrogen bonds, Van der Waals forces) interactions between polymer chains (more correctly, between functional groups on polymer chains). Where the liquid phase is non-aqueous, the gel is an organogel. Oleogels are lipophilic gels whose bases typically consist of liquid paraffin with polyethylene or fatty oils gelled with colloidal silica or a long-chain fatty acid soap. As used herein, an "ointment" base is a semi-solid vehicle composed of hydrophobic constituents. Ointments can take the form of non-hydrocarbon ointment. Ointments related to the present invention can be formulated to provide a non-greasy, cosmetically acceptable appearance. As used herein, a "paste" is an ointment with a high loading of insoluble solids (up to 50% by weight) that forms a structured particulate matrix. As used herein, a "foam" is a disperse system consisting of a three dimensional network of films in air. Foams have a high surface area and tend to spontaneous collapse unless stabilized.

"Pharmaceutically acceptable excipient" or "excipient" includes without limitation any inactive material that is combined with a fenchol compound of the invention in order to produce a drug dosage form for topical administration. The term "pharmaceutically acceptable excipient" is intended to include, but is not limited to, any solvents, penetration enhancing agents, antioxidants, stiffening agents (e.g., thickeners), ointment bases, protectives, adsorbents, demulcents, emollients, preservatives, moisturizers, buffers, adjuvants, bioavailability enhancers, carriers, glidants, sweetening agents, diluents, dye/colorants, flavor enhancers, solubilizers (including surfactants), wetting agents, dispersing agents, suspending agents, stabilizers and isotonic agents, which have been approved by a regulatory agency, such as for example, but is not limited to, the United States Food and Drug Administration, the European Medicines Agency or Health Canada, as being acceptable for use in a formulation for the topical administration of a pharmacologically active ingredient, and/or are considered as Generally Recognized As Safe materials (GRAS materials), and/or are listed in the Inactive Ingredients Guide published by the United States Food and Drug Administration. "Pharmaceutically acceptable excipient" can also comprise the acceptable excipients listed in *Remington: The Science and Practice of Pharmacy*. Exemplary pharmaceutically acceptable excipients include, but are not limited to, the following: ascorbic acid and esters; benzyl alcohol; benzyl benzoate; butylated hydroxytoluene ("BHT"); butylated hydroxyanisole ("BHA"); caprylic/capric triglyceride; cetyl alcohol; chelating agents (e.g., EDTA and citric acid); cholesterol; cross-linked acrylic acid based polymers (e.g., Carbopol™); decyl methyl sulfoxide; diethyl sebacate; dimethylamine ("DMA"); dimethicone; dimethyl sulfoxide; diethylene glycol mono ether (e.g., Transcutol™ P); diisopropyl adipate (e.g., Ceraphyl™ 230); ethanol; flavinoid; glutathione; glycerine; glycerol oleate/propylene glycol (e.g., Arlacel 186); glycerol monooleate; glyceryl caprylate/caprate and PEG-8 (polyethylene glycol) caprylate/caprate complex; carpylocaproyl macrogolglycerides (e.g., Labrasol™); glyceryl monocaprylate (e.g., Capmul™ MCM C8); glyceryl monolinoleate (e.g., Maisine™ 35-1); glyceryl monooleate (e.g., Peceol™); glyceryl monostearate; hexylene glycol; hydroxypropyl-β-cyclodextrin (HP-β-CD); isopropyl alcohol; isopropyl myristate; laurocapram; (e.g., Azone™); lauroyl macrogol-32 glycerides (e.g. Gelucire™ 44/14); macrogol-15 hydroxystearate (e.g., Solutol™ HS15); medium chain triglycerides (e.g., Miglyol™ 810, Miglyol™ 840 or Miglyol™ 812); methyl laurate; N-methyl-2-pyrrolidine (e.g., Pharmasolve™); mineral oil; mono diglycerides (e.g., Capmul™ MCM); octyldodecanol; oleic acid; oleyl alcohol; peanut oil; 1,2-pentanediol; polysorbates (e.g., Tween™ 80); polyethylene glycol (e.g., PEG-8, PEG 400, PEG1000, PEG 3350, PEG 6000, or Lutrol™ E 400); polyoxyl 35 castor oil (e.g., Cremophor™ EL); polyoxyl 40 hydrogenated castor oil (e.g., Cremophor™ RH 40); propylene glycol; propylene glycol diacetate; propylene glycol monocaprylate (e.g., Capmul PG-8, Capryol 90); propylene glycol monolaurate (e.g., Capmul PG-12); propylene glycol monooleate; 2-pyrrolidone; soybean oil; stearyl alcohol; sulfobutylether-β-cyclodextrin (e.g., Capitsol™); tocopherols (e.g., Vitamin E acetate); α-tocopherol polyethylene glycol succinate (TPGS); water, and white petrolatum.

"Solvents" refer to substances that readily dissolve other substances, such as fenchol in order to form a solution. Suitable solvents for the purposes of this invention include polyethylene glycol (e.g., PEG 400, PEG 100, and PEG 3350), diethylene glycol monoethyl ether (e.g., Transcutol™), Tween 80, alcohols (e.g., oleyl alcohol, and stearyl alcohol), Labrasol™, caprylic/capric triglyceride, fatty acid esters (e.g., isopropyl myristate, and diisopropyl adipate (e.g., Ceraphyl™ 230)), diethyl sebacate, propylene glycol monocaprylate (e.g., Capmul™ PG-8), propylene glycol laurate (e.g., Capmul™ PG-12), mono diglycerides (e.g., Capmul™ MCM), glyceryl monocaprylate (e.g., Capmul™ MCM C8), medium chain triglycerides, hexylene glycol, glyceryl mono-oleate (e.g., Peceol™), 1,2-pentanediol, octyldodecanol, glyceryl mono-linoleate (e.g., Maisine™ 35-1), isopropyl alcohol, glycerol oleate/propylene glycol (e.g., Arlacel™ 186), mineral oil, water, and glycerine.

"Penetration enhancing agents" refer to substances that increase the permeability of the skin or mucosa to a pharmacologically active ingredient, such as fenchol, so as to increase the rate at which the active ingredient permeates through the skin or mucosa of a mammal. Suitable penetration enhancing agents for the purposes of this invention include, but are not limited to, dimethyl sulfoxide (DMSO), decylmethylsulfoxide, laurocapram (e.g., AZONE™), pyrrolidones (e.g., 2-pyrrolidone, and N-methyl-2-pyrrolidine (PHARMASOLVE™)), surfactants, alcohols (e.g., oleyl alcohol), oleic acid, polyethylene glycol (e.g., PEG 400), diethylene glycol monoethyl ether (e.g., TRANSCUTOL™), and fatty acid esters (e.g., isopropyl myristate, methyl laurate, glycerol monooleate, and propylene glycol monooleate). A penetration enhancing agent may be used independently or more than one may be used in a pharmaceutical composition of the invention.

"Ointment bases" refers to substances that function as a carrier and enhance penetration into the skin in order to deliver a pharmacologically active ingredient, such as fenchol, to the area to be treated in the mammal. Suitable "ointment bases" for the purposes of this invention include, but are not limited to, polyethylene glycols (e.g., PEG 400 and PEG 3350). An ointment base may be used independently or more than one may be used in a pharmaceutical composition of the invention.

"Stiffening agents" refers to substances which increase the viscosity and/or physical stability of a pharmaceutical composition of the invention. Suitable "stiffening agents" for the purposes of this invention include, but are not limited to, stearyl alcohol, carbopols, dimethicone and polymers. A stiffening agent may be used independently or more than one may be used in a pharmaceutical composition of the invention.

"Antioxidants" refers to substances which are capable of preventing the oxidation of another molecule. Suitable "antioxidants" for the purposes of this invention include, but are not limited to, butylated hydroxytoluene (BHT), butylated hydroxyanisole (BHA), tocopherols (e.g., Vitamin E acetate), flavinoid, glutathione, ascorbic acid, and its esters, DMSO, and chelating agents (e.g., EDTA and citric acid).

"Pharmaceutically acceptable salt" includes both acid and base addition salts.

"Pharmaceutically acceptable acid addition salt" refers to those salts which retain the biological effectiveness and properties of the free bases, which are not biologically or otherwise undesirable, and which are formed with inorganic acids such as, but are not limited to, hydrochloric acid, hydrobromic acid, sulfuric acid, nitric acid, phosphoric acid and the like, and organic acids such as, but not limited to, acetic acid, 2,2-dichloroacetic acid, adipic acid, alginic acid, ascorbic acid, aspartic acid, benzenesulfonic acid, benzoic acid, 4-acetamidobenzoic acid, camphoric acid, camphor-10-sulfonic acid, capric acid, caproic acid, caprylic acid, carbonic acid, cinnamic acid, citric acid, cyclamic acid, dodecylsulfuric acid, ethane-1,2-disulfonic acid, ethanesulfonic acid, 2-hydroxyethanesulfonic acid, formic acid, fumaric acid, galactaric acid, gentisic acid, glucoheptonic acid, gluconic acid, glucuronic acid, glutamic acid, glutaric acid, 2-oxo-glutaric acid, glycerophosphoric acid, glycolic acid, hippuric acid, isobutyric acid, lactic acid, lactobionic acid, lauric acid, maleic acid, malic acid, malonic acid, mandelic acid, methanesulfonic acid, mucic acid, naphthalene-1,5-disulfonic acid, naphthalene-2-sulfonic acid, 1-hydroxy-2-naphthoic acid, nicotinic acid, oleic acid, orotic acid, oxalic acid, palmitic acid, pamoic acid, propionic acid, pyroglutamic acid, pyruvic acid, salicylic acid, 4-aminosalicylic acid, sebacic acid, stearic acid, succinic acid, tartaric acid, thiocyanic acid, p-toluenesulfonic acid, trifluoroacetic acid, and undecylenic acid.

"Pharmaceutically acceptable base addition salt" refers to those salts which retain the biological effectiveness and properties of the free acids, which are not biologically or otherwise undesirable. These salts are prepared from addition of an inorganic base or an organic base to the free acid. Salts derived from inorganic bases include, but are not limited to, the sodium, potassium, lithium, ammonium, calcium, magnesium, iron, zinc, copper, manganese, aluminum salts and the like. Salts derived from organic bases include, but are not limited to, salts of primary, secondary, and tertiary amines, substituted amines including naturally occurring substituted amines, cyclic amines and basic ion exchange resins, such as ammonia, isopropylamine, trimethylamine, diethylamine, triethylamine, tripropylamine, diethanolamine, ethanolamine, deanol, 2-dimethylaminoethanol, 2-diethylaminoethanol, dicyclohexylamine, lysine, arginine, histidine, caffeine, procaine, hydrabamine, choline, betaine, benethamine, benzathine, ethylenediamine, glucosamine, methylglucamine, theobromine, triethanolamine, tromethamine, purines, piperazine, piperidine, N-ethylpiperidine, and polyamine resins.

In further examples, fenchol may be administered in gum. As used herein, gum refers to chewing gum containing a therapeutically effective amount of fenchol, wherein the chewing gum can be used as a means of administering the fenchol to a patient. Gum as distributed to the patient can include a gum structure, which includes, but is not limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum.

Finished gum refers to a gum structure that is generally ready for preparation to distribute the product to the consumer. As such, a finished gum may still require temperature conditioning, forming, shaping, packaging, and coating. However, the gum composition itself is generally finished. Not all finished gums have the same ingredients or the same amounts of individual ingredients. By varying the ingredients and amounts of ingredients, textures, flavor, and sensations, among other things, can be varied to provide differing characteristics to meet the needs of users.

Gum can include a water soluble bulk portion, a water insoluble gum base portion, and one or more flavoring agents. The water soluble portion dissipates over a period of time during chewing. The gum base portion is retained in the mouth throughout the chewing process. A finished gum is typically ready for user consumption.

A "finished gum base", as used herein, refers to a gum structure that includes a sufficient combination of gum base ingredients that need only be combined with subsequent gum ingredients to form a finished gum. A finished gum base is a chewable visco-elastic material that includes at least a viscous component, an elastic component, and a softener component. For example, a typical gum base may include elastomer, at least some of the filler, resin and/or plasticizer, polyvinyl acetate, and a softener (such as an oil, fat, or wax). Merely compounded elastomer without the addition of any softener, for example, would not be a finished gum base because it would not be considered useable in a finished gum structure because of its difficulty, if not impossibility, to chew.

Gum structures may include a vast number of ingredients in various categories. Systems and methods of the present invention may be used to mix any and all known ingredients including, but not limited to, ingredients in the following ingredient categories: elastomers, bulking agents, elastomer plasticizers (which includes resins), elastomer solvents, plasticizers, fats, waxes, fillers, antioxidants, sweeteners (e.g., bulk sweeteners and high intensity sweeteners), syrups/fluids, flavors, sensates, potentiators, acids, emulsifiers, colors, and functional ingredients.

The insoluble gum base generally includes ingredients falling under the following categories: elastomers, elastomer plasticizers (resins or solvents), plasticizers, fats, oils, waxes, softeners, and fillers. The gum base may include from 5% to 95% by weight of a finished gum. In some examples, the gum base may include from 10% to 50%, or 20% to 30% by weight of the finished gum.

The water soluble portion of finished gum may include subsequent gum ingredients falling under the following categories: softeners, bulk sweeteners, high intensity sweeteners, flavoring agents, acids, additional fillers, functional ingredients, and combinations thereof. Softeners are added to the gum in order to optimize the chewability and mouth feel of the gum. High intensity sweeteners may also be present and are commonly used with sugarless sweeteners. Typically, high intensity sweeteners are at least 20 times sweeter than sucrose.

Natural and artificial flavoring agents may be used and combined in any sensorially acceptable fashion. Optional ingredients such as colors, functional ingredients and additional flavoring agents may also be included in gum structures.

Dietary Supplement

Also provided herein, is a dietary supplement including a therapeutically effective amount of fenchol, wherein the therapeutically effective amount is from 1 to 2,000 mg in a pill, 1 to 5,000 mg per day, 1 to 1,000 mg/kg, or 1 to 200 mg/kg per day. The term dietary supplement includes a formulation which is or can be added to a food product as a nutritional supplement. Dietary supplements can include functional food products, which include food that is capable of providing not only a nutritional effect, but also a further beneficial effect to the consumer. Dietary supplements may be adapted for oral, rectal, vaginal, parenteral, intramuscular, intraperitoneal, intraarterial, intrathecal, intrabronchial, subcutaneous, intradermal, intravenous, nasal, buccal, or sublingual routes of administration. For oral administration, the dietary supplement can be made of compressed tablets, pills, tablets, cellules, drops, or capsules.

In some examples, the therapeutically effective amount of fenchol can be from 1 to 200, 200 to 400, 400 to 600, 600 to 800, or 800 to 1000 mg in a pill. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1000 mg in a pill. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg in a pill.

In some examples, the therapeutically effective amount of fenchol can be from 1 to 1,000, 1,000 to 2,000, 2,000 to 3,000, 3,000 to 4,000, or 4,000 to 5,000 mg per day. In certain examples, the therapeutically effective amount of fenchol can be from 1 to 500, 500 to 1,000, 1,000 to 1,500, 1,500 to 2,000, 2,000 to 2,500, 2,500 to 3,000, 3,000 to 3,500, 3,500 to 4,000, 4,000 to 4,500, or 4,500 to 5,000 mg per day. Further, the therapeutically effective amount of fenchol can be from 1 to 200, 200 to 400, 400 to 600, 600 to 800, 800 to 1,000, 1,000 to 1,200, 1,200 to 1,400, 1,400 to 1,600, 1,600 to 1,800, 1,800 to 2,000, 2,000 to 2,200, 2,200 to 2,400, 2,400 to 2,600, 2,600 to 2,800, 2,800 to 3,000, 3,000 to 3,200, 3,200 to 3,400, 3,400 to 3,600, 3,600 to 3,800, 3,800 to 4,000, 4,000 to 4,200, 4,200 to 4,400, 4,400 to 4,600, 4,600 to 4,800, or 4,800 to 5,000 mg per day.

In some examples, the therapeutically effective amount of fenchol can be from 1 to 200, 200 to 400, 400 to 600, 600 to 800, or 800 to 1,000 mg/kg. In certain examples, the therapeutically effective amount of fenchol can be from 1 to 100, 100 to 200, 200 to 300, 300 to 400, 400 to 500, 500 to 600, 600 to 700, 700 to 800, 800 to 900, or 900 to 1,000 mg/kg. Further, the therapeutically effective amount of fenchol can be from 1 to 25, 25 to 75, 75 to 125, 125 to 175, 175 to 225, 225 to 275, 275 to 325, 325 to 375, 375 to 425, 425 to 475, 475 to 525, 525 to 575, 575 to 625, 625 to 675, 675 to 725, 725 to 775, 775 to 825, 825 to 875, 875 to 925, 925 to 975, or 975 to 1,000 mg/kg.

In some examples, the therapeutically effective amount of fenchol can be from 1 to 50, 50 to 100, 100 to 150, or 150 to 200 mg/kg per day. In certain examples, the therapeutically effective amount of fenchol can be from 1 to 25, 25 to 50, 50 to 75, 75 to 100, 100 to 125, 125 to 150, 150 to 175, or 175 to 200 mg/kg per day. Further, the therapeutically effective amount can be from 1 to 10, 10 to 20, 20 to 30, 30 to 40, 40 to 50, 50 to 60, 60 to 70, 70 to 80, 80 to 90, 90 to 100, 100 to 110, 110 to 120, 120 to 130, 130 to 140, 140 to 150, 150 to 160, 160 to 170, 170 to 180, 180 to 190, or 190 to 200 mg/kg per day.

A number of embodiments of the disclosure have been described. Nevertheless, it will be understood that various modifications may be made without departing from the spirit and scope of the invention. Accordingly, other embodiments are within the scope of the following claims.

By way of non-limiting illustration, examples of certain embodiments of the present disclosure are given below.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1: Activation of Microbiota Sensing—Free Fatty Acid Receptor 2 Signaling Ameliorates Amyloid-β Induced Neurotoxicity by Modulating Proteolysis-Senescence Axis The agonists of free fatty acid receptor 2 (FFAR2) signaling were screened, validated, and established, wherein FFAR2 signaling senses beneficial signals from short chain fatty acids (SCFAs) produced by microbiota. The abundance of SCFAs, is often low in the gut of older adults with AD. It was demonstrated that inhibition of FFAR2 signaling increases amyloid-beta (Aβ) stimulated neuronal toxicity. Thus, FFAR2 agonists were screened using an in-silico library of more than 144,000 natural compounds and 15 of them were selected based on binding with FFAR2-agonist active sites. Fenchol (a natural compound commonly present in basil) was recognized as a potential FFAR2 stimulator in neuronal cells and demonstrated protective effects against Aβ-stimulated neurodegeneration in an FFAR2-dependent manner. In addition, Fenchol reduced AD-like phenotypes, such as Aβ-accumulation, and impaired chemotaxis behavior in *Caenorhabditis (C.) elegans* and mice models, by increasing Aβ-clearance via the promotion of proteolysis and reduced senescence in neuronal cells. These results suggest that the inhibition of FFAR2 signaling promotes Aβ-induced neurodegeneration, while the activation of FFAR2 by Fenchol ameliorates these abnormalities by promoting proteolytic Aβ-clearance and reducing cellular senescence. Thus, stimulation of FFAR2 signaling by Fenchol as a natural compound can be a therapeutic approach to ameliorate AD pathology.

Evidence and studies demonstrated that the gut microbiota is significantly different in patients with mild cognitive impairment (MCI—an early stage of AD) and AD (Nagpal et al., 2019, 2020; Doifode et al., 2021). Indeed, fecal microbiota transplantation (FMT) from AD donor animals increases the progression of AD pathology in recipient mice, while FMT of healthy donors decreases its progression (Sun et al., 2019), suggesting that the gut microbiota abnormalities are causal in AD pathology and their restoration can ameliorate AD progression. Although the mechanisms by which the gut microbiota contributes to brain health remain largely unknown, emerging data show that microbial metabolites are a possible link (Vogt et al., 2018; Fujii et al., 2019; Konjevod et al., 2020; Zhuang et al., 2021; Doifode et al., 2021). For example, short chain fatty acids (SCFAs, such as acetate, propionate, and butyrate) are the major beneficial metabolites produced by healthy microbiota; they exhibit beneficial effects on the brain, including a reduction in AD pathology, in several animal models (Mishra et al., 2020; Sun et al., 2020; Wenzel et al., 2020). Indeed, the abundance of SCFAs is often reduced in the gut of patients with AD and MCI, while healthy dietary habits, like a ketogenic diet, increase their production (Nagpal et al., 2019, 2020). However, the mechanisms by which a decrease in SCFAs contributes to AD progression and repletion of SCFAs protects from AD pathology remain largely unknown. Herein, it is demonstrated that suppressing free fatty acid receptor 2 (FFAR2; a G-protein-coupled receptor activated by SCFAs) contributes to Aβ accumulation and discovered that Fenchol, a natural compound, decreased AD pathology by activating FFAR2 signaling.

Materials and Methods

Cell Culture and FFAR2 Expression in Cells

Human neuroblastoma cells-SK-N-SH (HTB-11; American Type Culture Collection, Manassas, Va., USA) and HEK293 cells (as positive control) were cultured in DMEM medium supplemented with 10% FBS and 1% antibiotics (penicillin and streptomycin), grown at 37° C. and subcultured every 48 h. FFAR2 expression in these cells was measured by harvesting total RNA while cells were at 70-80% confluency, using the RNAeasy kit (Qiagen). The expression of FFAR2 mRNA was quantified using real-time PCR after converting total RNA to cDNA using the High-Capacity cDNA Reverse Transcription kit (Applied Biosystems). 18S RNA was used as an internal control. The fold change in gene expression was determined using delta-delta Ct values, following routinely used well-established and published protocols (Nagpal et al., 2018; Ahmadi et al., 2019, 2020a,b; Wang et al., 2020).

FFAR2 Inhibition and Aβ-Induced Neurotoxicity Using MTT Assay

To determine the impact of FFAR2 inhibition on Aβ-induced neuronal cell toxicity, the MTT viability assay was performed (Ronicke et al., 2008). SK-N-SH cells ($1 \times 10^3$ cells per well) were plated in a 96-well plate containing DMEM medium supplemented with 10% FBS and 1% antibiotics and grown at 37° C. for 24 h. Then, media was removed, and cells were washed with PBS before being replenished with DMEM media containing 1% FBS and 10 μM FFAR2 inhibitor (CATPB, Tocris) and incubated at 37° C. for 2 h. Then, cells were treated with Aβ 25-32 peptide (25 μM, Sigma) and incubated for 4 h. Afterward, the media was replaced with 100 μl of fresh media, and 10 μl of MTT reagent (5 mg/ml in phosphate buffer [pH 7.2]) was added and mixed in each well before an additional 4 h incubation. Then, DMSO (50 μl) was added in each well and mixed thoroughly to dissolve formazan crystals. The absorbance was measured at 570 nm.

In-Silico Screening of Natural FFAR2 Activators

The primary protein sequences of human and mouse FFAR2 were retrieved from the Uniprot database in FASTA format with the Uniprot IDs O15552 and Q8VCK6, respectively. The structures of 144,856 natural compounds were obtained from ZINC database (FIG. 8). Through in-silico virtual screening of these compounds based on binding to human FFAR2 using AutoDock6 software, the top 15 compounds were shortlisted (FIG. 9). Furthermore, the tertiary structures of both mouse FFAR2 and human FFAR2 were predicted using the threading-based online server I-TASSER (Zhang, 2008; Roy et al., 2010; Yang et al., 2015), refined using ModRefiner (Xu and Zhang, 2011), and validated using the Ramachandran plot from RAMPAGE server (Lovell et al., 2003). The natural activators, including acetate, butyrate, and the shortlisted compounds, were blindly docked with both mouse FFAR2 and human FFAR2 using AutoDock Vina to find the compounds that demonstrated activator properties (Trott and Olson, 2010). AutoGrid program was used to fix the grid box around the proteins. The grid box for the human FFAR2 binding site was set to the XYZ coordinates of 68.028, 66.787, and 54.804, respectively. The box dimensions were 28.089, 28.562, and 25.349 along the X, Y, and Z axes, respectively. For the mouse FFAR2, the grid box binding site was set to XYZ coordinates of 63.359, 66.205, and 46.924, and the box dimensions were 40.229, 41.757, and 36.283, respectively. The nine conformations along with the Vina score were used to screen the activator. The interaction of the ligands was analyzed using the 2D interaction diagrams generated by using LigPlot+ (Laskowski and Swindells, 2011) and 3D interaction images using PyMOL2.3 (The PyMOL Molecular Graphics System, Version 2.0 Schrödinger, LLC).

Western Blotting

To determine the FFAR2 signal activating property of selected compounds, SK-N-SH cells were treated with 10 μM of shortlisted compounds for 30 min at 37° C. and harvested for total protein extraction. Cells were harvested after 30 min of incubation because ERK1/2 phosphorylation upon FFAR2 activation is a quick event (Jiao et al., 2002; Bhattacharjee et al., 2010). Total protein from the cells was extracted using a lysis buffer [consisting of 10 mmol/L Tris (pH 7.6), 150 mmol/L NaCl, 10 mmol/L Sodium orthovanadate, 10 mmol/L Sodium Pyrophosphate, 100 mmol/L Sodium fluoride, 1 mmol/L EDTA, 1 mmol/L EGTA, 1% Triton X-100, 0.5% NP-40 and a cocktail of protease inhibitors (Roche); Yadav et al., 2011, 2017; Ahmadi et al., 2019, 2020a]. After sonication, cell extracts were centrifuged at 8,000×g for 10 min at 4° C., and the supernatant was separated in a fresh tube. The total protein concentration of the supernatant was measured using a BCA protein assay kit. An equal amount of total protein (45 μg) from each sample was dissolved in loading buffer and loaded in 4% stacking gel and 10% separating SDS-PAGE gel and resolved at 100 V. Proteins were transferred on a 0.22 μm PVDF membrane and blots were developed with anti-ERK1/2, anti-phosphoERK1/2, ubiquitin (P4D1), and Aβ (6E10) primary antibodies followed by their secondary antibodies and bands were visualized using the Pierce™ Fast Western Blot Kit, ECL Substrate acquired using Syngene Pxi. Band densities were also quantified using NIH ImageJ software. β-actin was used as an internal control.

Cyclic Adenosine Monophosphate (cAMP) Assay

FFAR2 is a Gi/o signaling receptor, which reduces cytosolic cAMP (Falomir-Lockhart et al., 2019). To determine the FFAR2 signaling activating potential of selected compounds, the cAMP-Glo™ Assay was used to measure intracellular cAMP. SK-N-SH cells ($1 \times 10^3$ cells per well) were plated in a white 96-well plate for 24 h and then treated with 10 μM compounds and 10 μM forskolin (a positive control) dissolved in induction buffer. The cAMP levels were detected using a Luminescence Microplate Reader.

Intracellular Calcium Assay

FFAR2 signaling activation increases intracellular calcium (Falomir-Lockhart et al., 2019). To further determine the activation potential of selected compounds for this signaling, we plated the SK-N-SH cells (1.25×103 cells per well) into a dark 96-well plate for 24 h. Then cells were treated with 10 μM selected compound(s) and 10 mM acetate (an SCFA positive control). Also, 0.01 M EDTA (Sigma) and 114 nm carbachol were used as negative and additional positive controls, respectively. After 15 min, the cells were treated with 2 fluo-4 Direct™ calcium reagent along with 250 mM probenecid and further incubated at 37° C. for 30 min. The fluorescence was measured with excitation at 494 nm and emission at 516 nm using a microplate reader.

Culture and Maintenance of C. elegans

C. elegans was used as a model for determining the impact of selected compounds on aging and AD-like phenotypes. The wild-type (N2) and CL2122 (dvls15 [9pPD30.38] unc-54(vector)+(pCL26)mtl-2::GFP]) were propagated at 20° C. AD transgenic worms model CL2006 (dvls [pCL12(unc-54/human abeta peptide 1-42 minigene)+pRF4), CL4176 (dvls27[myo-3p::A-Beta (1-42)::let-851 3tUTR)+rol-6 (su1006] and CL2355 (dvls 50 [pCL45 9snb-1::Abeta 1-42::3t UTR 9 log)+mtl-2::GFP]) were maintained at 16° C. All strains were cultured on solid nematode growth medium (NGM) consisting of 3 g/L NaCl, 2.5 g/L peptone, 5 mg/L cholesterol, 1 mM CaCl2), 1 mM $MgSO_4$, 25 mM $KH_2PO_4$, and 17 g/L agar and seeded with OP50 (*Escherichia coli* strain) as a food supply. The worms were allowed to grow up to the adult stage, and egg carrying worms were used to isolate age-synchronized eggs using the bleaching method (Porta-de-la-Riva et al., 2012). The synchronized eggs were cultured on an NGM plate or fresh S-Complete plus media with 5% OP50, and 10 μM Fenchol (Sigma) at either 20° C. (N2 and CL2122) or 16° C. (CL2006, CL4176, and CL2355). All of the strains used were acquired from the University of Minnesota-*Caenorhabditis* Genetics Center, which is funded by the NIH Office of Research Infrastructure Programs (P40 OD010440).

Lifespan and Paralysis Assays in C. elegans

To determine the impact of selected compounds on age related decline in brain health, the lifespan of the worms was first measured. The L1 worms were cultured in 96-well plates on S-complete media containing E. coli OP50 and antibiotics (about 10-15 animals per well). The experimental group worms were treated with 10 μM Fenchol and control groups were treated with 0.1% DMSO. The 0.6 mM Fluorodeoxyuridine (FUDR; 30 μl) was added to each well after 3 days and animals were monitored every other day for viability. The CL4176 and CL2006 worms were grown at 16° C. and N2 worms were grown at 20° C.

For paralysis assays, synchronized eggs of CL4176 were kept at 16° C. for 48 h, and the worms were transferred onto NGM plates. Experimental group worms were treated with 10 μM Fenchol and control groups were treated with DMSO at 25° C. for 20 h. Counting was performed at 2 h intervals, typically after 14 h, at 23° C., and until the last worm became paralyzed. If worms did not move or only moved their head but not their body when gently touched with a platinum loop, they were scored as paralyzed. Each *C. elegans* experiment was conducted with at least 100 worms.

Thioflavin-S-Staining

To detect amyloid plaques in the transgenic CL2006 worms, age-synchronized worms were grown on media with and without Fenchol supplementation for up to 5 days of age and then worms were fixed in 4% paraformaldehyde-PBS. Then, the worm bodies were permeabilized in 1% Triton X-100, 125 mM Tris (pH 7.4), and 5% fresh β-mercaptoethanol. After washing three times with 1% PBS-Tween-20, the worm bodies were stained with 0.125% thioflavin S in 50% ethanol for 2 min. After washing three times with ethanol in the darkroom, worms were mounted on slides for microscopy using a Zeiss 710 confocal microscope equipped with a digital camera. A total of 20 worms were counted from each group.

Measurement of Chemotaxis Activity

Both C. elegans strains (CL2122 and CL2355) were grown on media supplemented with 10 μg/ml Fenchol and DMSO (control) and OP50 lawn at 16° C. for 36 h, and then at 2° C. for another 36 h. Then the worms were washed twice with S-Basal media and transferred to an NGM plate without E. coli OP50. These plates were divided into four equal sectors, with 1 μl of 0.1% benzaldehyde as an odorant and 1 μl of 1 M sodium azide as an anesthetic to arrest the worms upon reaching the quadrant were added to the original spot. On the opposite side of the attractant, a 1 μl drop of sodium azide and 1 μl of control odorant (100% ethanol) were added onto the NGM agar plate. Around 40-45 worms were placed in the center of each plate, incubated at room temperature for 1 h, and transferred to 4° C. overnight. The chemotaxis index (CI) was scored using the following formula: (number of worms at the attractant location number of worms at the control location)/total number of worms on the plate (Margie et al., 2013).

Mice Studies

To determine the impact of Fenchol treatment on the AD mice model, 3-month old male APP/PS1 mice (Jackson Laboratory—Stock number: MMRRC Stock No: 34829-JAX) were treated with Fenchol (80 mg/kg body weight dose by daily oral gavage) for 3 months and compared to their DMSO treated controls. Brains were collected and immediately homogenized in proteasome lysis buffer and proteasome activity was measured as described below. All the animal procedures and experiments were approved by the institutional animal care and use committee (IACUC) of the Wake Forest School of Medicine and the University of South Florida.

Proteasome Activity Assay

The CL2006 strain, SK-N-SH cells, and brain tissues were sonicated in a lysis buffer (150 mM NaCl, 50 mM HEPES, 2 mM DTT, 20 mM NaF, 5 mM EDTA, 2.5 mM sodium pyrophosphate, 1 mM sodium orthovanadate, and 1 mM α-glycerophosphoric acid) and then centrifuged at 15,000 g at 4° C. for 15 min. Total protein was assayed using BCA kit and 20 μg protein was mixed with 140 μM suc-leu-leu-val-tyr-7-amino-4-methylcou-marin (AMC) in a proteasome activity assay buffer (150 mM NaCl, 50 mM HEPES [pH 7.4], 5 mM ATP, and 5 mM EDTA), and then the fluorescence (excitation 380 nm and emission 460 nm) was measured every 10 min over 3 h using a microplate reader. The assay was performed with and without the proteasome inhibitor MG132 (10 μM).

Lysosome Activity

The lysosomal activity was measured in $1 \times 10^3$ SK-N-SH cells per well plated into a 96-well plate and treated with 10 μM Fenchol, 25 μm Aβ 25-32, 1% DMSO, and 500 nm bafilomycin. Bafilomycin was used as an inhibitor of cellular autophagy/lysosomal activity. The lysosomal activity was assayed using the Enz@ lysozyme assay kit (E-22013, Molecular Probes) and the fluorescence was measured in a fluorescence microplate reader using excitation and emission wavelengths of 494 nm and 518 nm, respectively (Biotek Instruments, VT, USA).

Measurements of Senescence

Cells were treated with 10 µl Fenchol and DMSO. After overnight incubation, Aβ 25-32 (25 µM) peptide was added to the cells for 4 h. The Senescence β-Galactosidase Staining Kit (Cell Signaling, USA) was used for the detection of the expression of β-galactosidase activity, following the manufacturer's instructions.

Statistical Analyses

The Student t-test and one/two way ANOVA have been used to determine the statistical significance, as appropriate. All the assays were done in triplicate and repeated two-three times, and values were presented as the mean and standard error of means. P-values less than 0.05 were considered statistically significant.

Results

FFAR2 is Expressed on Neuronal Cells and its Inhibition Increases Aβ-Induced Neurotoxicity To determine the role of FFAR2 in neurons, it was first confirmed and found that the FFAR2 gene is abundantly expressed in human neuronal SK-N-SH cells, similar to HEK293 cells, which were used as a positive control (FIG. 1A). It was observed that Aβ-treatment significantly induced cell death in SK-N-SH cells (FIG. 1B). However, the inhibition of FFAR2 using a small compound inhibitor (CATPB) further exacerbated Aβ-induced cell death in these cells (FIGS. 1C-1D).

These results indicate that FFAR2 is expressed in the neuronal cells and its inhibition exacerbates the detrimental effects of increased Aβ and decreases the survival of neuronal cells, suggesting that the activation of FFAR2 signaling may reduce Aβ-induced neuronal toxicity.

Figures 2A, 2B, 2C, 2D:
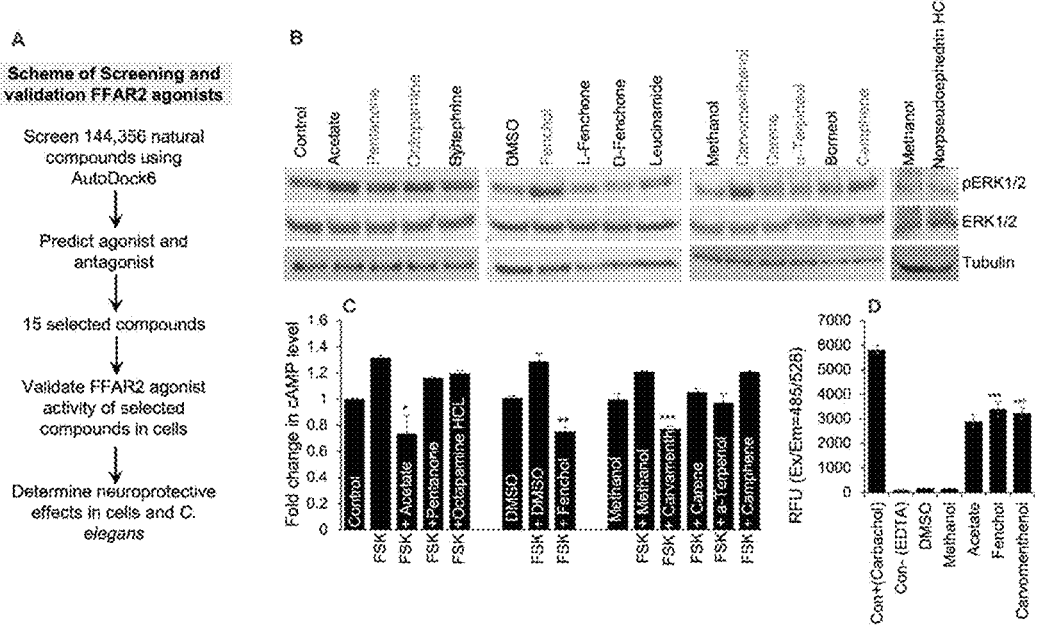
FIGS. 2A-2D show in silico and in vitro screening of FFAR2 activators discovering Fenchol as the most effective activator of FFAR2 signaling.

Large-Scale Screening of Natural Compounds Demonstrated Fenchol as a Potential Activator of FFAR2 Signaling Based on the in-silico screening of >144,000 natural compounds and their binding affinity to the active site of human FFAR2, the top 15 compounds were shortlisted. (FIG. 2A, FIG. 9). To determine the interactions of these selected natural compounds and predict their activator vs. inhibitory properties to FFAR2, their interaction profiles were compared with known FFAR2 activators, like acetate and butyrate (FIG. 10, FIG. 11). The binding site residues Ser86, Tyr90, His140, Ile145, Val179, Arg180, Leu183, Tyr238, His242, and Arg255 were identified, similar to the published literature (Schmidt et al., 2011). We observed that acetate forms an H-bond with His242 in human FFAR2 and Arg65, Trp75, Tyr90, Gln148, Tyr238 in mouse FFAR2. Further, butyrate forms an H-bond with His242 in human FFAR2 and Arg65, Trp75, Tyr90, Gln148, Tyr238, and Arg255 in mouse FFAR2. Based on these (modeling) criteria, we classified the selected 15 compounds are potential ligands/activators for FFAR2.

Figure 13A:
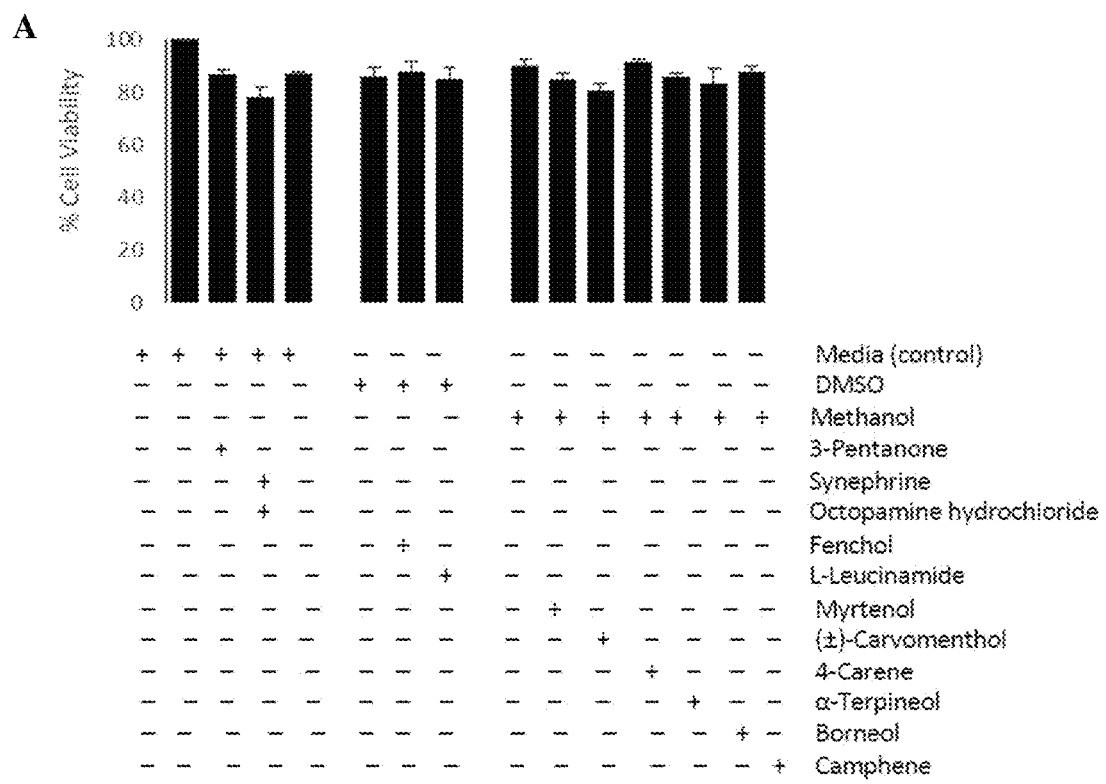
FIGS. 13A-13B show the effect of selected compounds on cell viability of neural cell.
Figure 13B:
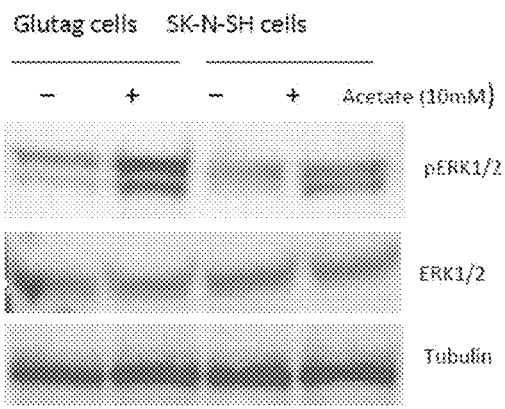

In addition, to determine the FFAR2 activator activity of the selected 15 compounds in SK-N-SH cells, three levels of biological system screening were used based on measuring phospho-ERK1/2 and intracellular levels of cyclic AMP and calcium. Since FFAR2 activation increases phosphorylation of tyrosine amino acid of ERK1/2 (Liu et al., 2008), we used this as a first-level biological screening; and found a descending order of phopho-ERK1/2 levels as follows: Fenchol>Octopamine>Carvamenthenol>Camphene>Pentanone>Synephrine>Leucinamide>Carene>α-Terpineol>Breneol>L-Fenchone>D-Fenchone>Norpseudoephedrine HCl (FIG. 2B). The levels of phospho-ERK1/2 proteins were highest in Fenchol and comparable to acetate, a known FFAR2 activator, in comparison to the rest of the selected compounds tested here (FIG. 2B, FIG. 13B). Because FFAR2 activation decreases intracellular cAMP (Falomir-Lockhart et al., 2019) and increases calcium, selected compounds to stimulate FFAR2 signaling by measuring intracellular cAMP (Falomir-Lockhart et al., 2019) and intracellular calcium levels were verified and shortlisted (Al Mahri et al., 2020). Interestingly, Fenchol showed the highest decrease in cAMP in SK-N-SH cells upon Forskolin-stimulation, and such decreases were shown as Fenchol<Carvamenthenol<α-Terpineol<Carene<Pentanone<Octopamine<Camphene, in ascending order (FIG. 2C). Forskolin was used as an inducer of an intracellular rise in cAMP levels (Curtin et al., 2006). Fenchol also showed the highest increase in intracellular calcium levels in SK-N-SH cells (FIG. 2D). These results suggest that Fenchol is a potent activator of FFAR2 signaling and is conferred by an increase in phopho-ERK1/2 and calcium levels and a suppression of cAMP pathways.

Further bioinformatics analyses revealed that the Fenchol (ZINC01081099) forms H-bonds with the Ser86, Gln148, Glu166, Tyr238, and His242 residues of human FFAR2; and the Thr85 and Glu320 residues of mouse FFAR2; these binding patterns are similar to those of acetate. The lowest Vina scores of 3 kcal/mol, 3.2 kcal/mol and 4.3 kcal/mol, 3.8 kcal/mol were obtained for acetate and butyrate of human and mouse FFAR2, respectively, while Fenchol also showed the lowest Vina scores of 5.5 kcal/mol and 5.3 kcal/mol with human FFAR2 and mouse FFAR2, respectively (FIG. 3A-3D). Further, molecular modeling analyses indicated that Fenchol and acetate have similar binding to human and mouse FFAR2 (FIG. 3A-3D), suggesting that Fenchol binds to the active site to stimulate FFAR2 signaling.

Fenchol Protects Aβ-Induced Neurotoxicity in SK-N-SH Cells and C. elegans

Figures 3A, 3B, 3C, 3D, 3E, 3F, 3G:
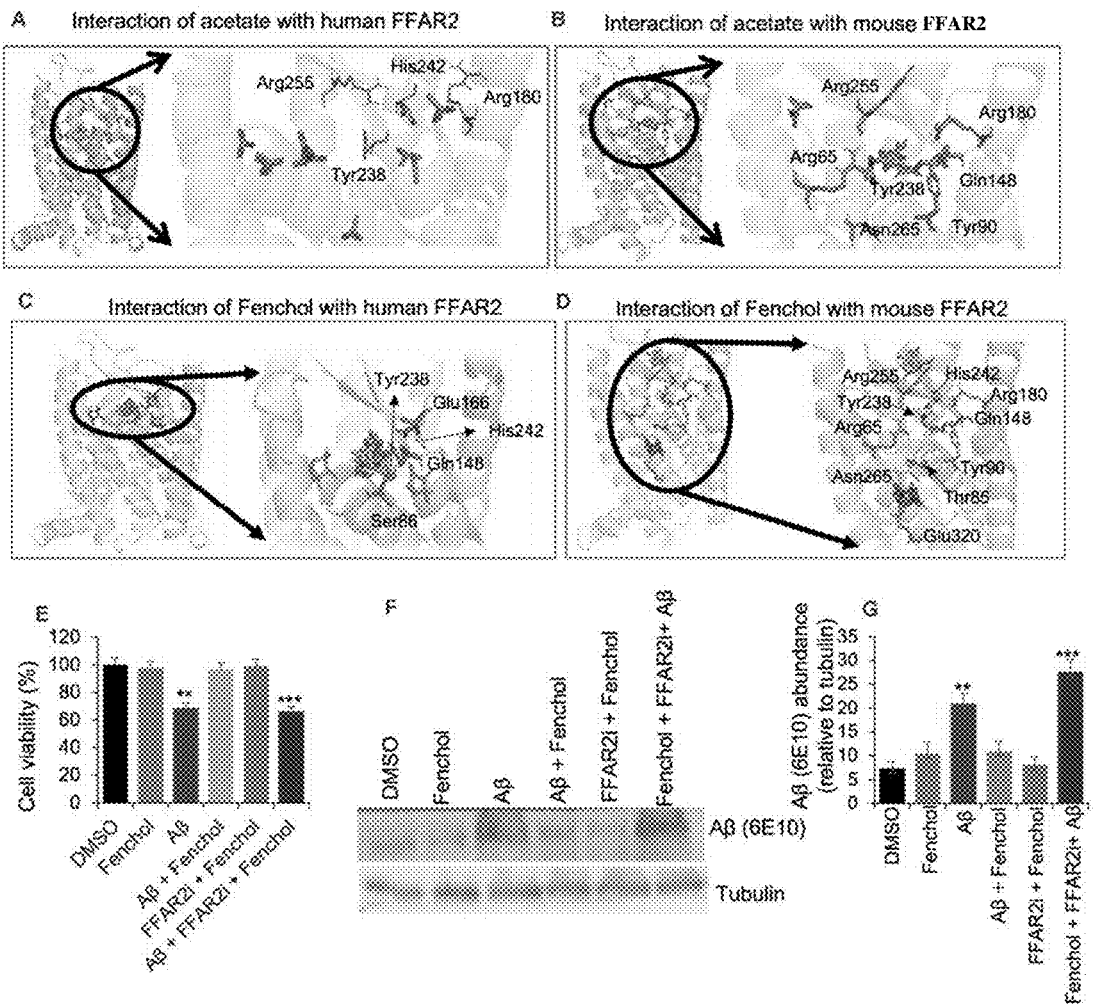
FIGS. 3A-3G show that Fenchol binds to the FFAR2 active site and Fenchol's neuroprotective effects are FFAR2 signaling dependent.

Since the inhibition of FFAR2 exacerbates Aβ-induced neurotoxicity, the effects of Fenchol treatment against Aβ-induced SK-N-SH neuronal cell death were also determined. Fenchol treatment significantly reduced the Aβ-induced neuronal cell death in SK-N-SH cells compared to their DMSO controls during the MTT assay (FIG. 3E). Interestingly, treatment with FFAR2 inhibitor and Fenchol demonstrated no significant protection in cell viability, indicating that the protective effects of Fenchol in Aβ-induced cell neurotoxicity are dependent on the activation of FFAR2 signaling. Fenchol treatment significantly reduced Aβ-accumulation in SK-N-SH cells compared to their Aβ-only treated controls, again in an FFAR2 dependent manner (FIGS. 3F-3G). This suggests that Fenchol treatment reduced Aβ-accumulation in neuronal cells by activating FFAR2 signaling, thus preventing cell death in the SK-N-SH cell culture system. However, the physiological importance of Fenchol in Aβ-accumulation and the underlying cellular and molecular mechanisms are still not known.

Figures 4A, 4B, 4C, 4D, 4E, 4F, 4G:
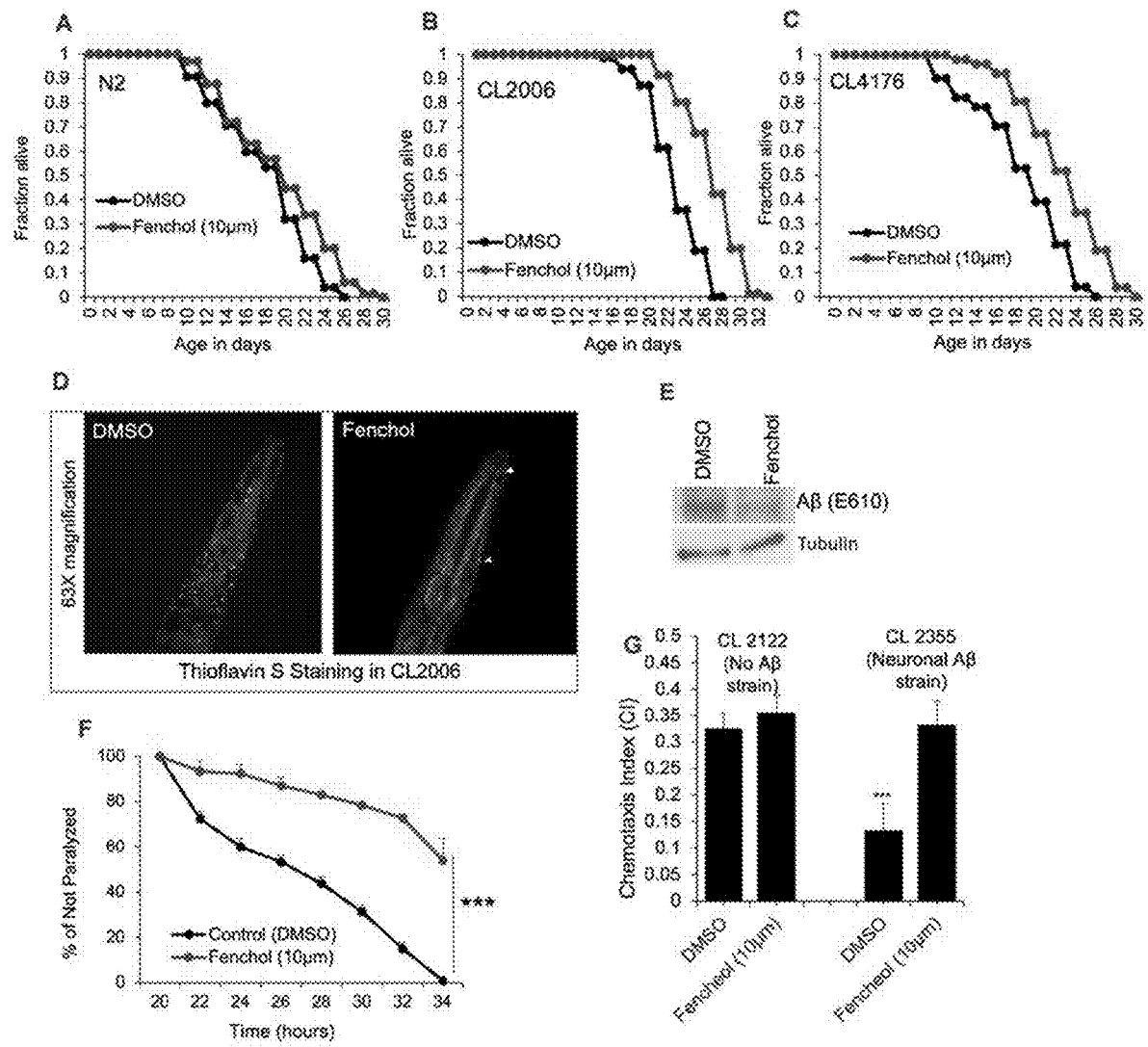
FIGS. 4A-4G show that Fenchol significantly increased lifespan in human Aβ-overexpressing *C. elegans*.

To demonstrate the physiological importance of Fenchol activity in reducing Aβ-induced neurotoxicity, C. elegans was used as a model of AD. Aging is one of the major risk factors for AD pathology and an increased risk of Aβ-induced neuronal cell death (Guglielmotto et al., 2010). Interestingly, Fenchol treatment had no significant impacts on the lifespan of wild-type N2 worms (FIG. 4A), while it significantly increased the survival/lifespan in worms overexpressing human Aβ (CL2006 and CL4176; FIGS. 4B, 4C). Fenchol treatment significantly reduced Aβ accumulation in worms overexpressing human Aβ (FIGS. 4D, 4E). These results suggest that the Fenchol treatment prolonged the lifespan of worms by reducing the Aβ-induced neurotoxicity. Further, Fenchol treatment decreased paralytic attacks in worms overexpressing human Aβ, compared to their non-treated controls (FIG. 4F). Worms overexpressing human Aβ (CL2355) treated with Fenchol also exhibited significantly higher memory behavior during the chemotaxis assay compared to their non-Aβ expressing control worms (CL2122; FIG. 4G). Overall, these results suggest that Fenchol treatment reduced neuronal cell death by reducing Aβ-accumulation, which in turn improved cognitive function and improved organism survival.

Fenchol Increase Proteasome Activity to Reduce Aβ Accumulation

Figures 5A, 5B, 5C, 5D, 5E:
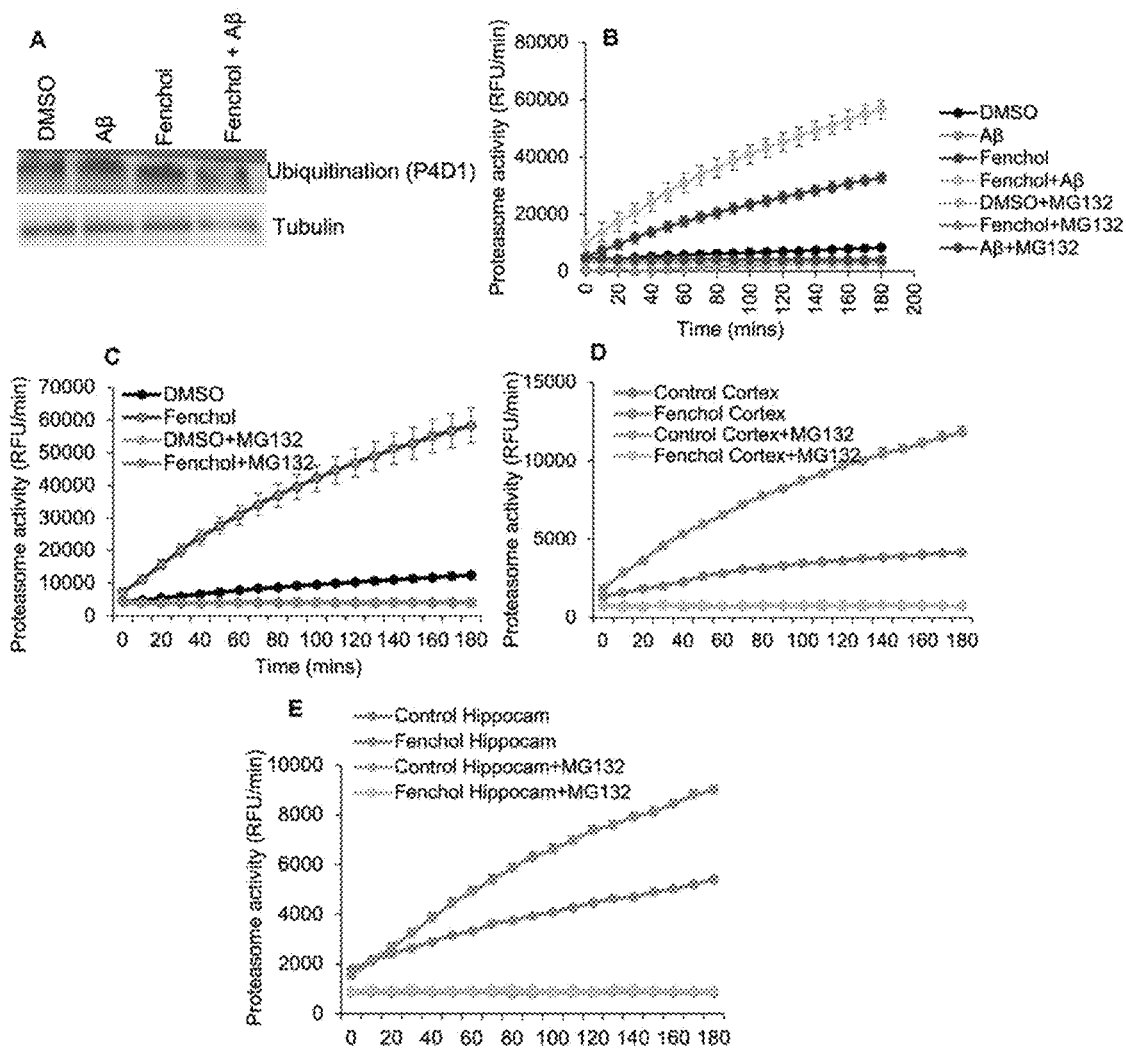
FIGS. 5A-5E show that Fenchol treatment increased proteasome activity, without impacting protein ubiquitination.

Fenchol protects neuronal cells by reducing Aβ accumulation, however, the mechanisms were not known. Fenchol treatment did not change protein ubiquitinylation in the SK-N-SH cells (FIG. 5A), suggesting that the reduction in Aβ accumulation with Fenchol treatment was not mediated through ubiquitin-dependent protein degradation. Interestingly, Fenchol treatment significantly increased the proteasomal activity in both SK-N-SH cells and C. elegans (FIGS. 5B-5C), as well as in the cortex and hippocampus of our AD mouse model (APP/PS1; FIGS. 5D-5E). These results indicate that Fenchol treatment reduces and clears Aβ accumulation by increasing proteasomal activity in the neuronal cells, thus reducing the neurotoxicity in these cells.

Fenchol Reduces Cellular Senescence in Neuronal Cells

Figures 6A, 6B:
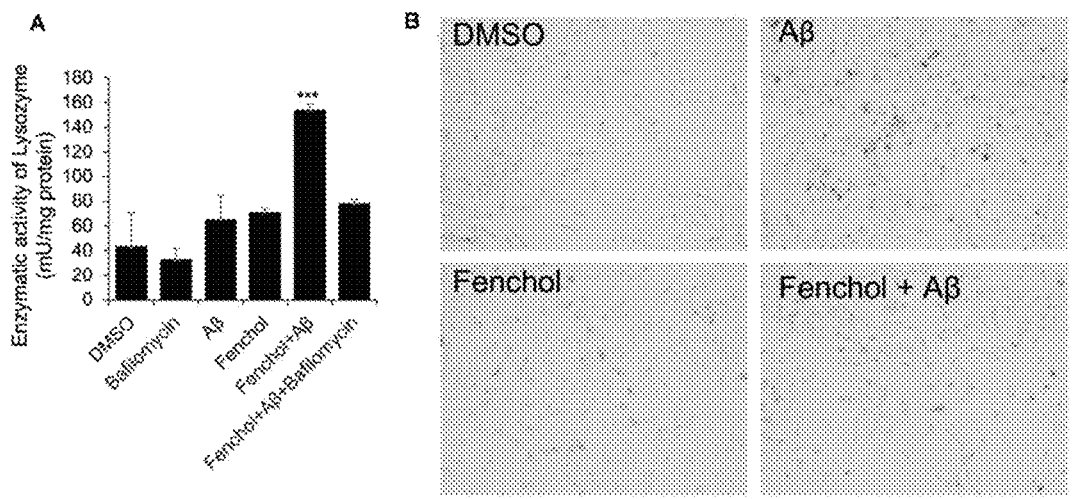
FIGS. 6A-6B show that Fenchol treatment increased lysosomal activity (autophagy) (FIG. 6A) and reduced senescence (FIG. 6B) in SK-N-SH cells. Data are from three independent experiments done in triplicate and presented as the mean and standard error of means. ***$P<0.001$.
Figure 7:
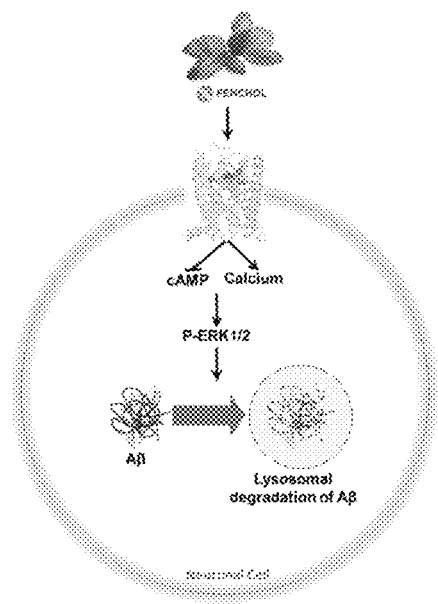
FIG. 7 shows that Fenchol (commonly present in basil plant/leaves) activates FFAR2 signaling by increasing intracellular calcium and reducing cAMP, thus activating pERK1/2 phosphorylation, which in turn increases Aβ clearance by activating lysosomal degradation in neuronal cells. These results indicate that the activation of FFAR2 by Fenchol reduces AD-like pathology in neurons.
Figure 12A:
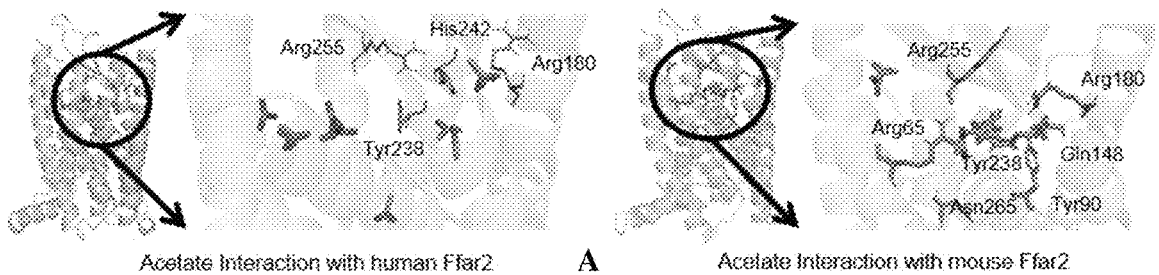
FIGS. 12A-12P show in silico modeling and interaction data from human and mice Ffar2 homology modeling.
Figure 12B:
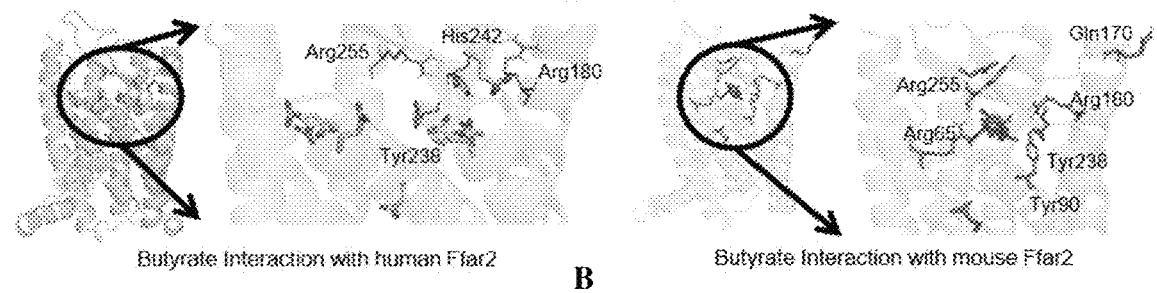
Figure 12C:
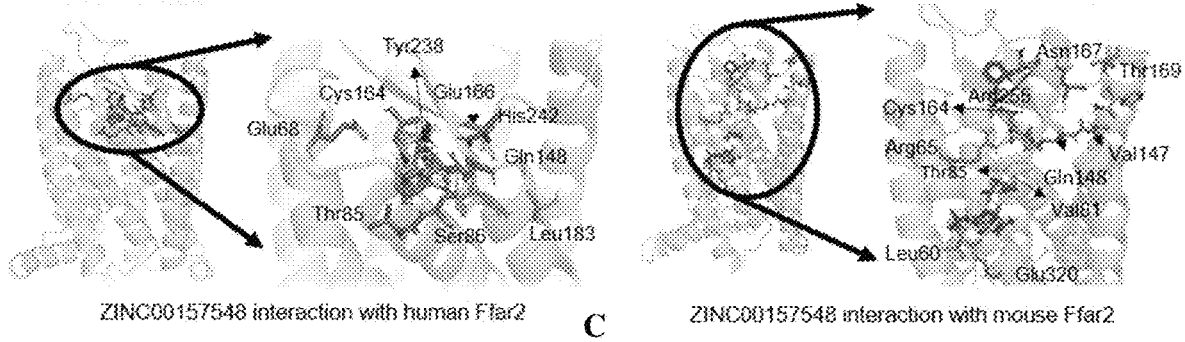
Figure 12D:
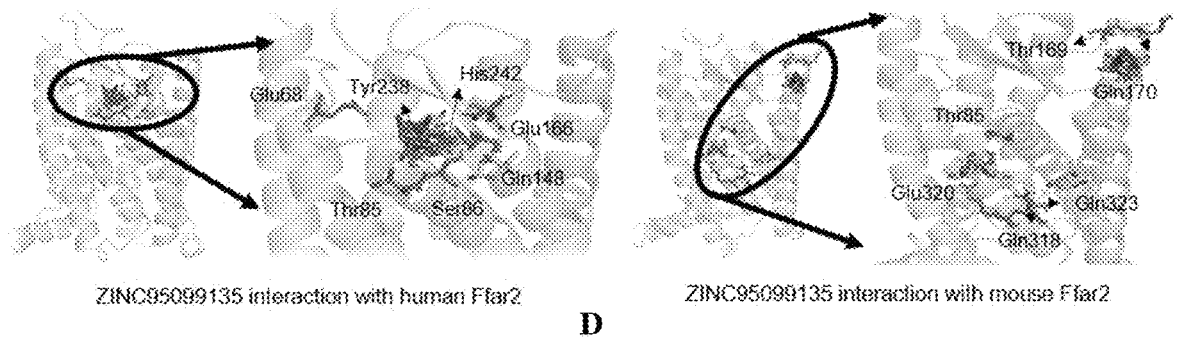
Figure 12E:
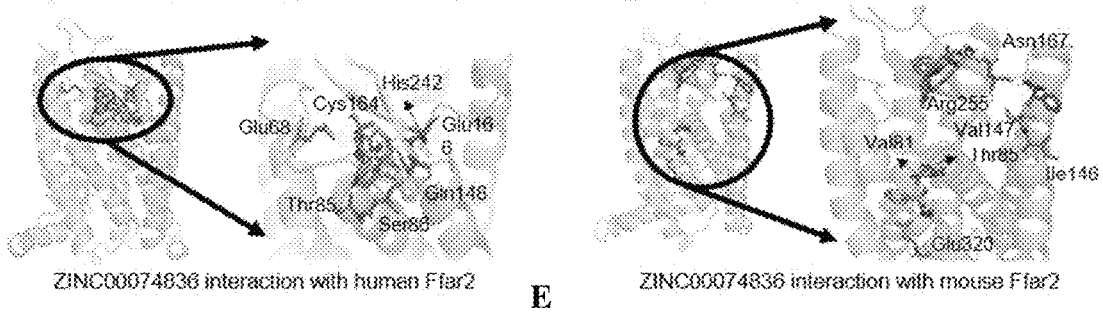
Figure 12F:
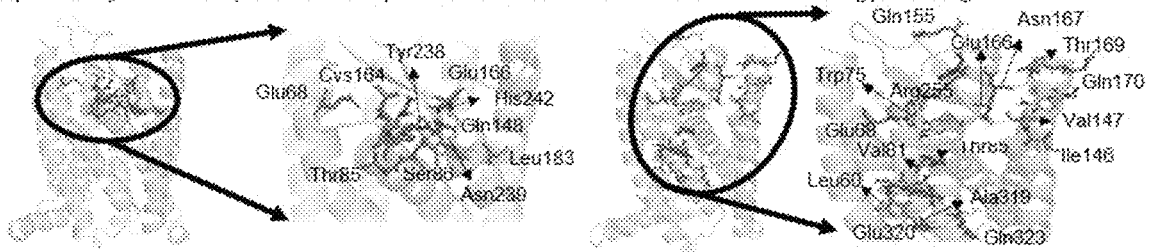
Figure 12G:
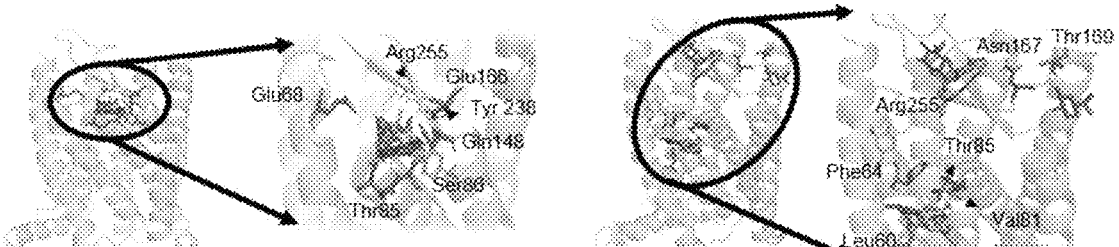
Figure 12H:
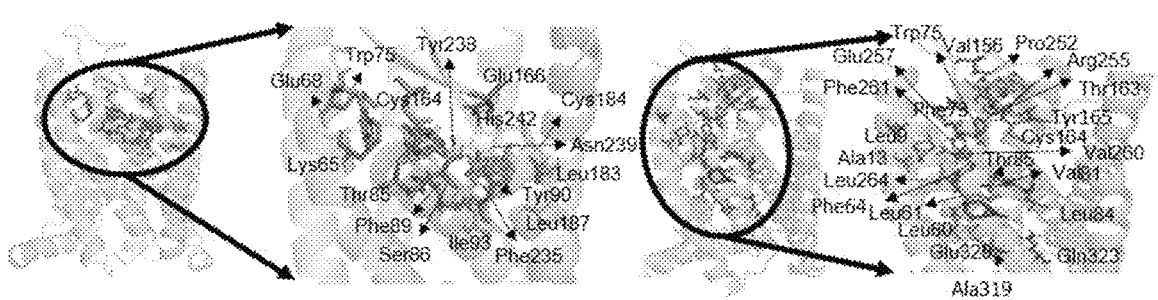

The Fenchol treatment significantly increased the lysosomal activity in the neuronal cells, compared to their controls (FIG. 6A). This finding suggests that Fenchol increases autophagy in the neuronal cells and, thus, might be protecting these cells from Aβ-induced neurotoxicity. The Aβ-treated cells showed a higher rate of senescence (indicated by β-galactosidase activity staining), while Fenchol treatment significantly reduced the number of senescent neuronal cells (FIG. 6B). These results suggest that the mechanism of Fenchol includes improved autophagy, reduced senescence in neurons (thus, possible protection from neuronal cell death), and amelioration of AD-like pathologies in the brain.

Discussion

Emerging evidence indicates that abnormalities in the gut microbiota and its metabolites contribute to AD pathology; however, the mechanism(s) and the precise targets by which microbiota sensing mechanisms can be manipulated to ameliorate AD pathology remain elusive. Here, the inhibition of microbiota-derived SCFA signaling (FFAR2 signaling) contributes to the enhancement of Aβ-induced neurotoxicity and AD pathology. More than 144,000 natural compounds were also screened and upon further comprehensive validation for FFAR2 stimulating activities, Fenchol was found to be a potential FFAR2 signaling agonist that exhibited protective effects against AD pathology using in vitro, ex-vivo, and in vivo models.

FFAR2 was abundantly expressed in a myriad of gastrointestinal tract cells as well as various other cell types, including neuronal cells. However, their function in neuronal cells is not well studied. Here, the FFAR2 gene was abundantly expressed in the human neuronal cells (SK-N-SH). FFAR2 expression has also been reported in other genomics databases of human and mice brains (Atlas, 2021; Allen Brain Map, 2021); however, these analyses are done in whole brain tissues, which consist of a mixture of neurons and glial cells. Thus, the expression of FFAR2 in these types of cells individually remains unknown. Neuronal cells expressed FFAR2, suggesting it might play a significant role in neuron proliferation, survival, and other functions. SK-N-SH cells were established as a model to study FFAR2 signaling in neurons. SCFAs, like acetate and butyrate, are natural activators of FFAR2, but they are primarily produced by microbiota in the gut, and their capability to reach the brain remains debated. Thus, natural compounds that can activate FFAR2 can be adapted to modulate this signaling. A large-scale in-silico screening of >144,000 natural compounds was performed to select compounds that strongly bind to the active site of FFAR2. The top 15 compounds were selected and further validated their biological efficacy using wet-lab experiments. A screening strategy for finding the potential FFAR2 activators from these selected compounds was used, based on the knowledge that FFAR2 is a type of inhibitory G (Gi/o) protein-coupled receptor, and its activation initiates a signaling cascade which results in an intracellular increase in phosphorylation of ERK1/2 along with a reduction in cAMP and elevation in calcium (Mishra et al., 2020). Thus, phospho-ERK1/2 activation (phosphorylation) was used as primary screening for the 15 selected natural compounds and a reduction in cAMP and an increase in calcium levels as secondary screening measures. Interestingly, Fenchol induced FFAR2 the most in human neuronal cells. Fenchol is a common ingredient found in edible plants like basil, grapes, mustard, aster, and *alpinia speciosa* root oil (Bleyer et al., 1991; Singh et al., 2015). It is also abundant in lavender oil, heartwood, and *eucalyptus* and is commonly used in perfumes (Zheljazkov et al., 2013; Maghsoodlou et al., 2015; Ibrahim et al., 2017). However, its role in modulating signaling pathways remains largely unknown. Here, FFAR2 activation potential, which can reduce Aβ-induced neurotoxicity, was demonstrated.

Accumulation of Aβ in the neurons is a hallmark of AD pathology and Aβ-induced neurotoxicity is an important mechanism by which cognitive function and AD pathology prevail. Protecting neurons from Aβ-induced cytotoxicity is an important target to prevent AD. FFAR2 inhibition increased the cytotoxic effects of Aβ on neuronal cells, suggesting that activation of FFAR2 signaling may be neuroprotective. Interestingly, Fenchol treatment protected the Aβ-induced neuronal toxicity in SK-N-SH cells; these effects were FFAR2-dependent, suggesting that Fenchol is a natural compound that can protect Aβ-induced neuronal death by activating FFAR2 signaling. However, the precise mechanisms of Fenchol in Aβ-induced neuronal cell death remain unknown. SCFAs reduce the formation of toxic Aβ aggregates (Ho et al., 2018), and Fenchol may also interfere with the formation of such toxic Aβ aggregates, causing neuronal toxicity—our future studies will test these possibilities.

C. elegans is an emerging model for several age-related conditions, including AD-like phenotypes (Luo et al., 2009). Several mutations, such as overexpression of human Aβ proteins, are used to develop AD-like neurodegenerative pathologies in C. elegans (Godini et al., 2019). For example, the CL2006 strain overexpresses human Aβ proteins, while the CL4176 strain overexpresses human Aβ in a temperature-sensitive manner (e.g., the worms grow and live normally at 16° C. but overexpress Aβ and develop paralysis due to substantial neuronal death at 22° C.). Additionally, the CL2355 strain overexpresses human Aβ when grown at 22° C. and develops paralysis, but grows normally at 16° C. (Ahmad and Ebert, 2020). CL2355 is a good model for measuring AD-like chemotactic cognition/memory behaviors compared to the CL2122 strain, which shows normal chemotaxis (cognition/memory; He et al., 2017). Interestingly, Fenchol treatment significantly increased the lifespan in the CL2006 and CL4176 strains and reduced Aβ accumulation. Fenchol also reduced paralysis in CL4176 worms, suggesting that Fenchol reduced neurotoxicity-mediated paralysis induced by Aβ accumulation. Fenchol treatment also protected from a decline in chemotaxis/cognitive function of CL2355 worms, suggesting that Fenchol prevents an Aβ-induced decline in cognitive function. Altogether, these results demonstrated that Fenchol treatment significantly reduced Aβ-induced AD-like pathology in cells and *C. elegans*.

Further, the accumulation of Aβ in the brain and/or neurons is due to reduced proteolysis, which results in a decline in protein degradation or clearance (Saido and Lissring, 2012). Ubiquitination is a common protein degradation mechanism in which older/non-functional proteins get ubiquitinylated and degraded in proteasomes (Buoso et al., 2012; Vilchez et al., 2014). Fenchol significantly reduced Aβ accumulation in neuronal cells and *C. elegans*, but this reduction was found to not be due to increased ubiquitination. By investigating alternative mechanisms of Aβ reduction, it was found that Fenchol significantly increased the lysosomal activity in SK-N-SH cells, Aβ overexpressing *C. elegans*, and the cortex and hippocampus of APP/PS1 mice. These findings suggest that Fenchol reduced Aβ accumulation by increasing its clearance via lysosomal activity and also demonstrate that the biological functions of Fenchol are conserved in worms, mice, and human cells. Lysosomal degradation is an important phenomenon of autophagy, which contributes to the efficient clearance of protein aggregates like Aβ (Lim and Yue, 2015). Reductions in lysosomal activity or the rate of autophagy are linked with increased senescence and AD pathology (Saido and Leissring, 2012; Wei et al., 2016; Curtis, 2019; Zhang et al., 2019). Aβ treatment to SK-N-SH cells increased the number of senescent cells, while Fenchol significantly reduced Aβ-induced senescence in neuronal cells.

Although *C. elegans* have conserved human/mammalian neuronal pathways (Chase and Koelle, 2007; Koelle, 2018), the orthologs of FFAR2 signaling in humans vs. *C. elegans* are not well studied. Galanin-like G-protein coupled receptor npr-9 has 24.01% identity with 94% query coverage in NCBI's-BlastP analyses of FFAR2 in *C. elegans* vs. humans. Further, Prosite analyses confirmed that both human FFAR2 and *C. elegans* Galanin belong to the G-protein coupled receptor family. These findings suggest that the mechanism of action of Fenchol in *C. elegans* may be through FFAR2 orthologs like npr-9; however, further comprehensive studies are needed to confirm these hypotheses. Alternatively, because many terpenoids are known to mediate Aβ-toxicity in worms, Fenchol may also act in *C. elegans* through the Nrf-2 pathway (Dostal and Link, 2010).

Other advantages which are obvious, and which are inherent to the invention, will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

REFERENCES

Ahmad, W., and Ebert, P. R. (2020). Suppression of a core metabolic enzyme dihydrolipoamide dehydrogenase (dld) protects against amyloid beta toxicity in *C. elegans* model of Alzheimer's disease. *Genes Dis.* 8, 849-866. doi: 10.1016/j.gendis.2020.08.004

Ahmadi, S., Nagpal, R., Wang, S., Gagliano, J., Kitzman, D. W., Soleimanian-Zad, S., et al. (2019). Prebiotics from acorn and sago prevent high-fat-diet-induced insulin resistance via microbiome-gut-brain axis modulation. *J. Nutr. Biochem.* 67, 1-13. doi: 10.1016/j.jnutbio.2019.01.011

Ahmadi, S., Razazan, A., Nagpal, R., Jain, S., Wang, B., Mishra, S. P., et al. (2020a). Metformin reduces aging-related leaky gut and improves cognitive function by beneficially modulating gut microbiome/goblet cell/mucin axis. *J. Gerontol. A Biol. Sci. Med. Sci.* 75, e9-e21. doi: 10.1093/gerona/glaa056

Ahmadi, S., Wang, S., Nagpal, R., Wang, B., Jain, S., Razazan, A., et al. (2020b). A human-origin probiotic cocktail ameliorates aging-related leaky gut and inflammation via modulating the microbiota/taurine/tight junction axis. *JCI Insight* 5:e132055. doi: 10.1172/jci.insight.132055

Al Mahri, S., Al Ghamdi, A., Akiel, M., Al Aujan, M., Mohammad, S., and Aziz, M. A. (2020). Free fatty acids receptors 2 and 3 control cell proliferation by regulating cellular glucose uptake. *World J. Gastrointest. Oncol.* 12, 514-525. doi: 10.4251/wjgo.v12.i5.514

Allen Brain Map (2021). Available online at: https://portal.brain-map.org/.

Atlas, H. P. (2021). Human protein atlas. Available online at: http://www.proteinatlas.org Bhattacharjee, A., Mulya, A., Pal, S., Roy, B., Feldman, G. M., and Cathcart, M. K. (2010). Monocyte 15-lipoxygenase gene expression requires ERK1/2 MAPK activity. *J. Immunol.* 185, 5211-5224. doi: 10.4049/jimmunol.1000514

Bleyer, W. A., Sather, H. N., Nickerson, H. J., Coccia, P. F., Finklestein, J. Z., Miller, D. R., et al. (1991). Monthly pulses of vincristine and prednisone prevent bone marrow and testicular relapse in low-risk childhood acute lymphoblastic leukemia: a report of the CCG-161 study by the childrens cancer study group. *J. Clin. Oncol.* 9, 1012-1021.

Buoso, E., Biundo, F., Lanni, C., Schettini, G., Govoni, S., and Racchi, M. (2012). AβPP intracellular C-terminal domain function is related to its degradation processes. *J. Alzheimers Dis.* 30, 393-405. doi: 10.3233/JAD-2012-111961

Chase, D. L., and Koelle, M. R. (2007). Biogenic amine neurotransmitters in *C. elegans*. *WormBook* 1-15. doi: 10.1895/wormbook.1.132.1

Curtin, B. F., Pal, N., Gordon, R. K., and Nambiar, M. P. (2006). Forskolin, an inducer of cAMP, up-regulates acetylcholinesterase expression and protects against organophosphate exposure in neuro 2A cells. *Mol. Cell. Biochem.* 290, 23-32. doi: 10.1007/s11010-005-9084-4

Curtis, A. (2019). Targeting senescence within the Alzheimer's plaque. *Sci. Transl. Med.* 11. doi: 10.1126/scitranslmed.aax4869

De Ture, M. A., and Dickson, D. W. (2019). The neuropathological diagnosis of Alzheimer's disease. *Mol. Neurodegener.* 14:32. doi: 10.1186/s13024-019-0333-5

Doifode, T., Giridharan, V. V., Generoso, J. S., Bhatti, G., Collodel, A., Schulz, P. E., et al. (2021). The impact of the microbiota-gut-brain axis on Alzheimer's disease pathophysiology. *Pharmacol. Res.* 164:105314. doi: 10.1016/j.phrs.2020.105314

Dostal, V., and Link, C. D. (2010). Assaying β; -amyloid toxicity using a transgenic *C. elegans* model. *J. Vis. Exp.* 44:2252. doi: 10.3791/2252

Falomir-Lockhart, L. J., Cavazzutti, G. F., Giménez, E., and Toscani, A. M. (2019). Fatty acid signaling mechanisms in neural cells: fatty acid receptors. *Front. Cell. Neurosci.* 13:162. doi: 10.3389/fncel.2019.00162

Fujii, Y., Nguyen, T. T. T., Fujimura, Y., Kameya, N., Nakamura, S., Arakawa, K., et al. (2019). Fecal metabolite of a gnotobiotic mouse transplanted with gut microbiota from a patient with Alzheimer's disease. *Biosci. Biotech. Biochem.* 83, 2144-2152. doi: 10.1080/09168451.2019.1644149

Gennaro, A. R., Remington, J. P. (1995). Remington: The Science and Practice of Pharmacy. 19th Edition, Mack Publishing Company, Easton. Mishra, S. P., Karunakar, P., Taraphder, S., and Yadav, H. (2020). Free fatty acid receptors 2 and 3 as microbial metabolite sensors to shape host health: pharmacophysiological view. *Biomedicines* 8:154. doi: 10.3390/biomedicines8060154

Godini, R., Pocock, R., and Fallahi, H. (2019). *Caenorhabditis elegans* hub genes that respond to amyloid beta are homologs of genes involved in human Alzheimer's disease. *PLoS One* 14:e0219486. doi: 10.1371/journal-.pone.02 19486

Guglielmotto, M., Giliberto, L., Tamagno, E., and Tabaton, M. (2010). Oxidative stress mediates the pathogenic effect of different Alzheimer's disease risk factors. *Front. Aging Neurosci.* 2:3. doi: 10.3389/neuro.24.003.2010

He, Q., Huang, G., Chen, Y., Wang, X., Huang, Z., and Chen, Z. (2017). The protection of novel 2-arylethenylquinoline derivatives against impairment of associative learning memory induced by neural Aβ in *C. elegans* Alzheimer's disease model. *Neurochem. Res.* 42, 3061-3072. doi: 10.1007/s11064-017-2339-0

He, N., Jin, W. L., Lok, K. H., Wang, Y., Yin, M., and Wang, Z. J. (2013), Amyloid-β1-42 oligomer accelerates senescence in adult hippocampal neural stem/progenitor cells via formylpeptide receptor 2. *Cell Death Dis.* 4:e924. doi: 10.1038/cddis.2013.437

Heneka, M. T., Carson, M. J., El Khoury, J., Landreth, G. E., Brosseron, F., Feinstein, D. L., et al. (2015). Neuroinflammation in Alzheimer's disease. *Lancet Neurol.* 14, 388-405. doi: 10.1016/S1474-4422(15)70016-5

Ho, L., Ono, K., Tsuji, M., Mazzola, P., Singh, R., and Pasinetti, G. M. (2018). Protective roles of intestinal microbiota derived short chain fatty acids in Alzheimer's disease-type beta-amyloid neuropathological mechanisms. *Expert Rev. Neurother.* 18, 83-90. doi: 10.1080/14737175.2018.1400909

Hur, J.-Y., Frost, G. R., Wu, X., Crump, C., Pan, S. J., Wong, E., et al. (2020). The innate immunity protein IFITM3 modulates γ-secretase in Alzheimer's disease. *Nature* 586, 735-740. doi: 10.1038/s41586-020-2681-2

Ibrahim, T. A., El-Hela, A. A., El-Hefnawy, H. M., Al-Taweel, A. M., and Perveen, S. (2017). Chemical composition and antimicrobial activities of essential oils of some coniferous plants cultivated in egypt. *Iran. J. Pharm. Res.* 16, 328-337. doi: 10.22037/IJPR.2017.1949

Jiao, X., Gonzalez-Cabrera, P. J., Xiao, L., Bradley, M. E., Abel, P. W., and Jeffries, W. B. (2002). Tonic inhibitory role for cAMP in α1a-adrenergic receptor coupling to extracellular signal-regulated kinases 1/2. *J. Pharmacol. Exp. Ther.* 303, 247-256. doi: 10.1124/jpet.102.037747

Jonsson, T., Stefansson, H., Steinberg, S., Jonsdottir, I., Jonsson, P. V., Snaedal, J., et al. (2013). Variant of TREM2 associated with the risk of Alzheimer's disease. *N. Eng. J. Med.* 368, 107-116. doi: 10.1056/NEIMoa1211103

Koelle, M. R. (2018). Neurotransmitter signaling through heterotrimeric G proteins: insights from studies in *C. elegans*. *WormBook* 2018, 1-52. doi: 10.1895/wormbook.1.75.2

Konjevod, M., Nikolac Perkovic, M., Sáiz, J., Svob Strac, D., Barbas, C., and Rojo, D. (2020). Metabolomics analysis of microbiota-gut-brain axis in neurodegenerative and psychiatric diseases. *J. Pharm. Biomed. Anal.* 194: 113681. doi: 10.1016/j.jpba.2020.113681

Laskowski, R. A., and Swindells, M. B. (2011). LigPlot+: multiple ligand-protein interaction diagrams for drug discovery. *J. Chem. Inf. Model.* 51, 2778-2786. doi: 10.1021/ci200227u Leeman, D. S., Hebestreit, K., Ruetz, T., Webb, A. E., McKay, A., Pollina, E. A., et al. (2018). Lysosome activation clears aggregates and enhances quiescent neural stem cell activation during aging. *Science* 359, 1277-1283. doi: 10.1126/science. aag3048

Lim, J., and Yue, Z. (2015). Neuronal aggregates: formation, clearance and spreading. *Dev. Cell* 32, 491-501. doi: 10.1016/j.devcel.2015.02.002

Liu, D., Genetos, D. C., Shao, Y., Geist, D. J., Li, J., Ke, H. Z., et al. (2008). Activation of extracellular-signal regulated kinase (ERK1/2) by fluid shear is Ca(2+)- and ATP-dependent in MC3T3-E1 osteoblasts. *Bone* 42, 644-652. doi: 10.1016/j. bone.2007.09.058

Liu, C.-C., Zhao, N., Yamaguchi, Y., Cirrito, J. R., Kanekiyo, T., Holtzman, D. M., et al. (2016). Neuronal heparan sulfates promote amyloid pathology by modulating brain amyloid-β clearance and aggregation in Alzheimer's disease. *Sci. Transl. Med.* 8:332ra44. doi: 10.1126/scitranslmed.aad3650

Lovell, S. C., Davis, I. W., Arendall, W. B., 3rd, de Bakker, P. I. W., Word, J. M., Prisant, M. G., et al. (2003). Structure validation by Cα geometry: φ, ψ and Cβ deviation. *Proteins* 50, 437-450. doi: 10.1002/prot. 10286

Luo, Y., Wu, Y., Brown, M., and Link, C. D. (2009). "*Caenorhabditis elegans* model for initial screening and mechanistic evaluation of potential new drugs for aging and Alzheimer's disease," in *Methods of Behavior Analysis in Neuroscience*, eds J. J. Buccafusco (Boca Raton, FL: CRC Press).

Maghsoodlou, M. T., Kazemipoor, N., Valizadeh, J., Falak Nezhad Seifi, M., and Rahneshan, N. (2015). Essential oil composition of *Eucalyptus microtheca* and *Eucalyptus viminalis*. *Avicenna J. Phytomed.* 5, 540-552. doi: 10.22038/AJP. 2015.4470

Margie, O., Palmer, C., and Chin-Sang, I. (2013). *C. elegans* chemotaxis assay, *J. Vis. Exp.* 74:e50069. doi: 10.3791/50069

Mishra et al., *Free Fatty Acid Receptors 2 and 3 as Microbial Metabolite Sensors to Shape Host Health: Pharmacophysiological View*, Biomedicines, 2020, 8, 154.

Nagpal, R., Neth, B. J., Wang, S., Craft, S., and Yadav, H. (2019). Modified Mediterranean-ketogenic diet modulates gut microbiome and short-chain fatty acids in association with Alzheimer's disease markers in subjects with mild cognitive impairment. *EBioMedicine* 47, 529-542. doi: 10.1016/j.ebiom.2019. 08.032

Nagpal, R., Neth, B. J., Wang, S., Mishra, S. P., Craft, S., and Yadav, H. (2020). Gut mycobiome and its interaction with diet, gut bacteria and alzheimer's disease markers in subjects with mild cognitive impairment: a pilot study. *EBioMedicine* 59:102950. doi: 10.1016/j.ebiom.2020.102950

Nagpal, R., Newman, T. M., Wang, S., Jain, S., Lovato, J. F., and Yadav, H. (2018). Obesity-linked gut microbiome dysbiosis associated with derangements in gut permeability and intestinal cellular homeostasis independent of diet. *J. Diabetes Res.* 2018:3462092. doi: 10.1155/2018/3462092

Nagpal, R., Shively, C. A., Register, T. C., Craft, S., and Yadav, H. (2019). Gut microbiome-Mediterranean diet interactions in improving host health. *F1000Res.* 8:699. doi: 10.12688/f1000research.18992.1

Porta-de-la-Riva, M., Fontrodona, L., Villanueva, A., and Cerón, J. (2012). Basic *Caenorhabditis elegans* methods: synchronization and observation. *J. Vis. Exp.* 64:e4019. doi: 10.3791/4019

Ronicke, R., Klemm, A., Meinhardt, J., Schroder, U. H., Fandrich, M., and Reymann, K. G. (2008). Aβ mediated diminution of MTT reduction—an artefact of single cell culture? *PLoS One* 3:e3236. doi: 10.1371/journal.pone.0003234

Roy, A., Kucukural, A., and Zhang, Y. (2010). I-TASSER: a unified platform for automated protein structure and function prediction. *Nat. Protoc.* 5, 725-738. doi: 10.1038/nprot.2010.5

Saido, T., and Leissring, M. A. (2012). Proteolytic degradation of amyloid β-protein. *Cold Spring Harb. Perspect. Med.* 2:a006379. doi: 10.1101/cshperspect. a006379

Schmidt, J., Smith, N. J., Christiansen, E., Tikhonova, I. G., Grundmann, M., Hudson, B. D., et al. (2011). Selective orthosteric free fatty acid receptor 2 (FFA2) agonists: identification of the structural and chemical requirements for selective activation of FFA2 versus FFA3. *J. Biol. Chem.* 286, 10628-10640. doi: 10.1074/jbc.M110.210872

Selkoe, D. J. (2001). Alzheimer's disease: genes, proteins and therapy. *Physiol. Rev.* 81, 741-766. doi: 10.1152/physrev.2001.81.2.741

Settembre, C., Fraldi, A., Medina, D. L., and Ballabio, A. (2013). Signals from the lysosome: a control centre for cellular clearance and energy metabolism. *Nat. Rev. Mol. Cell Biol.* 14, 283-296. doi: 10.1038/nrm3545

Singh, P., Kalunke, R. M., and Giri, A. P. (2015). Towards comprehension of complex chemical evolution and diversification of terpene and phenylpropanoid pathways in *Ocimum* species. *RSC Adv.* 5, 106886-106904. doi: 10.1039/C5RA16637C Singh, S. K., Srivastav, S., Yadav, A. K., Srikrishna, S., and Perry, G. (2016). Overview of Alzheimer's disease and some therapeutic approaches targeting Aβ by using several synthetic and herbal compounds. *Oxid. Med. Cell. Longev.* 2016:7361613. doi: 10.1155/2016/7361613

Sun, J., Xu, J., Ling, Y., Wang, F., Gong, T., Yang, C., et al. (2019). Fecal microbiota transplantation alleviated Alzheimer's disease-like pathogenesis in APP/PS1 transgenic mice. *Transl. Psychiatry* 9:189. doi: 10.1038/s41398-019-0525-3

Sun, J., Yuan, B., Wu, Y., Gong, Y., Guo, W., Fu, S., et al. (2020). Sodium butyrate protects N2a cells against Aβ toxicity in vitro. *Mediators Inflamm.* 2020:7605160. doi: 10.1155/2020/7605160

Trott, O., and Olson, A. J. (2010). AutoDock vina: improving the speed and accuracy of docking with a new scoring function, efficient optimization and multithreading. *J. Comput. Chem.* 31, 455-461. doi: 10.1002/jcc.21334

U.S. Pat. No. 4,608,392
U.S. Pat. No. 4,992,478
U.S. Pat. No. 4,559,157
U.S. Pat. No. 4,820,508

Vilchez, D., Saez, I., and Dillin, A. (2014). The role of protein clearance mechanisms in organismal ageing and age-related diseases. *Nat. Commun.* 5:5659. doi: 10.1038/ncomms6659

Vogt, N. M., Romano, K. A., Darst, B. F., Engelman, C. D., Johnson, S. C., Carlsson, C. M., et al. (2018). The gut microbiota-derived metabolite trimethylamine N-oxide is elevated in Alzheimer's disease. *Alzheimers Res. Ther.* 10:124. doi: 10.1186/s13195-018-0451-2

Wang, S., Ahmadi, S., Nagpal, R., Jain, S., Mishra, S. P., Kavanagh, K., et al. (2020). Lipoteichoic acid from the cell wall of a heat killed *Lactobacillus paracasei* D3-5 ameliorates aging-related leaky gut, inflammation and improves physical and cognitive functions: from *C. elegans* to mice. *Geroscience* 42, 333-352. doi: 10.1007/s11357-019-00133-4

Wei, Z., Chen, X.-C., Song, Y., Pan, X.-D., Dai, X.-M., Zhang, J., et al. (2016). Amyloid β protein aggravates neuronal senescence and cognitive deficits in 5XFAD mouse model of Alzheimer's disease. *Chin. Med. J. (Engl)* 129, 1835-1844. doi: 10.4103/0366-6999.180046

Wenzel, T. J., Gates, E. J., Ranger, A. L., and Klegeris, A. (2020). Short-chain fatty acids (SCFAs) alone or in combination regulate select immune functions of microglia-like cells. *Mol. Cell. Neurosci.* 105:103493. doi: 10.1016/j.mcn.2020. 103493

Xu, D., and Zhang, Y. (2011). Improving the physical realism and structural accuracy of protein models by a two-step atomic-level energy minimization. *Biophys. J.* 101, 2525-2534. doi: 10.1016/j.bpj.2011.10.024

Yadav, H., Devalaraja, S., Chung, S. T., and Rane, S. G. (2017). TGF-β1/Smad3 pathway targets PP2A-AMPK-FoxO1 signaling to regulate hepatic gluconeogenesis. *J. Biol. Chem.* 292, 3420-3432. doi: 10.1074/jbc.M116.764910

Yadav, H., Quijano, C., Kamaraju, A. K., Gavrilova, O., Malek, R., Chen, W., et al. (2011). Protection from obesity and diabetes by blockade of TGF-β/Smad3 signaling. *Cell Metab.* 14, 67-79. doi: 10.1016/j.cmet.2011. 04.013

Yang, J., Yan, R., Roy, A., Xu, D., Poisson, J., and Zhang, Y. (2015). The I-TASSER suite: protein structure and function prediction. *Nat. Methods* 12, 7-8. doi: 10.1038/nmeth.3213

Yankner, B. A. (1996). Mechanisms of neuronal degeneration in Alzheimer's disease. *Neuron* 16, 921-932. doi: 10.1016/s0896-6273(00)80115-4

Zhang, Y. (2008). I-TASSER server for protein 3D structure prediction. *BMC Bioinformatics* 9:40. doi: 10.1186/1471-2105-9-40

Zhang, P., Kishimoto, Y., Grammatikakis, I., Gottimukkala, K., Cutler, R. G., Zhang, S., et al. (2019). Senolytic therapy alleviates Aβ-associated oligodendrocyte progenitor cell senescence and cognitive deficits in an Alzheimer's disease model. *Nat. Neurosci.* 22, 719-728. doi: 10.1038/s41593-019-0372-9

Zheljazkov, V. D., Cantrell, C. L., Astatkie, T., and Jeliazkova, E. (2013). Distillation time effect on lavender essential oil yield and composition. *J. Oleo Sci.* 62, 195-199. doi: 10.5650/jos.62.195

Zhuang, Z., Gao, M., Yang, R., Liu, Z., Cao, W., and Huang, T. (2021). Causal relationships between gut metabolites and Alzheimer's disease: a bidirectional Mendelian randomization study. *Neurobiol. Aging* 100, 119.e15-119.e18. doi: 10.1016/j.neurobiolaging.2020.10.022

What is claimed is:

1. A method of treating Alzheimer's disease, comprising administering a composition to a patient in need thereof, the composition consisting of:
   a therapeutically effective amount of fenchol, and
   a pharmaceutically acceptable carrier;
   wherein the therapeutically effective amount of fenchol is 1 to 2000 mg; and
   wherein the composition is in a tablet, troche, pill, or capsule.

2. The method of claim 1, wherein the therapeutically effective amount of fenchol is administered to the patient orally.

3. The method of claim 1, wherein the therapeutically effective amount of fenchol is administered buccally.

4. The method of claim 1, wherein the the pharmaceutically acceptable carrier is selected from the group consisting of a binder, an excipient, a disintegrating agent, a sweetening agent, a lubricant, a glidant, a flavoring agent, a coloring agent, a diluent, an assimilable edible carrier, a surface active agent, a dispersing agent, a preservative, a thickening agent, an emulsifying agent, and any combination thereof.

5. The method of claim 4, wherein the pharmaceutically acceptable carrier is selected from the group consisting of a binder, an excipient, a disintegrating agent, a sweetening agent, a lubricant, a flavoring agent, an inert diluent, an assimilable edible carrier, and any combination thereof.

6. The method of claim 1, wherein the therapeutically effective amount of fenchol is from 1 to 100 mg per day.

7. The method of claim 1, wherein the therapeutically effective amount of fenchol is from 1 to 1,000 mg/kg.

8. The method of claim 1, wherein the therapeutically effective amount of fenchol is from 1 to 200 mg/kg per day.

* * * * *